US005170359A

United States Patent [19]

Sax et al.

[11] Patent Number: 5,170,359

[45] Date of Patent: Dec. 8, 1992

[54] TRANSIENT EPISODE DETECTOR METHOD AND APPARATUS

[75] Inventors: Robert L. Sax, Alexandria; Richard Kram, Springfield, both of Va.

[73] Assignee: Presearch Incorporated, Fairfax, Va.

[21] Appl. No.: 533,429

[22] Filed: Jun. 5, 1990

Related U.S. Application Data

[63] Continuation-in-part of Ser. No. 462,863, Jan. 5, 1990, abandoned, which is a continuation of Ser. No. 339,898, Apr. 18, 1989, abandoned, which is a continuation of Ser. No. 632,240, Jul. 19, 1984, abandoned.

[51] Int. Cl.[5] .............................................. G06F 15/20

[52] U.S. Cl. .................................... 364/481; 307/351; 324/102; 364/487; 364/574

[58] Field of Search ......................... 307/351; 324/102; 364/481, 487, 550, 574

[56] References Cited

U.S. PATENT DOCUMENTS

| | | | |
|---|---|---|---|
| 3,437,834 | 4/1969 | Schwartz | 367/901 X |
| 3,564,493 | 2/1971 | Hicklin | 367/901 X |
| 3,617,904 | 11/1971 | Marino | 307/351 X |
| 3,824,532 | 7/1974 | Vandierendonck | 367/901 X |
| 3,833,797 | 9/1974 | Grobman et al. | 364/554 X |
| 3,939,365 | 2/1976 | Lindgren | 307/351 |
| 4,001,604 | 1/1977 | Parks et al. | 307/351 |
| 4,112,381 | 9/1978 | Mortensen et al. | 307/351 X |
| 4,271,491 | 6/1981 | Simpson | 367/901 X |
| 4,311,960 | 1/1982 | Barr | 307/351 X |
| 4,400,783 | 8/1983 | Locke, Jr. et al. | 364/483 |
| 4,694,402 | 9/1987 | McEachern et al. | 324/102 |
| 4,713,771 | 12/1987 | Crop | 364/487 |
| 4,727,314 | 2/1988 | Lapeyrolerie et al. | 324/102 |

OTHER PUBLICATIONS

"Mathematical Analysis of Random Noise", by S. O. Rice; *Selected Papers on Noise and Stochastic Processes*, Dover Publ., 1954, pp. 133 et seq.

"Parallel Processing Techniques for Estimating Pitch Periods of Speech in the Time Domain", Gold/Rabiner; *J. Acoust. Soc. Amer.*, vol. 46, No. 2, 1969, pp. 442–448.

*Primary Examiner*—Parshotam S. Lall
*Assistant Examiner*—Edward R. Casimano
*Attorney, Agent, or Firm*—Cushman, Darby & Cushman

[57] ABSTRACT

A method and apparatus for detecting transient episodes includes parallel connected transient episode detectors (peripheral devices) to measure short-lived disturbances concurrently, each uniquely associated in series with one of a multiplicity of analog sensors. A shared memory connects an object sensor with its uniquely associated transient episode detector. The transient episode detector outputs signals through a second shared memory to a host disturbance processor. The transient episode detector adaptively tracks and masks background noise through use of a noise statistics stack. The stack is operated in two different modes: initialization and update. In the initialization mode, the stack operates in a recursive sort from the bottom up to replace initial dummy data with ordered noise level peak value measurements. In the update mode, only new significant non-redundant noise level peak values which fall outside of a defined central normal range of the stack are used to update the stack. Updating is accomplished through a positive feedback recursive sort which removes extremal values of the stack of the opposite sense from the incoming new noise level peak values. Such a dual function of the noise statistics stack permits rapid adaptation to chaining background noise which is subsequently masked from the transient episodes.

99 Claims, 45 Drawing Sheets

Transient Episode Detector

Transient Episode Detector

Transient Episode Detector

FIG. 1(c)(ii)

FIG. 1(c)(iii)

Transient Episode Detector

Accept and Transmit Data

Time Check

Write New Data

Check Lockout 1

Detector Status and Control

Read New Data

Error Check and Control

Automatic Re-Start

Manual Edit/Start

Data Prefilter

Differential Analyzer

Analyze Data Pattern Type

Reset State Variables

Reset State Variables

FIGURE 14 (B)

| S | STATE (s) |
|---|---|
| 0 | Initialize Noise Statistics |
| 1 | Detect Leading Edge of Signal |
| 2 | Detect End of Fading Signal |
| 3 | Largest Peak Signal |
| 4 | Signal Episode Completed |
| 5 | First Peak of Signal |
| 6 | Signal Episode Verified |

Update State Variable

Initialize Noise Statistics

Initialize Noise Statistics
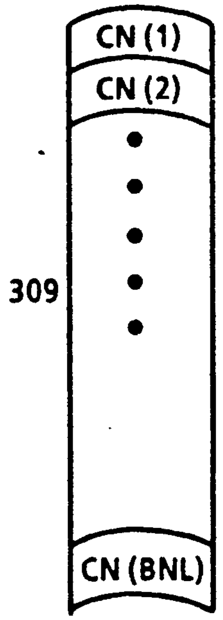
FIG. 16(b) (i)
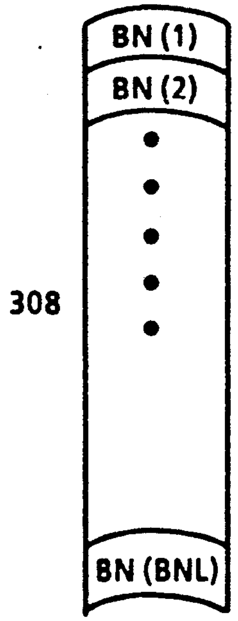
FIG. 16(b) (ii)

Detect Leading Edge of Signal

Signal Episode Initializer

Detect End of Fading Signal

Table for Y Decrement for Binomial Noise Threshold

FIG. 19(c)(i)

$P_{fa} = 10^{-V_{ij}} < 10^{-Z}$ (eg Vote Threshold of Event, $Z = 10$)

| NOISE THRESHOLD | i HITS (0 MISSES) | i + J TRIALS (WITH MISSES) | $V_{ij} = iX - jY$ | |
|---|---|---|---|---|
| | | | X | Y |
| E-10 | 1 | | 10 | 10 |
| E-5 | 2 | 4 | 5 | 10 |
| 4.6 E-4 | 3 | 5 | 3.3 | 6.6 |
| 3.16 E-3 | 4 | 6 | 2.5 | 5.0 |
| 0.01 | 5 | 7 | 2.0 | 4.0 |
| 0.0215 | 6 | 8 | 1.67 | 3.33 |
| 0.0372 | 7 | 9 | 1.43 | 2.86 |
| 0.0562 | 8 | 10 | 1.25 | 2.50 |
| 0.0774 | 9 | 11 | 1.11 | 2.22 |
| 0.1 | 10 | 13 | 1.0 | 2.00 |
| 0.398 | 25 | 30 | 0.4 | 2.00 |

Example: Binomial Noise Threshold = 0.1, Y = 2.00
Event Threshold, Z = 10

| i | MULTINOMIAL THRESHOLDS i | VOTE Xi SCORE |
|---|---|---|
| 1 | $10^{-10}$ | 10 |
| 2 | $10^{-9}$ | 9 |
| 3 | $10^{-8}$ | 8 |
| 4 | $10^{-7}$ | 7 |
| 5 | $10^{-6}$ | 6 |
| 6 | $10^{-5}$ | 5 |
| 7 | $10^{-4}$ | 4 |
| 8 | $10^{-3}$ | 3 |
| 7 | $10^{-2}$ | 2 |
| 8 | $10^{-1}$ | 1 |

FIG. 19(c)(ii)

| Peaks | Multinomal Threshold | Score | |
|---|---|---|---|
| A | $10^{-10}$ | 10 | Verified Signal |
| B | $10^{-7}$ | 7 | Verified Signal |
| C | $10^{-3}$ | 3 | |
| D | $10^{-3}$ | 3 | Verified Signal |
| E | $10^{-2}$ | 2 | |
| F | $10^{-5}$ | 5 | |

Special End of Signal Transition Sensor (SETS)

Binomial Integrator (BINT)

Measure Signal Peaks

Minimum Signal Peaks Transition

Uptrend Signal Peaks Transition

Maximum Signal Peaks Transition

Noise Drop Peaks Transition

Verified Peaks Transition

Update Noise Statistics

Update Noise Statistics
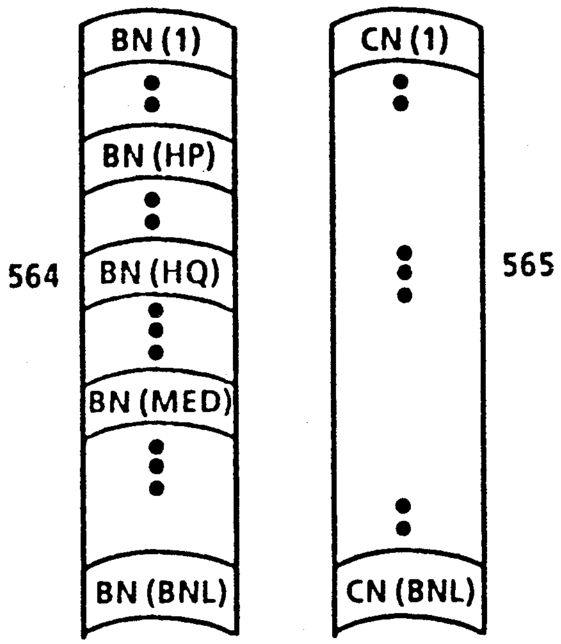
FIG. 27(b)(i) FIG. 27(b)(ii)
| | |
|---|---|
| Buffered Noise Limit | BNL = 65 |
| High Percentile | HP = 6 |
| Low Percentile | LP = 60 |
| MEDian | MED = 33 |
| High Quantile | HQ = 16 |
| Low Quantile | LQ = 50 |
FIG. 27(b)(iii)

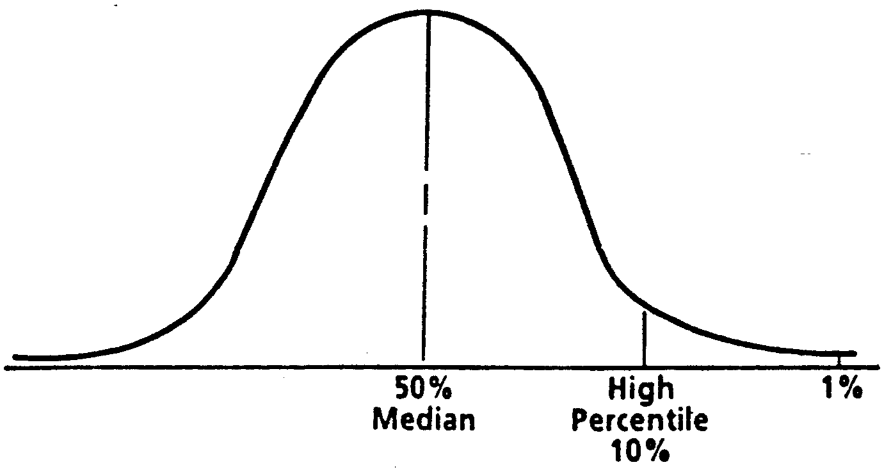
FIG. 27 (c) (i)
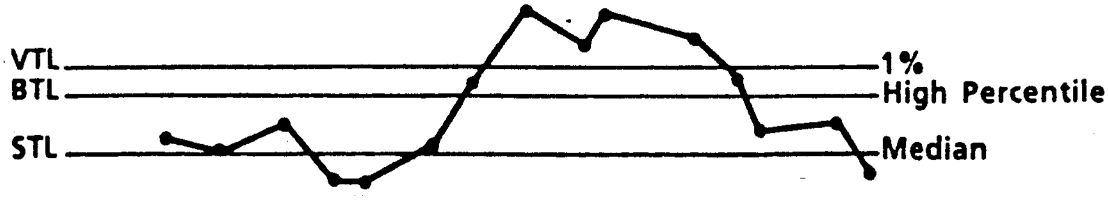
FIG. 27 (c) (ii)

Update Noise Thresholds

TRANSIENT EPISODE DETECTOR METHOD AND APPARATUS

This is a continuation-in-part application of an application having U.S. application Ser. No. 07/462,863, filed Jan. 5, 1990, abandoned, which was a continuation of an application having U.S. application Ser. No. 07/339,898, filed Apr. 18, 1989, abandoned, which Was a continuation of an application having U.S. application Ser. No. 06/632,240, filed Jul. 19, 1984, abandoned.

The present invention is concerned with a real variable adaptive pre-processor filter and signal state detector for detecting and analyzing transient signals. Specifically, the present invention relates to a transient episode detector which detects, times and determines duration of transient signals or episodes.

BACKGROUND OF THE INVENTION

The need to detect and analyze transient events arises in many different contexts. One example involves underwater detection of acoustic signal sources. The electrical output of a conventional acoustic transducer (e.g., a microphone), includes many random noise components and perhaps some coherent background components as well (e.g., generated by water wave motions, etc.). Superimposed on such continuous "noise" components are relatively transient "signal" components associated with, for example, an incoming torpedo or a passing enemy submarine. The ability to quickly, accurately and reliably detect such superimposed transient "signal" components has long been sought after for useful application in many diverse situations.

Other situations or environments where reliable detection of such transient "signals" is desired may include security systems such as intrusion detection systems. These could be applicable to a home or a commercial setting. A transient signal which might contain desirable information could be the breaking of a window, while coherent background noise which it would be desirable to mask might include the operation of a refrigerator or other appliance. The present invention would be able to distinguish the transient episodes containing information from the "noise" sources such as the above-described refrigerator.

The present invention is particularly useful in the environment of security systems inasmuch as it reliably detects transient episodes in a manner so as to dramatically reduce false alarm rates which may be expected with other detector systems. Reliably reducing false alarm rates greatly reduces time and energy resource expenditures in monitoring the system.

Security systems may generally test for a variety of conditions such as smoke, water, fire or undesirable entry. All such sensors (or any other variety of sensors) could be utilized in accordance with the present invention either individually or in any combination.

Seismology detectors are concerned with another environment in which the present invention may be practiced with advantage. Seismology determinations may frequently require passive sensors which produce large quantities of data. The present invention rapidly and efficiently handles mass quantities of data by adaptively eliminating that data which is of less informational value. The detector apparatus and method of the present invention actually permits omission of large quantities of data (in terms of full term processing thereof), and accordingly permits rapid and efficient handling of large quantities of data.

A specific seismology application for the present invention could include a detector which considered nuclear or atomic detonations to be desirable transient episode information while earthquakes are considered undesirable background "noise" which should be filtered from the primary informational signals. The present invention would, in this particular environment, then detect nuclear detonations while masking all other information, i.e. treating all other signals as "noise".

I have now discovered a transient signal detection method and apparatus which I believe to be an improvement over any known prior detection technique and apparatus.

The methodology of the present invention is concerned with detecting transient events occurring in a sequence of input digital electrical signals by digitally scanning and processing the sequence of input digital signals to detect the occurrence of peak values within the digital signals, storing peak data which represents time of detected peak value occurrences and the magnitude of those detected occurrences, digitally analyzing time-consecutive patterns of the stored peak data to detect predefined patterns of peak values and storing corresponding peak-pattern data, and digitally analyzing the stored peak-pattern data to thereby detect the occurrence of transient events or episodes.

Detection or determination of signals based on detected-peak values is known. The mathematician and scientist Rice wrote in *Selected Papers on Noise and Stochastic Processes* (edited by Nelson Wax, copyright 1954, Dover Publications, New York) that signals may be determined by evaluating data measurements to determine peaks which occur therein.

The present invention is fundamentally different from the theoretical work of Rice inasmuch as no parametric assumptions are made by the apparatus and methods of the present invention. The theoretical work of Rice was always based on a Gaussian distribution of data. Real world applications present data patterns which are not of a Gaussian distribution. The adaptive feature of the present invention permits it to be an effective real-time filter and transient episode detector for any type of data, including non-Gaussian distributions.

Furthermore, the present invention is specifically concerned with digital apparatus which was not considered by Rice in his theoretical approach to looking at peak values. Accordingly, the present invention includes digital apparatus which makes no assumptions concerning a stream of input data, and reliably and efficiently provides detection of transient episodes contained within the stream of data by functioning as an adaptive filter thereon. The present invention not only determines peak values of a sequence of input digital signals, but it also digitally analyzes time-consecutive patterns of such peak data and then analyzes such peak patterns to detect and characterize transient episodes.

SUMMARY OF THE INVENTION

The present invention may utilize a plurality of parallel object sensors (e.g., acoustical microphones or sonar signals) which produce a continuous flow of analog signals. This flow of signal information is digitized in a conventional A/D converter and compartmentalized in a microprocessor for subsequent sharing through a circular buffer (e.g., conventional RAM device) with another microprocessor.

Each object sensor may be uniquely associated with a transient episode detector through its own shared memory link. The transient episode detector TED, (based on conventional microprocessors) is operated in accordance with the features of the present invention to give real-time significance and meaning to the information from the object sensors (e.g., sonar or microphone signals). Defining characteristics such as start and end time, duration and relative strength of detected transient episodes are provided by each TED to another conventional shared memory for subsequent processing by a host computer. The host computer (also based on conventional hardware) conducts disturbance synthesis and analysis of parallel detections from the plurality of TED's. Thus, the present invention discloses both serial and parallel processing.

The object sensor package/transient episode detector pairs are parallel peripheral devices to the host computer. Based on the detected episodes, the host computer can pinpoint various sensors to concentrate on and thereby build a study of a present disturbance (e.g., passing ship or fired missile). The host computer then alone would decide what action to take based on the detected episodes from the peripheral devices. Accordingly, the transient episode detector may be viewed as a real-time adaptive filter in individual series connections with a plurality of parallel sensors to mask undesirable redundant noise information from transient episodes.

The plurality of sensors each produce electrical outputs which include both "noise" and desirable transient signal information. The desirable information is of limited duration, i.e. transient. The transient episode detection feature of the present invention adapts to changing background noises (even coherent continuous signals) to remove (i.e. filter) these from the detected or extracted signal information. The sensors are, in the exemplary embodiment, each individually interfaced with a transient episode detector. The detector performs the variable adaptive filter function and, in the exemplary embodiment, transfers signals through a "bell ringer" function to, for example, a host computer (or other user output, system, etc.). While the transient episode detector output alone may be used to output useful information in some systems, for some environments it may be advantageous to use a parallel processed array of such detectors so that more information about the transient signal source (e.g., exact location, speed, etc.) can be rapidly and reliably extracted.

The host computer typically reacts to the plurality of transient episode detectors upon proper indication from the "bell ringer" circuitry, and receives from the transient episode detectors signal state information concerning the various detected transient episodes: A variety of statistical information regarding the detected and determined signals may be available to the host computer through memory buffers from each transient episode detector.

An individual transient episode detector is, in the preferred embodiment, uniquely associated with each sensor. The host computer functions as a form of parallel processor by interacting with a plurality of transient episode detectors which are arranged in parallel relationship with the host computer.

Thus, the present invention may utilize a combination of data processing relationships involving both serial and parallel interrelationships. The "object" sensors (e.g. because they typically be used to detect the presence or passage of objects) are in serial relationship with their uniquely associated transient episode detectors, and the plurality of transient episode detectors are, in turn, operatively arranged in parallel with the host computer.

A circular buffer shared memory arrangement may permit independent operation and function of the plurality of transient episode detectors and the host computer. Additionally, a similarly functioning circular buffer shared memory may connect the object sensor with its uniquely assigned transient episode detector. This permits independent processing by the transient episode detector of sensor information from the "object" sensor. The data processing and filtering functions of the transient episode detector require variable amounts of time dependent upon the nature of the detected signals. Accordingly, the circular buffer shared memory permits the transient episode detector to variably lag the real time flow of continuous data from the object sensor as may be required. An automatic pointer and counter system enables the transient episode detector to at all times know whether any sensor data has been skipped.

In view of the continuous flow of data and the typical plurality of sensor/transient episode detector pairs, it is not necessary to filter through the transient episode detector every sample obtained by the object sensor. However, a skip check function may prevent the transient episode detector from falling too far behind in processing the object sensor outputs.

After receiving raw data signals from the object sensor, the transient episode detector establishes the data in a specific triad format. That is to say, that the transient episode detector always retains at least three consecutive data samples to act on. These include the current sample and two previous samples. Processing of the last three consecutive data samples centers on the middle value of the three samples or another of the group. This permits the transient episode detector to "know" the past trend and to project the "future" trend inasmuch as time slot data samples are available on each side of the median in which a trend is maintained; or if not, extremal or possible turning points to indicate the end of a trend on the smallest measured time scale.

The transient episode detector functionally analyzes the data pattern type to determine one of four possible cases or patterns. These cases may be defined as minimum, uptrend, downtrend and maximum patterns. To obtain highest efficiency and permit relative real time analysis of sampled data, peak detections are further analyzed for peak pattern types. Non-peak information is skipped and further new data is accepted and analyzed. These yield longer time scale trends of ascending or descending maximum or minimum value turning points; or, if not, major maximum or minimum longer time scale turning points, Whenever peak pattern type analysis is performed, signal state variables are reset and updated. These may include initialization of noise statistics, detecting the leading edge of "signal", detecting end of fading "signal", detecting the largest peak of "signal", detecting a "signal" episode completed and/or detecting the first peak of "signal".

The transient episode detector preferably further functions to update noise statistics utilizing positive feedback in a recursive sort stack system. This positive feedback stack enables rapid adaptation to changing noise signals so that changing background noise from the object sensors is rapidly adapted to and false noise signals are prevented from masking desirable transient episodes.

This rapid adaptation of the noise statistics is achieved through a non-redundant update feature of the present invention. That is to say that the efficiency of the noise statistics stack is greatly enhanced by updating the noise statistics with new noise value peak signals only when these new values fall outside of a central normal range of the statistics stack. This normal range is defined in accordance with the values contained within the noise statistics stack being ordered. The defined central portion then may be comprised of a high percentile range of values centered about the median value of the stack. It may be that a predefined percentile of one or more detection statistics occupy the central portion of the stack. In any embodiment, values which fall within the defined central portion are not used to update the compiled noise statistics. Only those values which fall outside of the defined central portion of the stack are used to update statistics. This permits a significant reduction in processing time of such a noise statistics stack inasmuch as it is only necessary to update the stack with a small percentage or portion of the total number of new noise values available. That is to say that many new noise values will fall within the defined central portion of the stack and will not be used to update the stack.

The positive feedback feature of this recursive sort noise statistics stack means that when the stack is updated with new noise value peak signals, extremal values are displaced from the stack to make room for the new noise values. The extremal Value (i.e., highest or lowest value in the stack) removed is the value of opposite sense to the newly included noise statistics. For example, if a new noise value were included which was above the defined central portion of the stack, the lower extremal value of the stack would be displaced to provide an open position within the stack. All values below the newly included noise statistic would be moved down to bump the lower extremal value from the stack. This is in accordance with the recursive feature of the present noise statistic stack.

Completion of this noise statistics update may be followed by a new iteration of data input from the object sensor and the processing thereof.

While performing such functions, the transient episode detector may operate independently of the object sensor data gathering functions as in the preferred exemplary embodiment. Furthermore, operation of a particular transient episode detector may be substantively independent of the host computer operations.

A particular transient episode detector may communicate with the host computer through a "ringer" function whereby the host computer is notified of the availability of processed information concerning a recorded transient episode. Eight indicators are typically made available to the host computer through a circular buffer shared memory, the same memory arrangement as was utilized for the communications link between the object sensor and its uniquely associated transient episode detector. Of course, there is no requirement that the two memory systems be the same. This memory may be segmented so that additional functions such as buffered data pointer and a measurement buffer may be achieved between a transient episode detector and the host disturbance computer.

In Overview, the Transient Episode Detector (TED) may be viewed as converting continuous raw analog/digital data from a signal sensor into detected intermittent episodes of transient episodes which are improbable natural occurrences. The TED remains robust by functioning without making any parametric assumptions about the signals that characterize these disturbances or the various noise sources. The only assumption made is that the disturbances occur over a short time interval compared to anything that is happening in the noise background, noise being defined as anything else (e.g., machinery, fan or Wind noise, or ambient noise). The transient "signal" to be detected may be caused by anything so long as it is short lived in comparison to anything occurring in the established noise background.

Sharing through the circular buffer memory between a TED and a host computer may be viewed as providing a window to detected disturbances for a program or a subprogram designed to operate on the detected disturbances (i.e., transient signals). Functionally, a TED provides the first level of an artificial intelligence function so that disturbances may be detected in real time. The windows may also be provided with pointers to the data and information that they contain for subsequent processing concerning the disturbance. This subsequent processing may include compilation of the data into strings of digital data signals that describe the disturbance.

A single TED may be uniquely associated with a single sensor, or it may be synchronized to any number of sensors in which they would be sampled synchronously. The host computer may process the continuous data into intermittent data in a desired fashion from an input signal that has been captured. Thus, the transient episode detector, acting as a peripheral device, is applicable to many different processor applications.

With regard to operation as a peripheral device, the Transient Episode Detector (TED) may be used as a system design package thereby facilitating multi-tasking and synchronizing and extracting of phonemic type signals, associated with object disturbances or activated emissions, from a set of uniformly sampled object sensors. It "windows" through a circular buffer shared memory a sensor processor by an established clock sample count to obtain the digitally sampled sensor data. The resulting filtered signal from a TED is then "windowed" to the host computer which handles all TEDs and object sensors.

Thus, the host computer may be provided with selected, synchronously extracted, data and information. This data may be associated with disturbances from one or more monitored object. One purpose of the host computer may be to perform final compression of continuous sensor data. This compression may be accomplished by time-slicing the minimum amount of data which is required to simultaneously characterize multiple disturbances in real time. This could include identification of waveforms, and measurements of these after each episode of a signal.

Furthermore, if the object sensors are in an ordered array, the host disturbance processor (computer) could be provided in advance with information concerning the precise location of the sensors in the array. This would permit the host computer to perform disturbance analysis which has both temporal and spatial significance. That is to say that the host disturbance processor could effectively track a disturbance as it propagated across or through a predefined region.

The host disturbance processor could be operated as a higher level analysis means to detect features to be used as percepts which could be stored in a repetition file as a "group" member until the host disturbance processor "learned" what significance recognition of particular percepts held. Ubiquitous percepts could eventually be recognized as self-noise within a system, and their classification as such thereby eliminate it. This would provide an overall transient episode and a disturbance detector system operating characteristic with higher probability of detection and lower false alarm rate. Viewing the host disturbance processor as a higher level decision process for obtaining information from transient episodes, various different functions would be achievable.

Such a system design package enables a desired system response to specific signals transmitted by sensors as well as to measurement and recordation of disturbance features diagnostic of predefined or to-be-determined objects. Accomplishing this synchronously on all object sensors obtains corresponding desired actions with minimum possible time delay.

Implementation of these features at the host computer could be through special (i.e. defined) Call Statements. For example, CALL OBJECTS might read data from the circular buffer shared memory associated with Sensor/TED packages which have a "bell ringer" control "true" flag set. The control data may be a Clock Sample Count and its corresponding state variable. After receiving all of the data required from shared memory, desired subsequent signal processing would be effected. The supervisor host computer obtains the data of detected disturbances by using pointers to each Sensor/TED waveform buffer. These are updated in real-time with minimum possible delay and with complete invisibility by the other components.

Another view of the data a TED transmits may be that the object sensor disturbances are converted into a logical syntax. The syntax is generated by transforming multiple discriminant measurements into messages conveyed by alphabetic word data. Time patterns or episodes of multiple discriminants are transformed to sentence or phrase data. This approach permits simplification of classification of disturbances by only requiring sorting and extraction of digital words or phrases associated by prior observation with known physical events or processes. This artificial intelligence is also simplified by sorting and extracting repeatable digital words or phrases.

Regarding possible artificial intelligence applications, if percepts, derived from discriminant measurements of phoneme type signals, are associated with a known physical process, they may be optionally added to a dictionary defining physical processes. Percepts, if not associated with any known process, may be retained in short term memory as the kernel of a new group of transient events possibly associated with a known physical process. By this process, artificial learning is possible by interaction of human knowledge and stored percepts.

False alarms may be drastically reduced by identifying ubiquitous percepts. Because of their frequent occurrence, these convey no unique information about any improbable event, and can therefore be classified as self-noise or as a receiver/local effect. An example of this is monitoring sound in a room. If sharp clicks are frequently caused by a blade hitting a fan cage, this signal might be precisely characterized by its repetition rate, short duration and low amplitude variance. Although its source might be unknown, this signal would be a poor target for detection because of the obvious absence of information content. Such signals merely corrupt the more subtle measurements of physical processes such as switching the fan "on" or "off" or the occurrence of speech sources. This and other applications of artificial intelligence may be used to greatly reduce the false alarm rate and to improve detection of targeted objects.

All object sensors and TEDs are in parallel in the preferred exemplary embodiment. The host computer is one level above a TED component, examining all of or a subset of sensors focused on raw data signal emanating from an object. Thus, implementation of the TED may be also analogized to a window that is entered by a main apparatus, a package dedicated to each object sensor. The package has a window for receiving a sample count from a clock and the associated sampled data from a sensor. It has a further window for transmitting the signal detection status and sample count to a host computer handling disturbances from any or all sensors. The packages are networked to the host computer by memory shared with each Object-Sensor/TED peripheral package. It contains short-term memory of sensor waveform data, queued points to signals and discriminant measurements of disturbances. By this means, the host computer examines the detection status of objects in real-time, and responds appropriately by extracting any required data and information in co-ordination with all of the monitored object sensors.

The window analogy might be considered a whole set of sensors so that all sensors may be viewed at once, which would be equivalent to time-space monitoring of signals that come out of a TED. When transient signals occur, it is desirable to coordinate this information with any such other signals occurring in close time proximity to any other sensors. If there are occurrences on others, they may be correlated by association with a known replicable group of features, i.e., by sufficient proximity to a set of feature values such as duration, rise time, decay time, average frequency, etc. Conventional array analysis techniques could be applied to such correlated events to deduce the origin of the transient signal source, its motion, speed, direction, etc. Such operations would be implemented using an appropriate subroutine. The system as a whole would encompass a set of sensors TED packages and a host computer.

An embodiment of the invention has been successfully modeled using a Burroughs B-3700 computer system in addition to an IBM 3033 computer system to supply dummy object sensor data and sufficient digital data processor power to handle the volume of data in the time allowed. The subsequent description discloses the salient functional aspects of the transient episode detector and its interfacing with a host computer and object sensors. A specific physical embodiment using hardware and software (or any mixture thereof) can be implemented by one of ordinary skill in the art using the information conveyed in this application. The "object" sensors may be of any suitable type which provide satisfactory performance in a desired environment (e.g., hydrophones for underwater acoustic signal detection). The transient episode detector may be embodied in a stand alone micro/mini digital data processor system or related special purpose hardware, as selected by one of ordinary skill in the art. The host computer (if used) should be selected with sufficient processing capacity to handle the desired number of parallel object sensor/TED peripherals selected by the user.

BRIEF DESCRIPTION OF THE DRAWINGS

These as well as other features and advantages of the present invention may be better understood by reading the following detailed description of the presently preferred exemplary embodiment and the accompanying drawings, in which.

DETAILED DESCRIPTION OF THE PRESENT INVENTION

Figure 1:
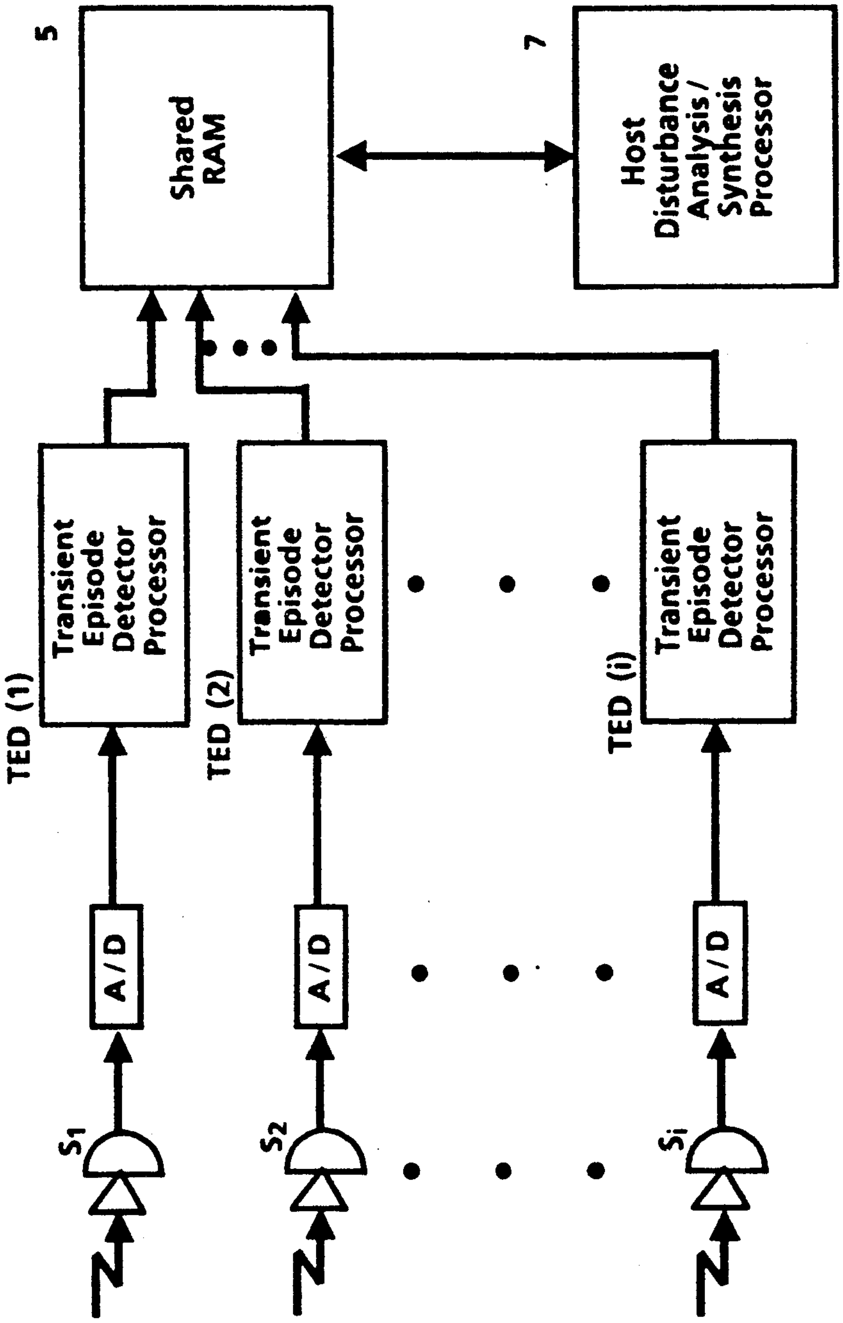
FIG. 1(A) is a functional block diagram of the overall hardware architecture using object sensor/TED pairs connected in parallel with host processor.
FIG. 1(B) is a functional block diagram showing the operation of the overall hardware architecture in relation to parallel processing and serial processing.
FIGS. 1(C)(i), 1(C)(ii), and 1(C)(iii) show three various signal waveforms associated with the present invention.
FIG. 1(D) is a functional block diagram of an exemplary transient episode detector.

The reference numerals employed throughout reference the various operations performed by the present invention, which are generally represented as blocks in the figures. Numerals which are not immediately preceded by the word "FIGURE" will refer to an operation represented by a block, decisional block, or a path. Like reference numerals in different figures represent like operations. The following table identifies in which figures the specific operational blocks are found to assist the reader in following the many flow charts described below.

| FIGURES | BLOCKS |
|---|---|
| 1 (A) | 5,7 |
| 1 (B) | 5,9,11,13 |
| 1 (D) | 2,4,6,8,12,14,16,18,20 |
| 2 | 28,30,32,34,36,40,42,44,48, 50,52,54,56,60,62,63,65,66, 68,72 |
| 3 | 74,76,78,80,82,84 |
| 4 | 86,88,90,92,94,96,98,99 |
| 5 | 101,102,104,106,108,110,111 |
| 6 | 128,130,132,134,136,137, 138,140,142,144,146 |
| 7 | 92,114,116,120,122,124 |
| 8 | 150,156,158,160,164, 166,168,170,172,174 |
| 9 | 176,178,180,182,184 |
| 10 | 188,196,198,200,202,204 206,208,210,212 |
| 11 (A) | 213,214,215,216,217,218,219 |
| 11 (B) | 218(a)–218(j) |
| 12 | 220,222,224,226,228,230, 234,236,238,240,242,244, 246,248,250,252 |
| 13 (A) | 254,256,258,260,262,264, |

-continued

| FIGURES | BLOCKS |
|---|---|
| | 266,268,270,274,276,278 |
| 14 (A) | 280,284,288,290,291,292,294 |
| 15 | 296,298,300,302,304 |
| 16 (A) | 308,310,312,314,318,320, 322,324,326,328,330,332 |
| 17 | 336,338,350,352,354,358, 360,362,364,366,370,372 |
| 18 | 374,376,378,380,382,384, 386,388,390,392 |
| 19 (A) | 406,408,410,411,412,413, 414,415,416,417,418,419, 420,421,422,423,425 |
| 19 (G) | 426,428,434,436,440,442, 444,446 |
| 20 (A) | 641,642,643,644,645,646, 647,648,649,650,651,652, 653,654 |
| 21 | 396,402,404 |
| 22 | 448,450,452,454,456,462, 464,466,468,472,476,478, 480,482,484,486,488 |
| 23 | 490,492,494,496,498,500, 502,504,506 |
| 24 | 510,516,518,520,522,524 |
| 25 | 526,530,534,538,540,542, 544,546,548,550 |
| 26 | 552,554,556,560,562 |
| 27 (A) | 566,574,576,580,582, 584,585,586,588,590,592, 594,596,598,599,600,602, 603,604,605,606, 608,610,612,614,615,616 |
| 27 (B) | 564,565 |
| 28 | 618,620,622,624,626,628, 630,632 |

FIG. 1(A) is directed toward the network configuration of the present invention. FIG. 1(A) shows a plurality of analog sensors S1, S2, . . . , Si, each transmitting continuous data which is sampled by a conventional A/D converter. Each A/D converter feeds one dedicated Transient Episode Detector (TED) TED1, TED2, . . . , TEDi. The dedicated TEDs share a distributed memory 5 which may be a circular buffer shared memory (such as a conventional RAM) operated with the lock out and skipped data count features of the present invention as described further below.

Each distributed shared memory is uniquely associated with a distributed transient episode detector processor which performs serial processing on digitized and compartmentalized data received through its own dedicated shared memory. Each distributed TED can function as a conventional microprocessor device combined with a very accurate clock which may be reset to a common datum and operated in accordance with the features of the present invention. Thus, continuous analog unprocessed data signals are analyzed as synchronized digital data accepted by distributed transient episode detectors.

All transient episode detectors operate in parallel and communicate through shared distributed memory 5 to provide signals to a host central processing unit 7. This may be a conventional mainframe device which receives in parallel the signals transmitted from each object sensor/detector pair and decides on specific subsequent action to be taken. For example, the object sensors may indicate an active source which provide unprocessed signals underwater to a subset of distributed detectors. The detectors strip away undesirable "noise" signals and transmit the detected information signals in parallel to the central processing unit. The signals are correlated by a common set of features which are then acted upon by the host. The host may decide, for example, that the signals from the transient episode detectors are indicative of an unfriendly submarine on a track consistent with its projected bearing and speed. The host interactively may decide to take evasive action or engage an appropriate weapons system. Thus, the object sensors and transient episode detectors may constitute peripheral devices to a fire command and control system.

Figure 1B:
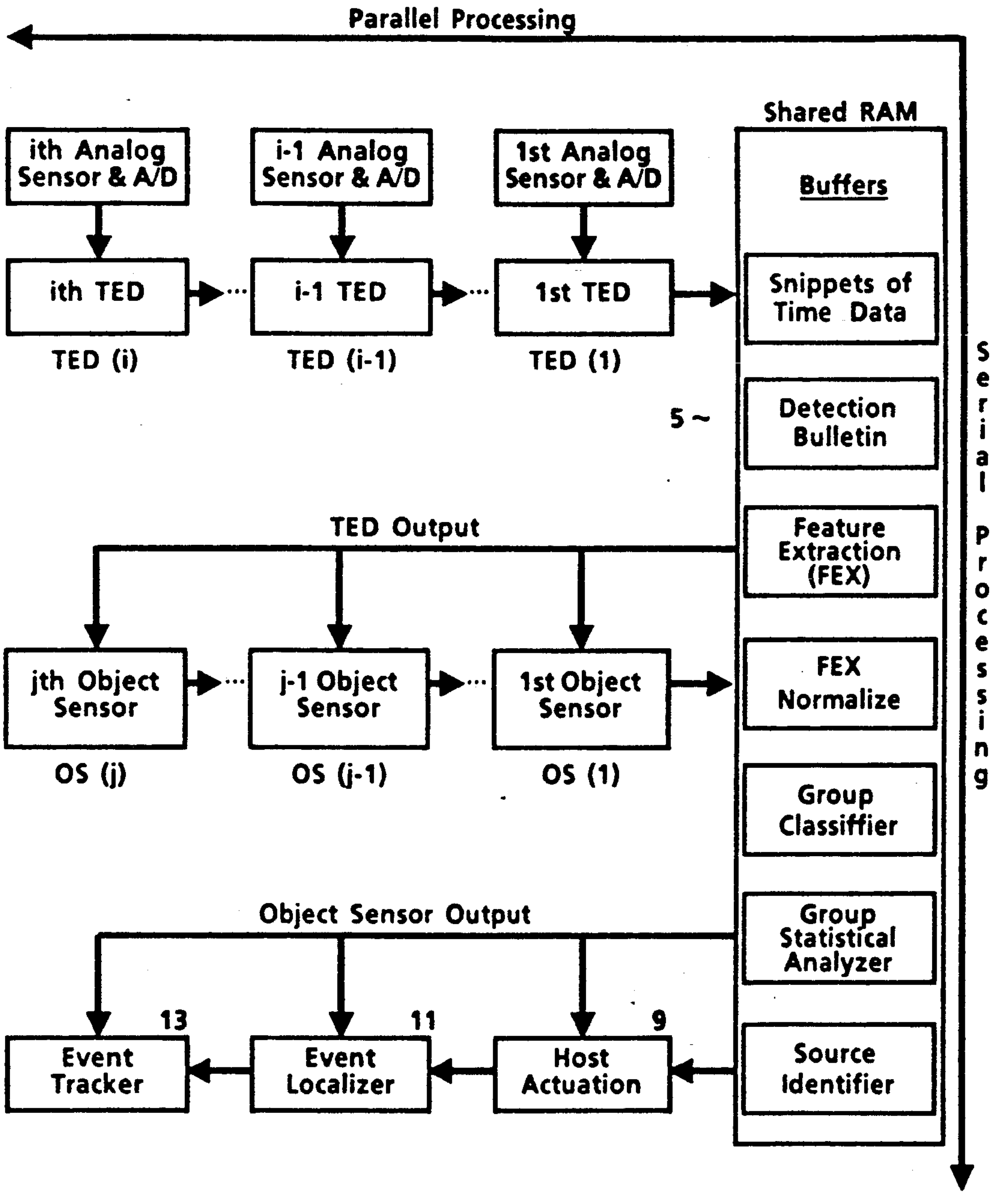

FIG. 1(B) shows the processing architecture the present invention. Information is processed in parallel by the hardware arranged horizontally in FIG. 1(B); whereas, information is serially processed by the hardware arranged vertically.

The TEDs (TED1, . . . , TED(i−1), TEDi), process in parallel the information received from their respective analog sensor and A/D converter. The output of each TED is input to the shared RAM memory 5 and then used by object sensors (OS1, . . . , OS(j−1), OSj) which attempt to detect and identify particular objects from the data provided by the TEDs. The output of each object sensor is input to the shared RAM memory 5 and then employed by the host actuation device 9 to actuate the host central processing unit. From the object sensor output, transient events indicative of a particular object may be localized by event localizer 11 and tracked by event tracker 13.

The shared RAM memory 5 comprises multiple buffers. For illustration purposes, seven buffers are shown, ranging from a first buffer for storing snippets of time data generated by the TEDs to a seventh buffer for storing information relating to identified sources of the episode events.

Figure 1C:
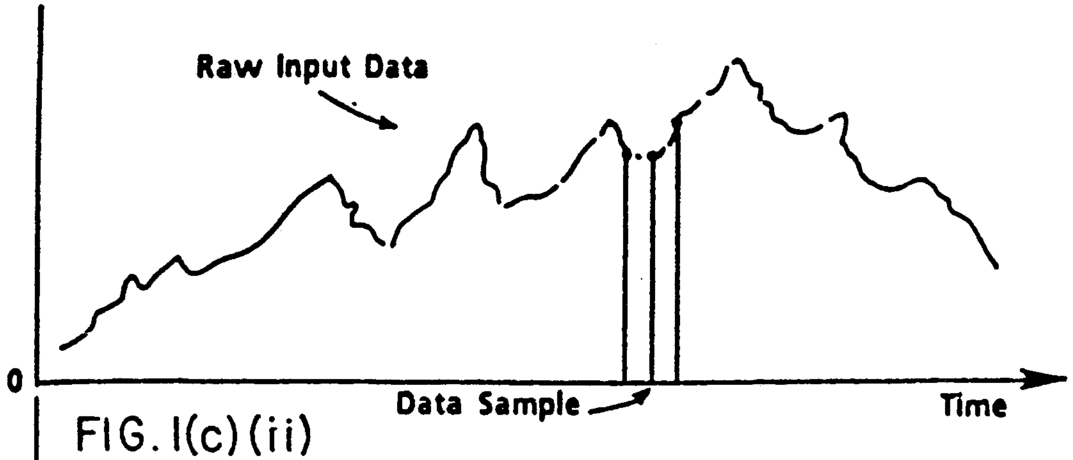
Figure 1C:
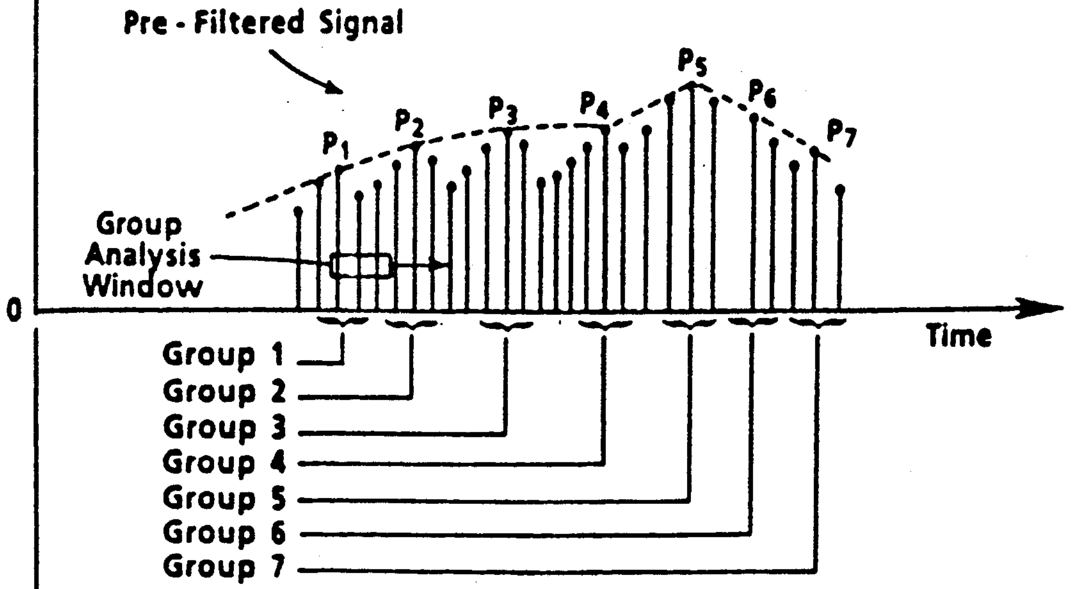
Figure 1C:
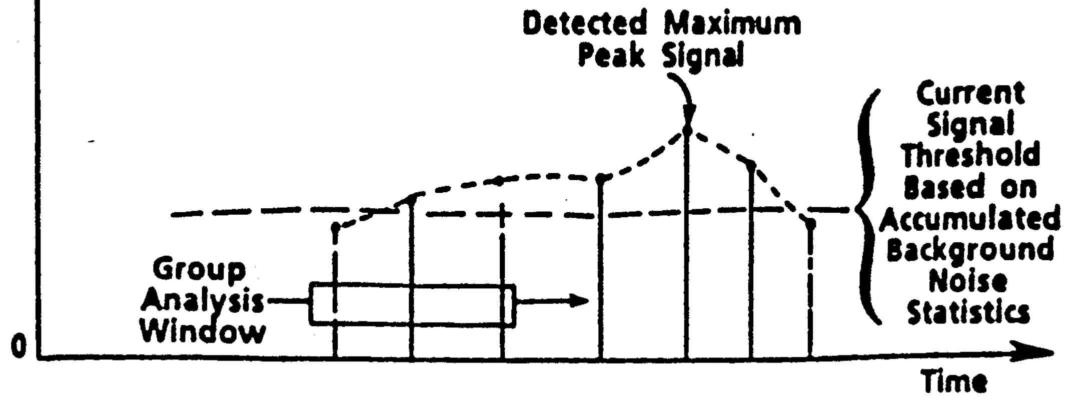

FIG. 1(C) shows exemplary signal waveforms which may be encountered in the present invention and subsequently generated waveforms within the present invention.

FIG. 1(C)(i) represents exemplary raw data as generated by one of the input sensors indicated in FIG. 1(A). Input Sensors produce a continuous analog data stream, as shown, which is digitally scanned at a frequency sufficient to detect the shortest desired episode (i.e., at least the Nyquist frequency). The sampling frequency is preferably at least twice the frequency of the transient episode desired to be detected, although this is not a requirement. If undersampling occurs (i.e., a frequency for sampling which is below the Nyquist criteria) the phenomenon known as aliasing takes place in which higher frequency samples are folded back into other samples. Thus, the transient episode information may become somewhat folded, and therefore distorted, but the detection feature of the present invention will not be completely defeated. Establishment of the precise sampling frequency is a user-selectable variable which could be set based on the particular environment in which a detector is operated. Thus, the user would know the operational environment and desired transient episodes to be detected, and establish the sampling frequency accordingly.

The indicated data samples in FIG. 1(C)(i) are representative of a selected data sampling frequency (the time scale on FIG. 1(C) is arbitrary for the present purposes of a generalized explanation). This quantized data was arrived at through the function of the analog to digital converter, as shown in FIG. 1(A). The raw input data shown in FIG. C)(i) is for a single sensor of FIG. 1(A). Many such raw input data streams would be produced by a plurality of sensors (as indicated in the previous figure), each stream of continuous data different from the other.

These continuous data streams are fed to individual associated transient episode detectors as previously indicated. Each transient episode detector will process the digitized data samples with a set of time-data filters designed to separate different phases of the event conveying different features required to identify the source of the transient disturbance. These filtered transients will then be grouped in a group analysis window as shown in FIG. 1(C)(ii) (e.g., grouping of three is shown). This window moves through time thereby forming new groups of filtered signal values.

The transient episode detector analyzes these grouped signals for peak values contained therein. Examples of such peak values are P1-P7 as shown in FIG. 1(C)(ii). These peaks are localized peaks with regard to the processed group of filtered signal values. They are not peaks in an abstract sense, but are relative with regard to the grouped values.

The indicated peaks are further processed by the transient episode detector, as is shown in FIG. 1(C)(iii), by performing another grouped window analysis of peak values. The group window analysis box shown in this figure also moves through time as did the group analysis window for the previous figure, and is shown only by example as a grouping of three. The grouping of peak values are tested for exemplary maximum peak signals, as is shown for P5 of FIG. 1(C)(iii), and are related to detected transient episodes by virtue of their comparison with presently compiled background "noise" statistics.

The "noise" statistics are derived from indicated peak values which fall below a "signal" value threshold limit. Therefore, the indicated peaks are localized peaks which are not tied to predetermined fixed quantities. Detection of the transient episodes based on the compiled background "noise" statistics permits an adaptive filtering of "noise" from desirable episodic information. Accordingly, as may be seen from FIG. 1(C), raw input data signals from different sensors are processed through the apparatus of the present invention to obtain detection of transient episodes while adaptively masking changing background "noise" in the raw data. These detected transient episodes are forwarded to the host disturbance processor through a shared RAM as is shown in FIG. 1(A).

Figure 1D:
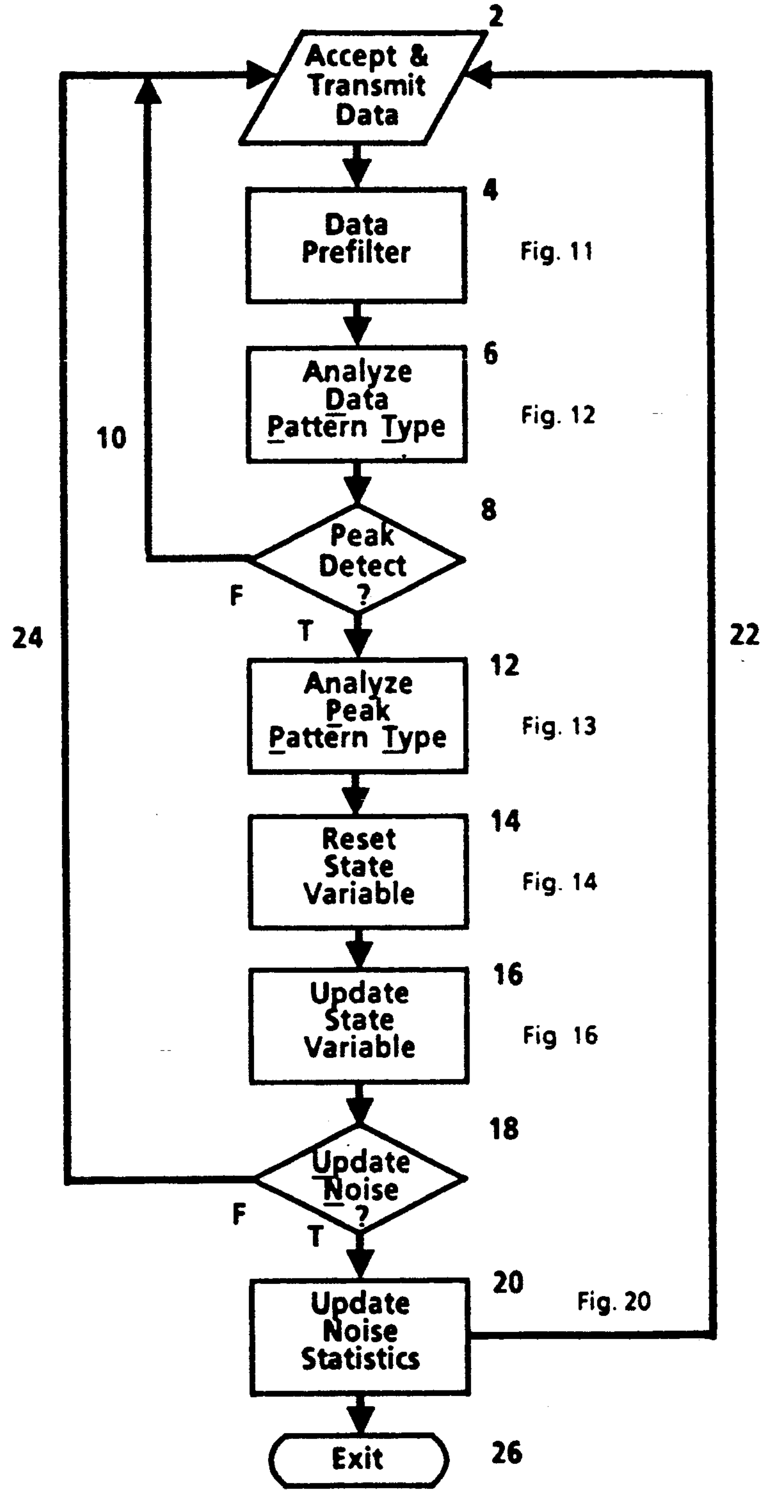

FIG. 1(D) is an overview of the high level functions of the Transient Episode Detector (TED). Block 2 represents start-up involving accepting (and transmitting) new data. This data may be either obtained from an analog sensor or injected initialization data to start a TED or to perform a restart after a shutdown operation. The data from block 2 (from the sensor or other designated source) is preferably processed by a filter operation represented by block 4. This removes long waves in the background that might tend to make levels high or low on a long term basis, and avoids interference with the detection of short-lived disturbances.

Prefiltering data in block 4 provides an efficient and simple way to obtain peaks and zero crossings. For example, rectifying a sine wave provides repetitive pulses, each being positive with minimums representing zero crossings and maximums representing peaks. In any case, essential data sufficient to detect a peak or a zero crossing is three consecutive points. The least amount of essential data necessary to detect a peak is two consecutive values. A positive trend is indicated by the most recent point greater than the predecessor; whereas a negative trend is indicated by the most recent point less than the predecessor. Maximum or minimum values are indicated by a reversal or change in the sign of a trend.

Figure 11:
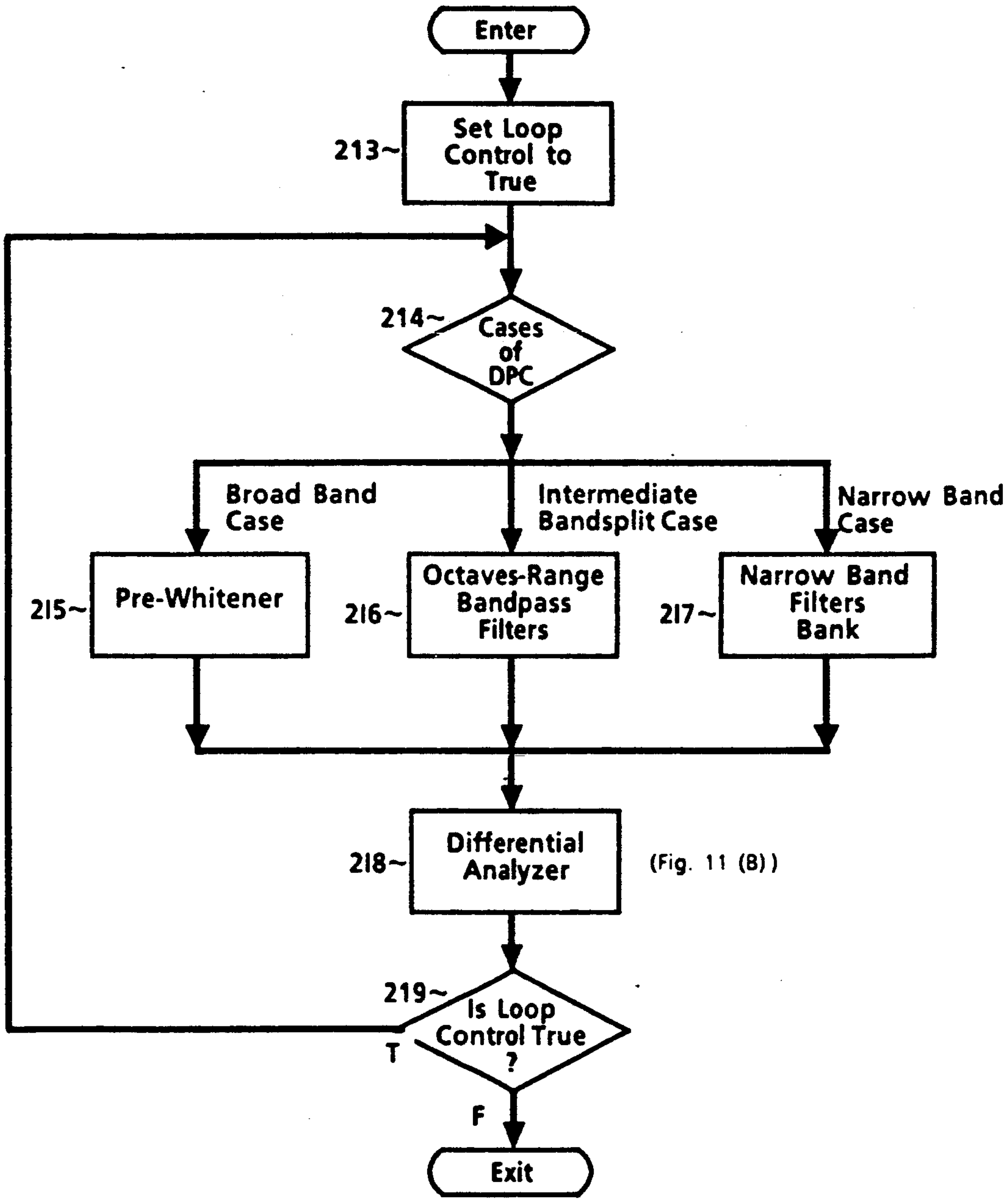
FIG. 11(A) is further detailed description of the data prefilter block of FIG. 1(D)
FIG. 11(B) is further detailed description of the differential analyzer block of FIG. 11(A)
Figure 11:
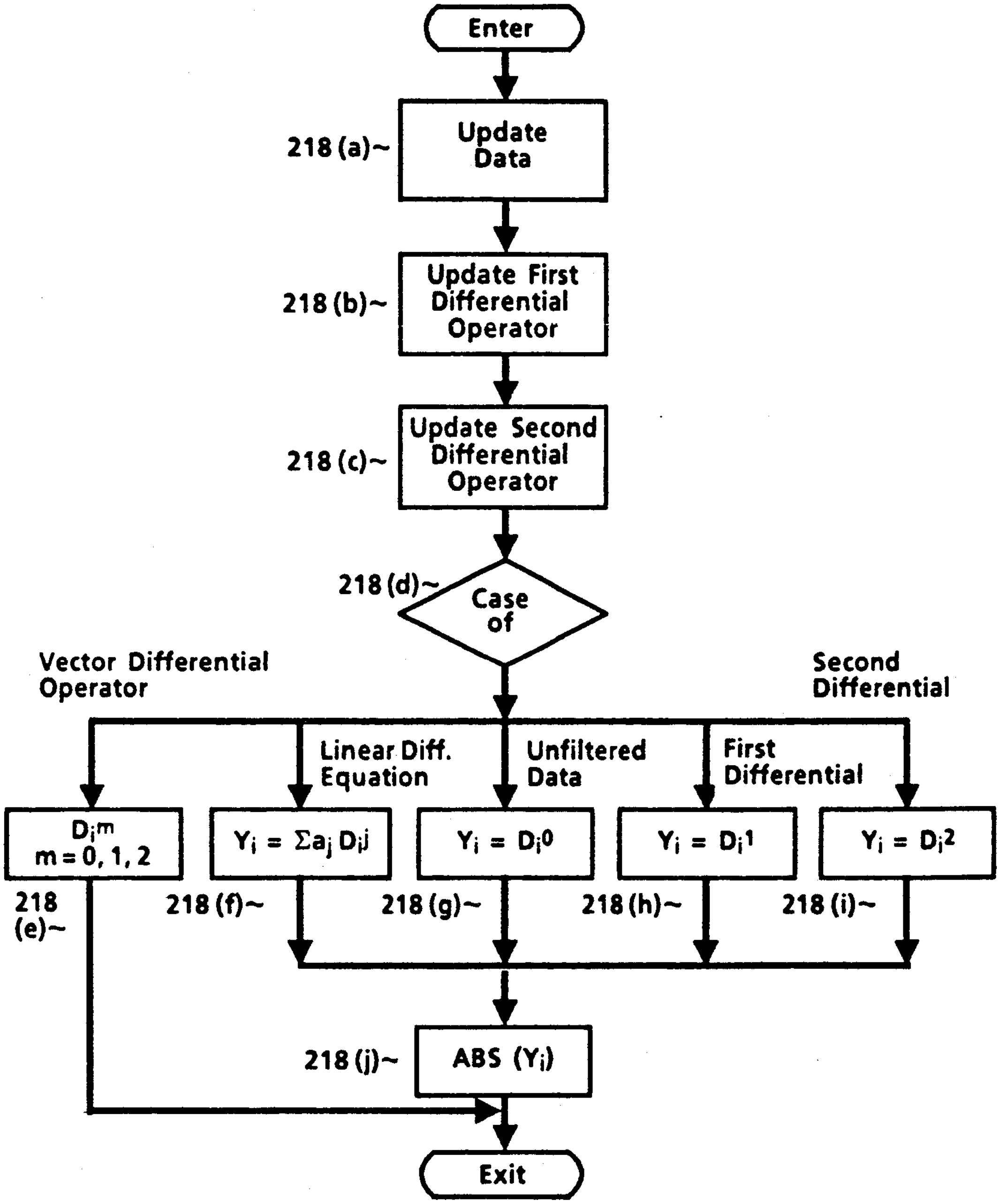

Our exemplary embodiment is based on three consecutive points. For a peak, the middle point is the largest number. For a zero crossing, the middle point is the smallest number. While three consecutive data points are the minimum necessary number for operation, a TED could be readily modified within the scope of the present invention to perform operations on large numbers of samples. The data prefilter operation is explained in more detail in FIG. 11(A).

The filter operation is followed by a process to analyze the data pattern type (represented by block 6). The data pattern type is determined from at least the last three filtered values produced by block 4. New data coming out of an analog sensor is first converted to digital data signals (i.e., herein digital signals represented by electrical voltage currents and/or other physical phenomena are often simply termed "data"). Each new raw input data set (e.g., word or byte) may characterize the sensor for the last sampled time period. Each raw data sample, clocked uniformly, is deposited in a register which is unlocked and accessible to a TED along with the clock's sample count. The analyzed data pattern type is based on a TED operation relating to the last three points of data that have been accepted. It is only necessary at minimum to examine the last three filtered data values (after initialization these would also be associated with the last three points of raw data) to tell whether a peak or a zero crossing has occurred. Of course, a system grouping more than three values together falls within the scope and spirit of the present invention. Knowledge and counts of peak or zero crossings are basic feature determinations at this point. A more detailed description of the analyze data pattern type operation is provided with reference to FIG. 12. These two exemplar features of transients are approximations based on band-limited filtered sensor data, as was shown in FIG. 11A.

With reference to FIG. 1(D), after analysis of the data pattern type, a peak detector flag is checked in the operation of block 8. If no peak was detected (i.e., decisional block 8 is FALSE), the TED returns via flow path 10 to accept the next data. This path will be frequently taken because peaks (i.e., potential informational signals) occur only a minor percentage of time over any given time interval. Even in white random noise, peaks only occur about one quarter of the total time. This return path 10 creates time efficiencies in a TED by limiting the functional operations for a given set of data to the minimum necessary operations for making decisions regarding that data set. On the other hand, if a peak is detected at decisional block 8, TED analyzes the peak pattern type at block 12.

With respect to the data pattern type analysis, block 6 timing for zero crossings begins before a peak is ascertained. Zero crossings are defined as minimum data patterns or troughs, where the middle number is less than the preceding and following samples.

The block 6 analysis retains memory of not just the data to detect a peak in decision block 8, but also of variables associated with the previous three peaks. It also keeps track of pointers to indicate for which raw data sample the peaks occurred (regarding the current and previous two peaks, i.e., the most recent three peaks). It may also indicate the amplitude of the peaks, and indicate pointers to zero crossings preceding each of the three peaks. This stored data is processed in block 12 in analyzing the peak pattern type.

Block 12 operations are synchronized with block 6 operations so the last three peaks, regardless of when they occurred, are passed. Pointers are used to indicate in time when they occurred. The last one usually occurs in nearly real time, (e.g., real time delayed by one data time interval).

Figure 16:
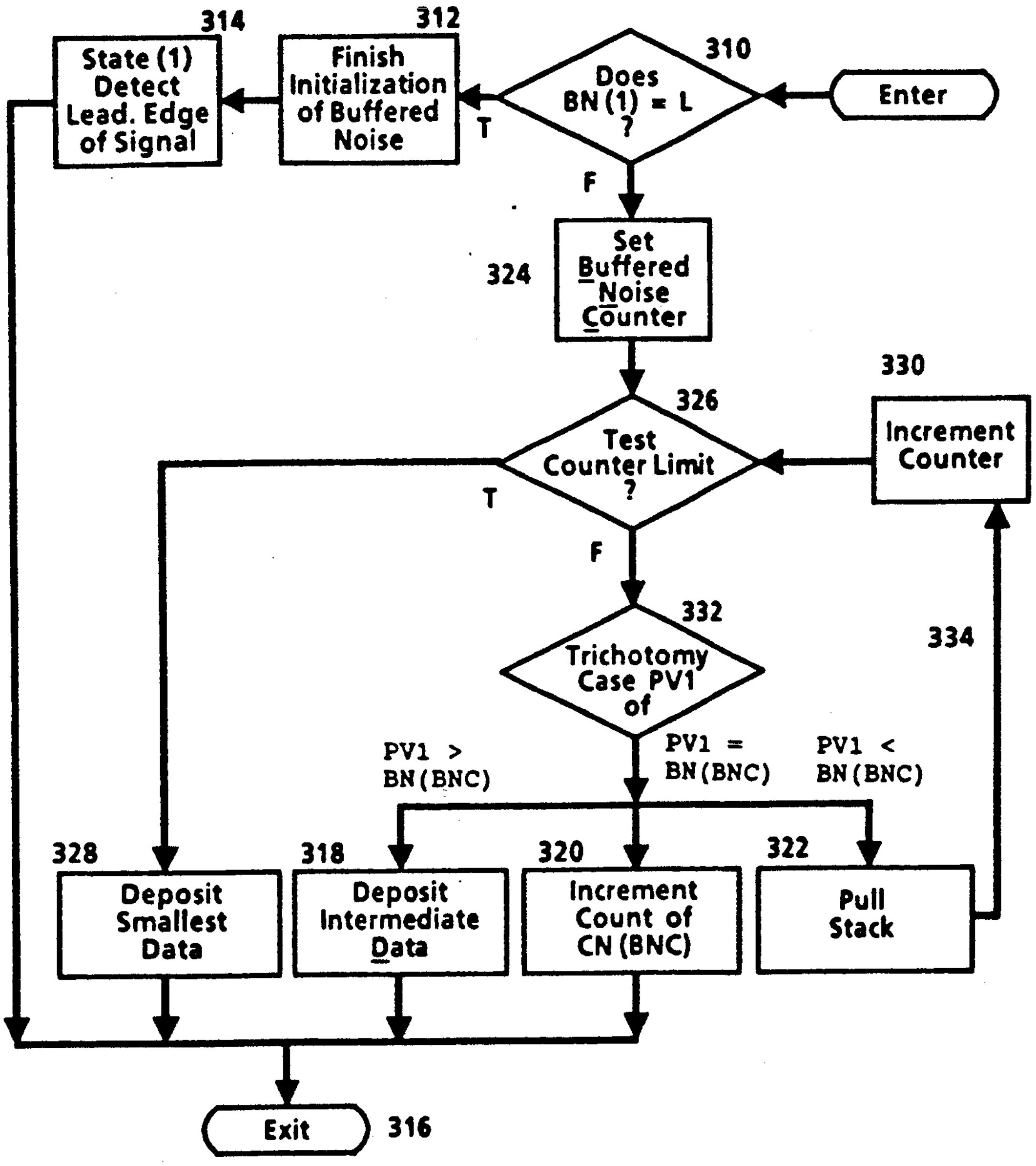
FIG. 16(A) is further detailed description of the state (0) initialize noise statistics block of FIG. 15.
FIGS. 16(B)(i) and (ii) demonstrate two stacks employed to maintain the noise statistics.

Analyzing peak pattern types generates signal state variable information. These state variables are then reset in block 14 and updated in block 16. A state variable indicates a signal state of detected signals in a TED. For example, after just being turned "on", the TED must "warm up" and accumulate some historical statistical data to determine such parameters as what is a short term disturbance or long term background noise. Such a state forces a buffer (or stack) to be filled with data, and then, for a time, the TED sorts subsequent observations and interprets everything coming in as noise. Such a pseudo-operation gets the TED measurement process started, and when this buffer is properly filled up, operation smoothly continues to the next state. All of these states have descriptive names with regard to these meanings. For example, this "warm-up" state is called Initialize Noise Statistics, further described in FIGS. 16(A), 16(B)(i) and 16(B)(ii).

Another exemplary state is called Detect Leading Edge of Signal. This means that TED is currently receiving noise (i.e., in the noise) and looking for a signal or the leading edge of a signal.

Thus, state variables are indications of major conditions that a TED is looking for. Both of these described states are noise conditions. A number of state variables will be discussed with regard to FIGS. 1-27. Some have more importance than others. Some provide a "window" access to the host computer. The window to the program is the state variable. These are called transitory state variables and indicate that something of relative importance has occurred.

Thus, the state variables may be viewed as the output of the transient episode detector (TED), along with some pointers to the episodic waveform in the data stream and some measurements usable to interpret the signals obtained.

The peak pattern type analysis of block 12 relates to different defined patterns. These may determine basic information such as whether the peaks are declining or ascending, or whether there is a minimum (min) peak or a maximum (max) peak. A min peak would occur when the middle peak is the smallest peak, and a max peak would occur when the middle peak is the largest peak. Ascending peaks means the most current peak is larger than the preceding, which also is larger than the preceding. This permits distinguishing between a rise up the side of a signal, small ripples along the side of the rise, from an upper-level portion of a signal. This information is designated "uptrend", "downtrend", "max" or "min", and it is typically the information used to decide how the state variables will be used.

In some cases, these are subdivided further. For example, there are defined sinking maximums or rising maximums. A sinking maximum is analogous to a check mark. The signal has dropped but subsequently risen though not as much as it dropped. The oldest point is defined as the barrier, and the signal did not extend over the barrier, but the ascending portion did so extend. Such a drop and subsequent great rise might indicate that something of significance is starting (e.g., the leading edge of a cycle).

Blocks 18 and 20 of FIG. 1(D) are representative of updating noise statistics. If it is desired that the noise statistics be updated (i.e., decision block 18 is TRUE), the noise statistics are updated at block 20. On the other hand, if the noise statistics are not to be updated, control is returned via path 24 to the accept and transmit data operation at block 2. Updating the noise is indicative of putting the noise signals into a large sort procedure to find out where detected noise signals rank relative to one another. A very efficient sort algorithm is used, but time demands still make it desirable to avoid having to rank every sample. Thus, a decision criteria is utilized to decide whether to update the noise (as further described below). Update Noise"thus means that selected noise data is used to update present noise statistics by putting the selected noise data into the sort, ranking it and recomputing related defined thresholds. This sort algorithm involves a positive feedback recursive bubble sort of significant non-redundant measurements of noise peaks, and is discussed in detail with regard to FIGS. 27(A), 27(B)(i) and 27(B)(ii).

At the conclusion of the update noise statistics function at block 20, flow path 22 is followed to accept new data and begin a new data processing flow. The same result would have occurred with flow path 24 if it were not decided to update the noise statistics. If all needed functions have finally occurred, exit is taken through point 26 at the conclusion of updating noise statistics.

The functions shown in FIG. 1(D) are sequentially-continuous and ongoing. FIG. 1(D) operation may typically interface with the host computer program(s) through the state variables and a "bell ringer" control function, while the FIG. 1(D) system may be continuing to examine a plurality of sensors. The transient episode detector (TED) with a single processor could be a continuous process which makes available in predetermined buffer memories updated state variables which are then accessible by another level of program and processor which examines the indicated stored data.

One way this may be accomplished with the bell ringer control is to output transitory state variables indicating something of relative importance has occurred, i.e., an interrupt-type signal). Interrupts generated within a transient episode detector may interrupt another program or some other process. A TED interrupt conveys state variable information to a host or dedicated object sensor indicating that a significant transient event has occurred, has been verified as "not noise", and has ended.

A system of object sensors/TEDs may be embodied as a plurality of synched microprocessors all operating simultaneously in parallel. The object sensor's function is to correlate certain features, pattern of features, or statistics of features to the probabilistic presence of a physical object or source which emits transient events with replicable characteristics. Operations may be based on a common clock so that object sensor/TED program packages run in parallel with each other. Higher level processing may then "look" at all of these parallel systems by examining the state variables emanating from all of them as asynchronous data signals. Periodically, the higher level processing may reach down into the TED level to update its state variable detections. This information may be suitably processed, causing the higher level processor to, in turn, make command adjustments of an overall system (e.g., aim a missile, change the direction of a boat or change a pen on a plotter table, or print output data). When "something" is detected as having happened, the supervisory control may increment an episode counter. When such counter is clustered on related object sensors, the supervisory control may be programmed to "know" it is time to obtain new state variable information, thereby forming a highly efficient interface between the parallel TED's and a host computer (i.e., supervisor control).

The foregoing is an overview of the FIG. 1(D) TED system. Each block will be further subdivided and explained in sufficient detail to permit one of ordinary skill in the art to generate specific program coding for a given system of data processors to establish all of the desired functions, or select various hardware/software combinations to achieve the same.

Figure 2:
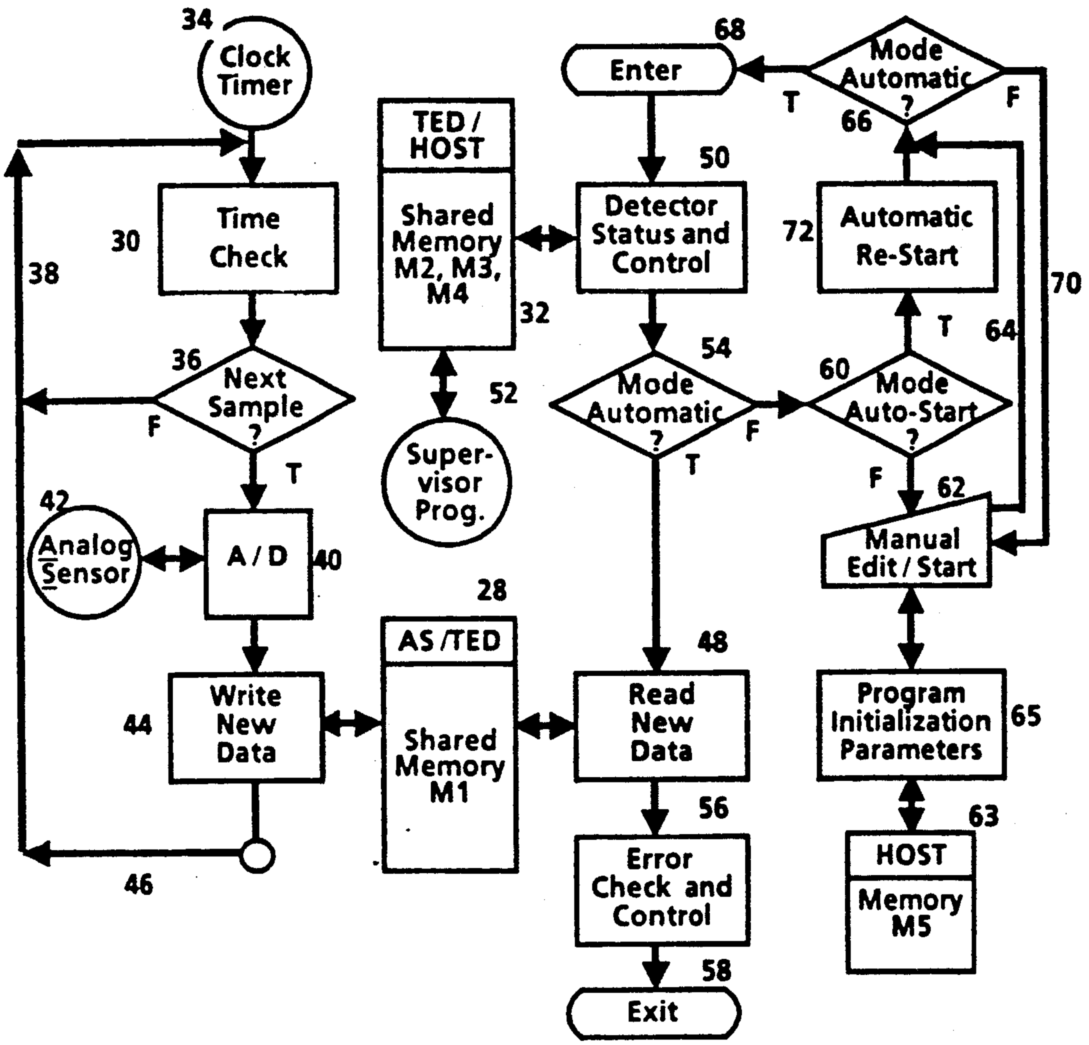
FIG. 2 is further detailed description of the accept and transmit data block of FIG. 1(D)

FIG. 2 is a schematic depiction of a dual processor system for synchronously sampling new digital data. The left hand side of FIG. 2 is the analog sensor interface; the right hand side represents the transient episode detector (TED) human interface; and the center path is the automatic mode by which TED synchronously accepts new data and transforms it into asynchronous object sensor source. The communication link between these two devices is accomplished through shared memory unit MI (28). There are two physically separate CPU units. At least two CPU's are necessary to accomplish the function of one analog sensor/TED pair. More than two could be used depending on selected data transmission rates and the speed with which the data stream arises. One tradeoff for accepting new data does not involve the operation of queuing, which is a conventional method of transferring data having several drawbacks, including coordination problems and losing large blocks of data to memory fill-up. The Ml memory is a circular buffer operating on a clock cycle so that a counter will alert the TED whenever it did not get back in time to collect some data. For example, if the sample counter in the transient episode detector receives the first sample, the second sample, the third sample and then the fifth, it "knows" that the fourth sample has been skipped because the TED didn't get back in time to collect all the data.

The full description of FIG. 2 is subdivided in further figures. For example, the time check function of block 30 of FIG. 2 is fully expanded in FIG. 3. The overall function of FIG. 2 will be described, and then each further defining figure will be separately discussed.

Five separate memories are established. Shared memory Mi (block 28) provides a circular buffer between an analog sensor and its uniquely associated transient episode detector. Shared memory 32 is subdivided or partitioned into three memories, M2, M3 and M4. The contents and operation of shared memory 28 are further discussed in connection with FIG. 5. The operation and contents of shared memory 32 are further detailed in the discussion of FIG. 6.

A global synchronous clock timer 34 provides clocking signals to time check device 30. Decisional block 36 performs a test to determine whether it is time to obtain the next sample. It should be noted that these functions are located solely within the TED. This operation is further defined in FIG. 3. A loop 38 returns decisional block 36 to the top of time-check 30 if insufficient time has passed for obtaining the next sample.

Once the determination is made that new data should be sampled, the A to D converter 40 is pulsed by the time-check device, and continuous (analog) data is fed from the analog sensor 42 leading to digital data subsequently being fed from the A to D converter 40 to the "write new data" function 44. The "write new data" function is further defined and explained in FIG. 4. This "write new data" function will require at least one microprocessing (or equivalent) unit, as is also the case for the time-check function of block 30. Accordingly, these two functions may require at least two physically separate microprocessor units.

The function of "write new data" block 44 is to place the obtained digital data in the circular buffer shared memory 28. Once this is accomplished for particular data, flow path 46 is followed and time-check function 30 is again initiated to obtain new digital data.

The shared memory 28 is accessed at an appropriate time by the function of "read new data" block 48. The general function of this process is to accept data, from the analog sensor via A/D, as input sensor into the transient episode detector for appropriate filtering and processing. This process is further defined with regard to FIG. 7.

Upon entering the operational sequence and function of the transient episode detector, the detector status and control function of block 50 is updated with regard to circular buffer shared memory 32. This detector status and control circuitry and function is equivalent to the "bell ringer" circuit control discussed above and is more fully explained with regard to FIG. 6.

The circular buffer shared memory 32 provides an efficient communication link between a transient episode detector and a host computer, with a supervisor program control provided at 52.

Once the "bell ringer" control (detector status and control 50) is completed, decisional block 54 will determine whether the transient episode detector remains in an automatic mode of operation. If no automatic mode of operation were indicated, auto start and auto re-start functions would be undertaken. Additionally, manual edit and restart provisions are made.

Figure 7:
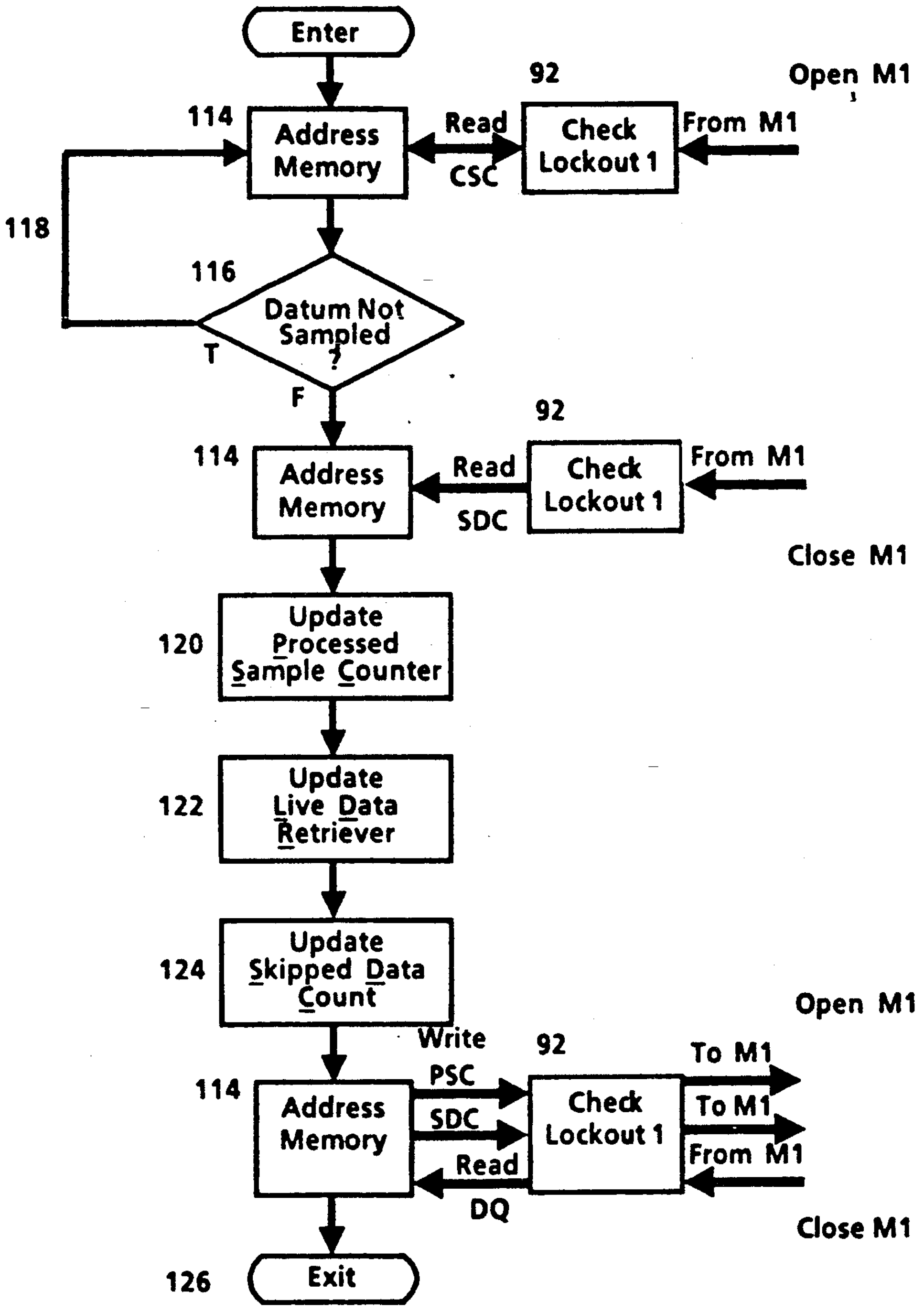
FIG. 7 is further detailed description of the read new data block of FIG. 2.

Whenever an automatic mode of operation is detected, the "read new data" function 48 of FIG. 7 is undertaken.

Completion of the "read new data" function causes the "error check and control" function of block 56 to be initiated. This is further described with regard to FIG. 8. Basically, the "error check and control" 56 monitors the number of skipped raw data measurements to prevent the transient episode detector from falling too far behind in making measurements. The subsequent processing of data in the transient episode detector requires variable amounts of time depending on the processing paths necessarily taken by individual samples. Accordingly, the circular buffer shared memory 28 consent is utilized to permit independent and automatic access by the transient episode detector to analog sensor outputs. However, this free and ready access must be limited to the extent that the transient episode detector is not permitted to fall behind too many samples. Error check and control 56 prevents this sort of mis-operation, and establishes an automatic or manual start mode if certain limits are exceeded with regard to missed or dropped samples. Exit 58 is taken whenever the error check and control functions are successfully completed.

If decisional block 54 determined that there was no automatic mode of operation, decisional block 60 would be checked to determine whether the "error check and control" function 56 had set the auto start mode TRUE or FALSE. A FALSE indication would indicate the necessity of utilizing the manual edit and start functions of block 62 (as further described with regard to FIG. 10) in conjunction with a shared memory file M5 (63) in providing interactive access to the host computer to obtain program initialization parameters (shown as block 65). Once the manual edit and start function 62 is completed, flow path 64 is taken and a second test for automatic mode is made in decisional block 66. If the manual edit and restart process was successful in establishing an automatic mode, the initial point of operation of the transient detector (enter 68) will be again undertaken. If however no automatic mode was generated by the manual edit and restart function 62, flow path 70 is taken and additional efforts are made manually.

Figure 9:
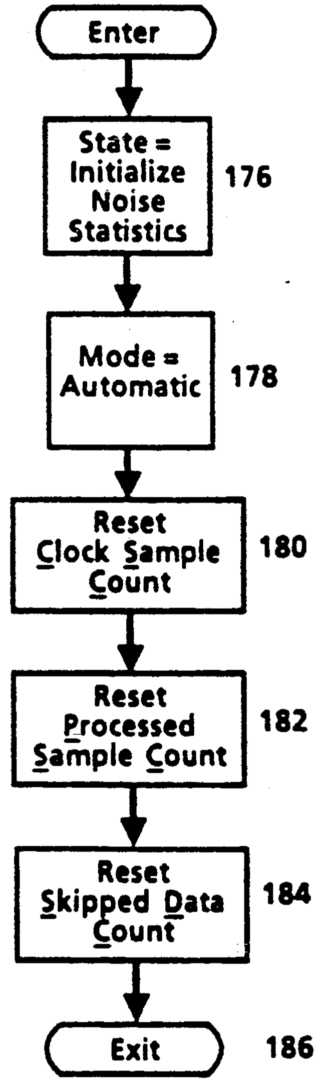
FIG. 9 is further detailed description of the automatic re-start block of FIG. 2.

If the automatic mode decisional check 54 indicated FALSE and the auto start mode decisional check 60 indicated TRUE, then automatic restart function 72 is undertaken (and further described with regard to FIG. 9). Completion of the automatic restart function 72 will again cause the second test of automatic mode 66 to be made, with the same functions therein as described above.

Figure 3:
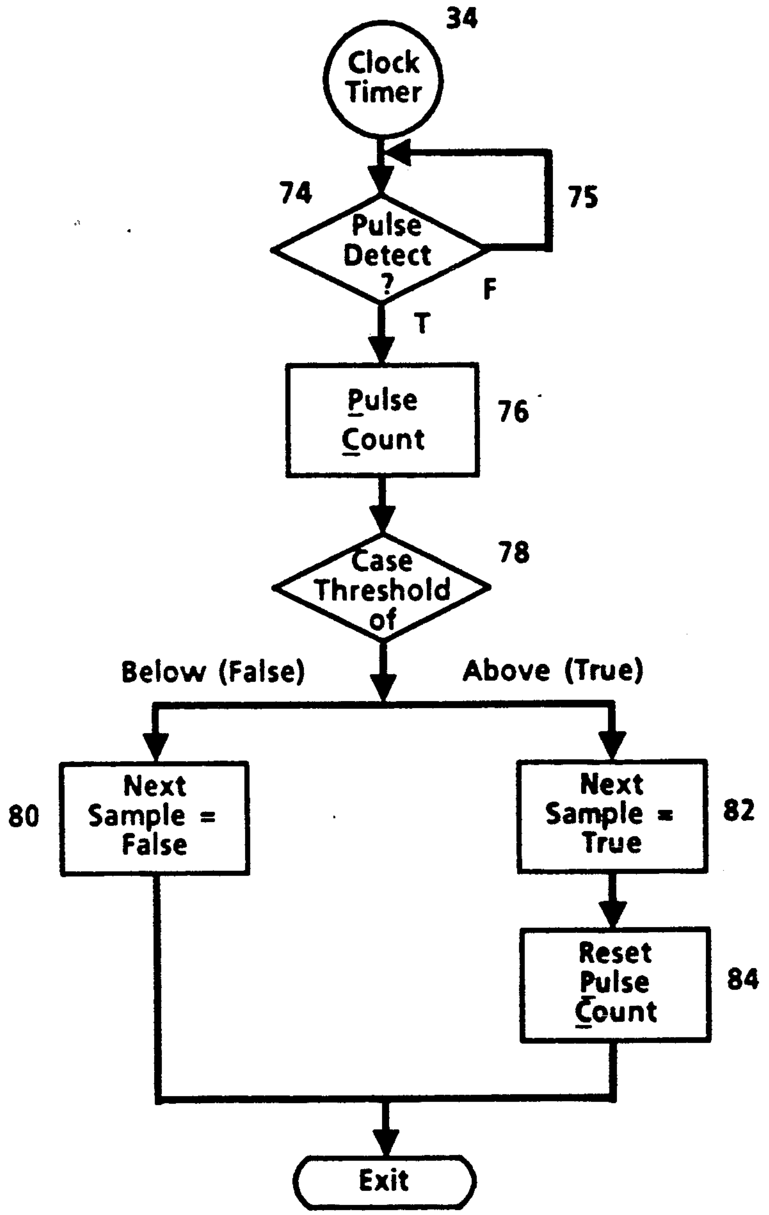
FIG. 3 is further detailed description of the time check block of FIG. 2.

Referring now to FIG. 3, the time check function 30 of FIG. 2 is described. This time check procedure utilizes a threshold concept in which threshold is defined as the number of consecutive clock pulses which will determine a data sample. Initialization for this time check function requires determination of the threshold (i.e., establishment of a sampling rate) and initializing a pulse count PC to zero. The clock timer 34 functions as a clock pulse source to pulse detect decisional block 74. A simple loop 75 is utilized if a pulse is not yet detected from clock timer 34. Once a pulse is detected, the pulse count (PC) is updated in block 76 (i.e., $PC=PC+1$) and then this pulse count is compared with the established threshold and decisional block 78. If the pulse count is below the established threshold (i.e., fixed number of pulse counts used to time a sampling rate), the next sample block 80 establishes the next sample decisional block 36 of FIG. 2 as FALSE. Whenever the pulse count reaches or is greater than the threshold, the next sample functional block 82 establishes the next sample decisional block 36 of FIG. 2 as TRUE, and the reset of the pulse count to zero is handled by block 84. Either of these flow paths cause an exit from the time check function 30. However, as can be seen in FIG. 2, whenever the next sample indication is FALSE, loop 38 returns the sequence to the beginning of time check 30. A TRUE indication from next sample determination 36 will cause the A/D converter 40 to process the continuous data from the analog sensor into digital data, and pass the same to "write new data" function 44.

Figure 4:
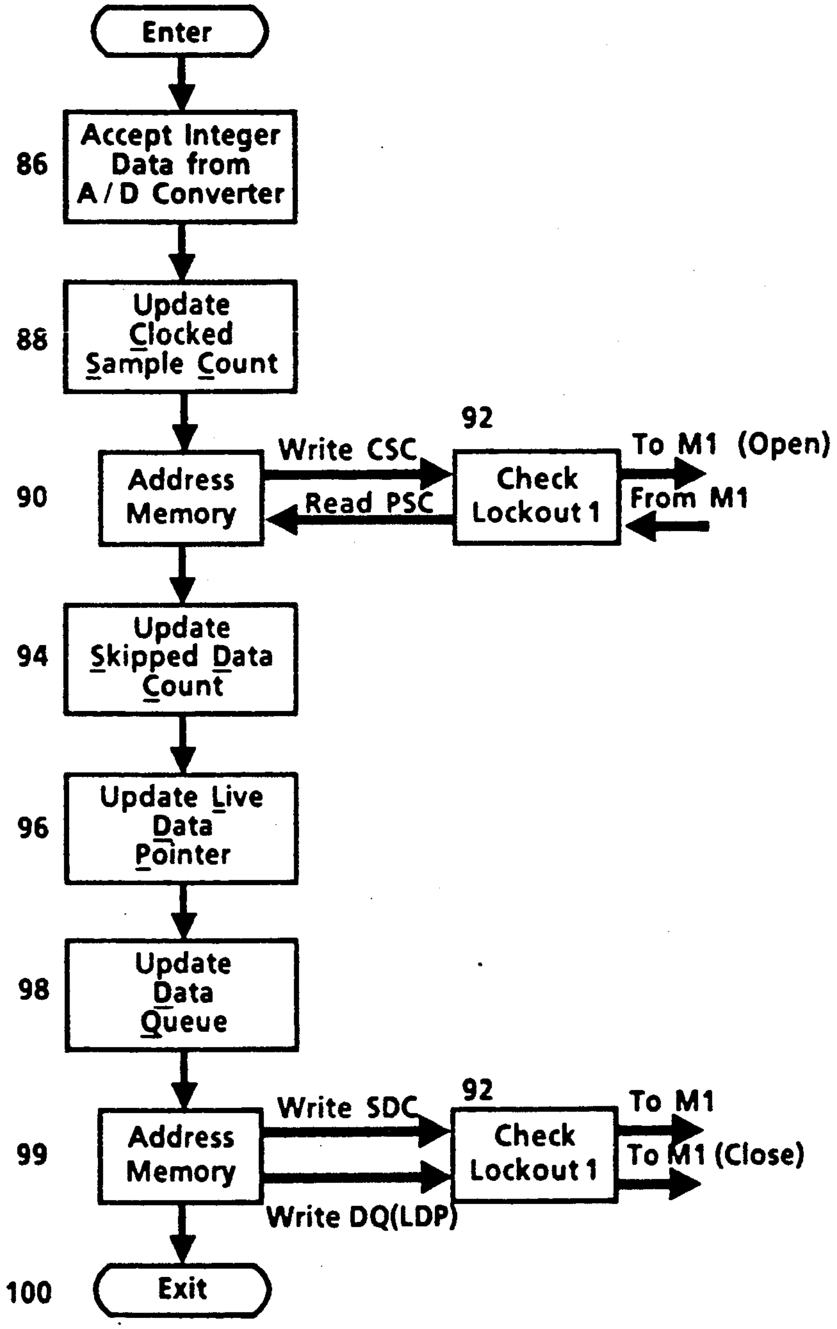
FIG. 4 is further detailed description of the write new data block of FIG. 2.

The "write new data" function 44 is further defined in detail with regard to FIG. 4. Upon entering the process described at FIG. 4, certain initializations are undertaken. The live data limits (LDL) are established, the clocked sample count is initialized to zero (i.e., $CSC=0$), the processed sample count is initialized to zero (i.e., $PSC=0$) and the skipped data count is set equal to zero (i.e., $SDC=0$). The symbol D is defined as integer data which is accepted from the A to D converter 40, as is shown in block 86. The clocked sample count is incremented (i.e., $CSC=CSC+1$) in block 88 in response to the reception of integer data from the A to D converter 40. These materials are then processed through the address memory 90 wherein the clocked sample count is written to circular buffer shared memory MI (28) and the processed sample count is received from Ml. The communication link between the address memory 90 and shared memory M1 (28) is processed through check lock-out 1, functional block 92 of FIG. 4. This check lock-out 1 function is further defined in FIG. 5.

Following this exchange of information with shared memory MI through check lock-out 1 block 92 the skipped data count is updated at block 94. This will always be zero inasmuch as the skipped data count is defined as the maximum of either zero or the live data count minus the live data limit (i.e., $SDC=Max\{0, LDC-LCL\}$). If the live data count exceeds the live data limit, then data samples have been skipped. Such skips are monitored by this skipped data count of functional block 94. The live data count utilized in this calculation for the skipped data count is defined as the clocked sample count minus the processed sample count which was received from shared memory (i.e., $LDC=CSC-PSC$). Functionally then, block 94 determines how many counts may have been skipped and continues to track that information for subsequent processing to the transient episode detector. The transient episode detector contains therein functions which will operate on the skipped data count to insure that certain limits are maintained with regard to the total number of counts which may be skipped (i.e., how far the transient episode detector will be permitted to fall behind in operation of processing incoming data samples).

Once the skipped data count is updated, the live data pointer is updated in functional block 96. The live data pointer (LDP) is used to place new data on the circular buffer shared memory M1 for subsequent pick-up by the transient episode detector as soon as their detector is capable of processing the new data. The transient episode detector may be running behind because of long processing cycles, and the live data pointer is utilized to indicate where the transient episode detector should return to and that it has not exceeded certain limits in falling behind. The live data pointer is defined as the circular buffer addressing of the clock sample count and live data limit function (i.e., $LDP=MOD\{CSC, LDL\}$).

The data queue count is updated in block 98 to accurately reflect which data is established at what point by the live data pointer (i.e., $DQ(LDP)=D$).

Once these three updates are completed, the address memory is again ready to communicate with the shared buffer memory Ml at block 99 through the check lock out 1 at block 92. This time, the address memory writes (at block 99) the skipped data count and data queue for a particular live data pointer to shared memory M1 through the check lock out 1 (block 92). The information is passed on to the shared memory M1, and then the address memory is closed after the transaction and exit is taken through 100 back to the FIG. 2 flow paths. The double lines indicated between the address memory block 99 and the check lock out 1 block 92 and shared memory M1 indicate fast direct access data lines.

It should be noted that the shared memory M1 buffer contains three separate values which include the lock out bit, the clocked sample count and the data word itself. These values, at least, are transmitted by the write new data functional block 44 of FIG. 2 through the shared memory 28 to the transient episode detector.

Figure 5:
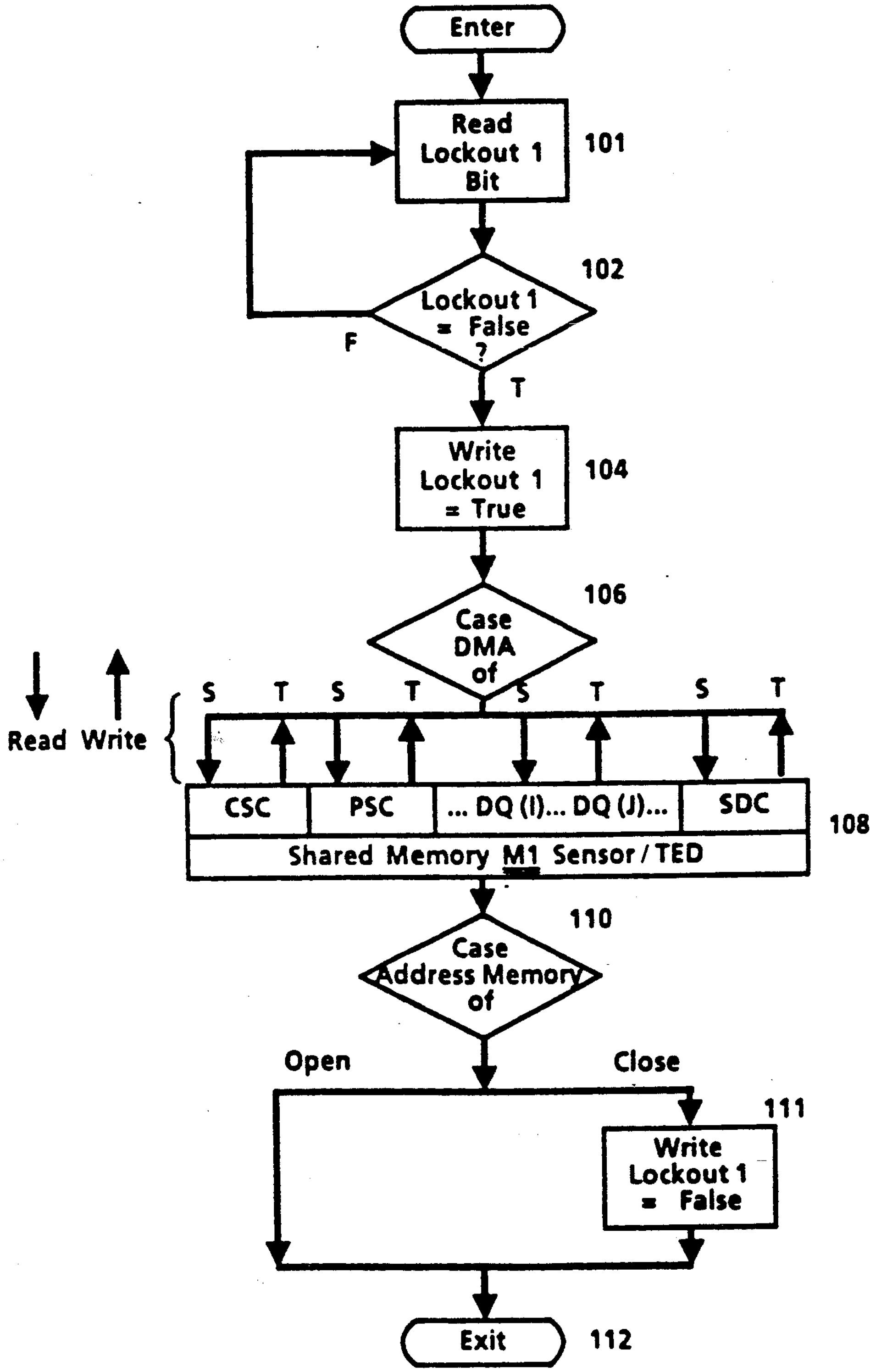
FIG. 5 is further detailed description of the check lock out I block of FIG. 4.

The lock out feature of the shared memory is further defined with regard to FIG. 5. This feature permits access by either the left or right hand side of FIG. 2 by allowing only one side at a time to access the memory. Thus, the two sides are effectively prevented from interfering with each other and their memory operations. Whenever lock out is TRUE, repetitive reads are initiated until access is obtained (i.e., lock out is set to FALSE). When access is obtained by one side, the remaining side is locked out until the first side has completed its transaction with shared buffer memory 28. The time to engage or disengage the lock out feature is established as very short compared to the time necessary to read or write to the memory. This fast lock engagement time reduces the possibility of there being interference at this point between the two sides of FIG. 2. Generally, only a fraction of one program memory access time in involved with the lock feature itself.

Referring now specifically to FIG. 5, certain initializations occur upon entering the check lockout 1 function of FIG. 5. The lockout 1 bit is set to FALSE, and the processed sample count (PSC) and the clocked sample count (CSC) are set to zero. The lockout 1 bit is read at block 101. Access to memory MI is permitted only whenever the lockout 1 bit is FALSE (see decisional block 102). If the lockout 1 bit is TRUE, access is denied and control is fedback to block 101. If access is granted (i.e., lockout I bit is FALSE at block 102), then the lockout 1 bit is established as TRUE in block 104 and direct memory access (DMA) is undertaken in accordance with decisional block 106. The sensor/TED interface shared memory 108 of FIG. 5 indicates the flow direction of particular counts (i.e., clocked sample count (CSC), processed sample count (PSC), skipped data count (SDC)) and data (i.e., data queue) between the transient episode detector (indicated as T) and analog sensor (indicated as S). These items and flow paths were set forth in FIG. 4, and are the same here in interface 108. Decisional block 110 checks to see whether memory Mi is open or closed. If the memory M1 is open, exit is made through exit 112. On the other hand, if the memory M1 is closed, the lockout 1 bit is set to FALSE at block 111 and then exit is made through exit 112. The memory is closed while it is being written to by the sensor or being read by the transient episode detector. Upon exiting through exit 112, return is made to the appropriate FIG. 4 functions.

Referring now to FIG. 7, the read new data function 48 of FIG. 2 is similar to the write new data function 44. Upon entering FIG. 7, the address memory of the transient episode detector reads at block 114 the clocked sample count from shared memory M1, which is open, through the check lockout at block 92. The processed sample count is compared with the clocked sample count to determine whether they are equivalent in decisional block 116, and the address memory is subsequently read through flow path 118 whenever a match is determined. Whenever no match is determined, the address memory reads the skipped data count from shared memory M1 through the check lockout at block 92, and shared memory M1 is then closed. Once this flow path is taken, three update functions will be performed. First, in block 120, the processed sample counter is updated by setting the new value equal to the previous processed sample counter value plus the skipped data count plus one (i.e., PSC=PSC+SDC+1). This counter indicates the sample number of the data processed so that skipped data points in the transient episode detector may be determined if the detector is functioning too slowly as compared with the rate of data input. Secondly, in block 122 the live data retriever is updated. This retriever is a pointer to permit acceptance of new data from the analog sensor. The MOD function of block 122 (i.e., LDR=MOD{PSC, LDL}) indicates that the circular buffer shared memory is being handled in this updated value. Finally, in block 124 the skipped data counter is initialized to zero (i.e., SDC=0).

Address memory 114 then again functions to write the updated processed sample counter and skipped data count to shared memory M1 through check lockout at block 92, which has opened shared memory M1 to make such transaction possible. The data queue is read from shared memory MI back to the address memory 114 of the transient episode detector, and the shared memory M1 is closed by check lockout 1 at block 92. Exit is then made through exit 126 and return is made to the appropriate portion of FIG. 2.

Figure 6:
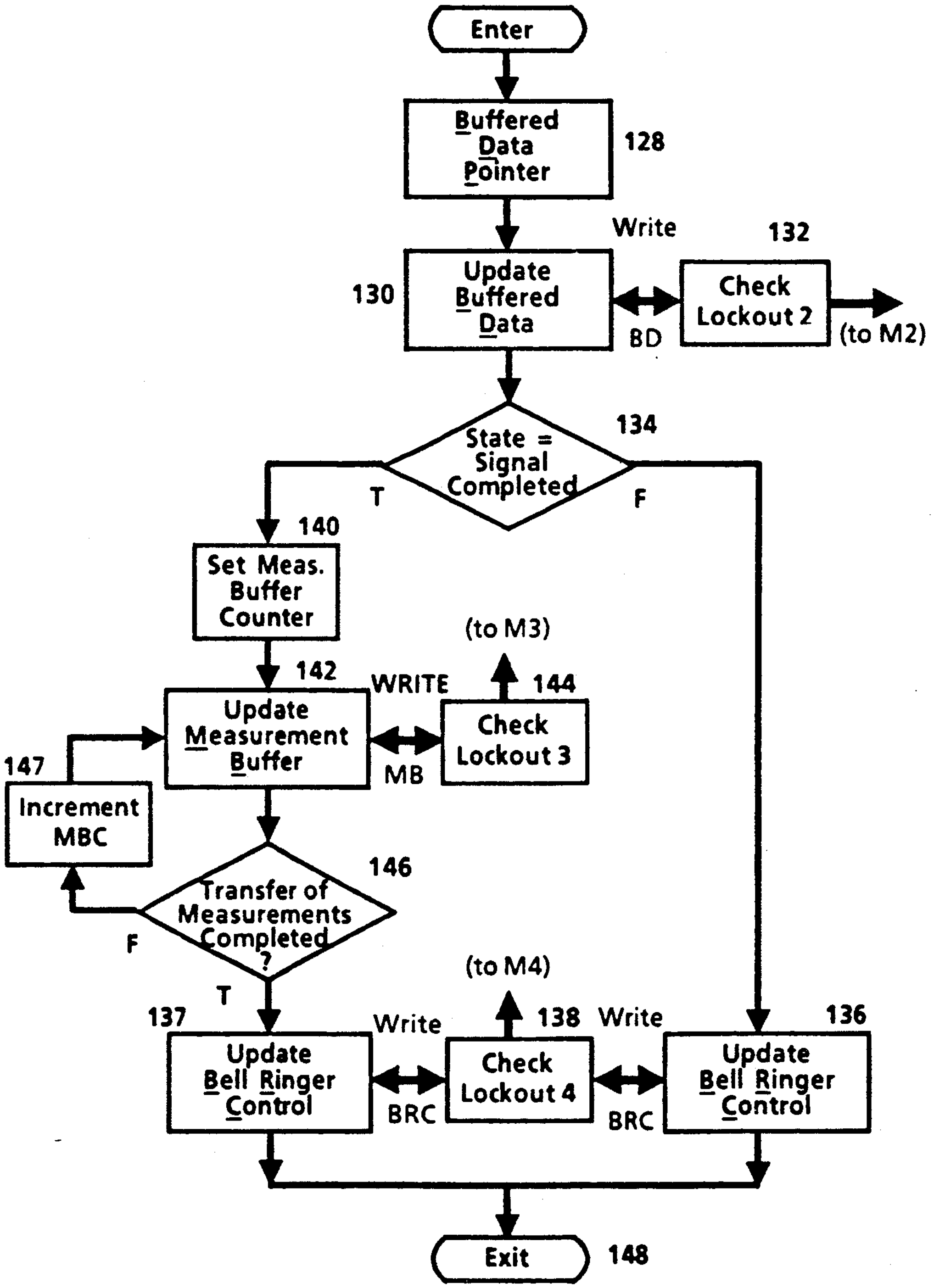
FIG. 6 is further detailed description of the detector status and control block of FIG. 2.

As may be seen in FIG. 2, the read new data function 48 will not be undertaken until the detector status and control 50 and mode determination 54 has been accomplished. Referring now to FIG. 6, the detector status and control function 50 is expanded in detail with regard to the partitioned circular buffer shared memory 32. Several initialization items are necessary upon entering FIG. 6, the bell ringer control BRC(1) is set equal to FALSE, the measurement buffer counter (MBC) is set equal to zero and the buffered data limit (BDL) default is set equal to 1024. The measurement buffer limit (MBL) is set equal to 21 for default, lock outs 2 and 3 are set equal to FALSE, and the present state is established as initialize noise statistics (to be discussed further in detail below). The buffered data pointer is established as a function of the processed sample count and buffered data limit at block 128 (i.e., BDP=MOD{PSC, BDL}). The buffered data is updated at block 130 by setting the buffered data equal to X, which is defined as the most recently accepted new data from the sensor via the circular memory position DQ(I) with the pointer live data retriever as defined in FIG. 7 (i.e., BD(BDP)=X). The buffered data is transmitted through check lockout 2 (functional block 132) to the partition memory M2 of shared memory 32. The memory position M2 is written by the transient episode detector and read by the host computer. The function of check lockout 2 is analogous to that of check lockout 1, which was fully discussed with regard to FIG. 5.

Once the buffered data update is completed, the decisional block 134 determines whether the present state has been established as signal completed. A FALSE indication will cause the update of the bell ringer control at block 136 directly, with subsequent processing by the fourth check lockout 4 (functional block 138) which is dedicated to and writes to partition memory M4 of shared memory block 32.

A TRUE indication in decisional block 134 will cause certain sets and updates to be completed before the bell ringer control at block 137 is updated. The measurement buffer counter will be set equal to zero in block 140 (i.e., MBC=0) and the measurement buffer is updated at block 142 (i.e., MB(MBC)=SMA(MBC)). After the measurement buffer is the check lockout 3 (functional block 144) writes to partition memory M3 of shared memory 32. At decisional block 146, it is determined whether transfer of measurements into memory partition M3 is completed. That is, it is determined whether the measurement buffer count has reached the measurement buffer limit (i.e., Has MBC=MBL?). If transfer is not yet completed, the measurement buffer count is incremented at block 147 (i.e., MBC=MBC+1). Accordingly, a loop is established to increment the measurement buffer count MBC until the measurement buffer count becomes equal to the measurement buffer limit MBL. The bell ringer control is updated in block 137 upon completion of the transfer measurements, and data is written to memory partition M4 via check lockout 4 at block 138. Exit is made through exit 148 and returned to the appropriate portion of FIG. 2.

The bell ringer control indicators may take eight different values: BRC(0)=TRUE; BRC(1)=LP; BRC(2)=SMA(0); BRC(3)=SET; BRC(4)=PSC; BRC(5)=SPC; BRC(6)=VPC; and BRC(7)=NPC. The most important of these indicators are the first two which include a TRUE flag to indicate that an appropriate signal is obtained and ready to be transmitted and a largest peak indication so that the host computer may check all of the parallel transient episode detectors to determine which has the largest peak information available, and therefore most likely the most significant signal information. The host computer may then select the particular transient episode detector which has the largest peak signal information indicated by the bell ringer control BRC(1).

After completion of the detector status and control function 50 and the decisional check for automatic mode 54, the read new data 48 is completed and the error check and control function 56 of FIG. 2 is undertaken. This is further defined and detailed in FIG. 8. The purpose and function of error check and control 56 is to examine the skipped data count (SDC), which indicates the number of drop out samples which have occurred, and then set the modes of operations accordingly.

Figure 8:
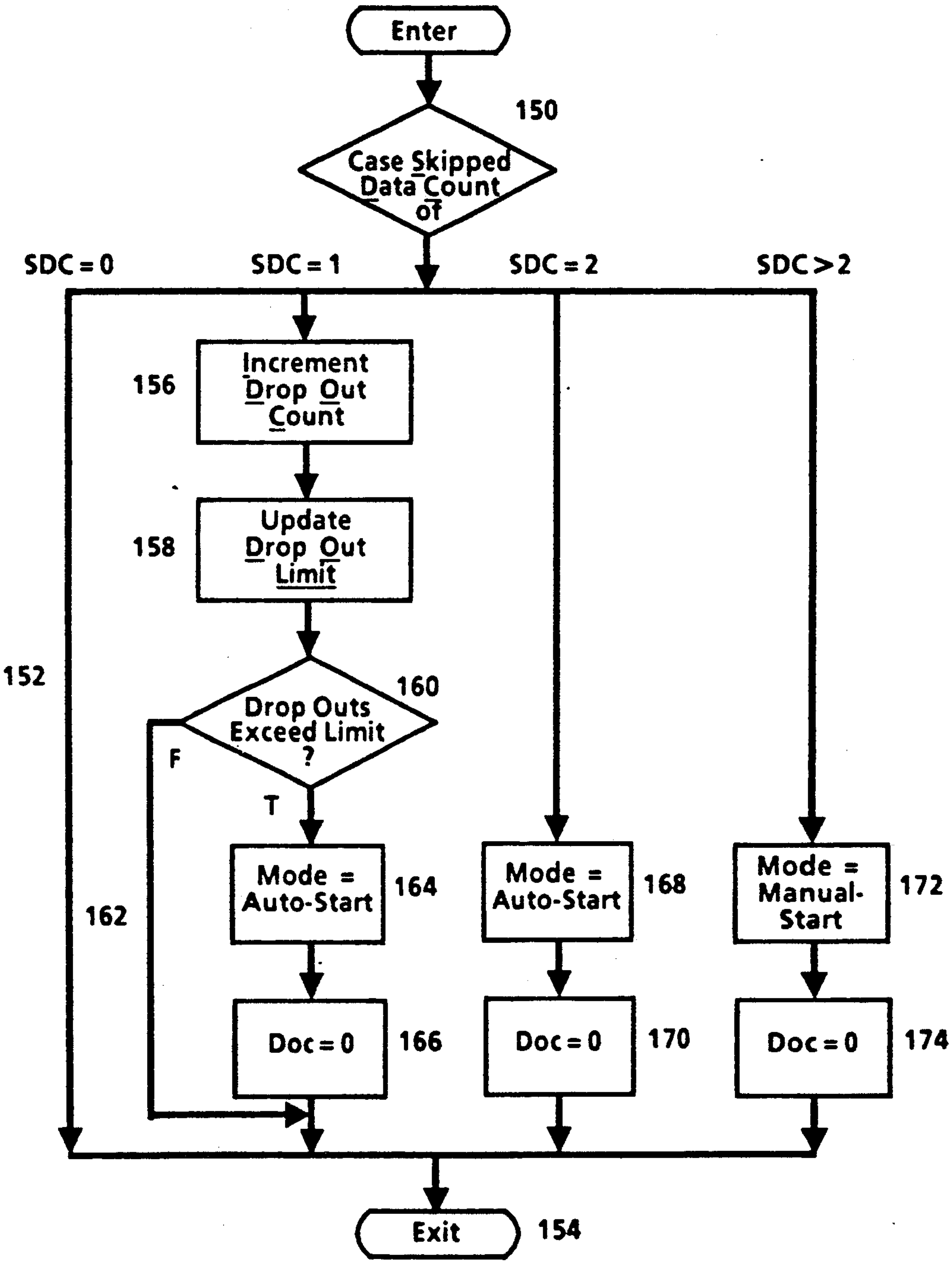
FIG. 8 is further detailed description of the error check and control block of FIG. 2.

Upon entering the error check and control functions of FIG. 8, decisional block 150 determines what case of skipped data counts exist. Four cases are defined as skipped data count (SDC) equal to zero, one, two or greater than two. An SDC equals zero indicates that no data has been skipped and flow path 152 is followed to immediately exit via exit 154 and a return to the appropriate portion of FIG. 2. If SDC equals one, the drop out count is incremented by one in function block 156 (i.e., DOC=DOC+1) and the drop out limit is updated at block 158 by multiplying the initialized drop out factor times the clocked sample count (i.e., DOL=-DOF * CSC). The drop out count (DOC) was initialized to zero at the beginning of the flow of FIG. 8 and the drop out factor (DOF) was initialized to a default of $(2)^{-10}$. After updating the drop out limit at block 158, the drop out count is compared with the drop out limit in 160 to determine whether this limit is exceeded (i.e., Is DOC≧DOL?). If the limit is not exceeded, flow path 162 is followed, and again an exit 154 is taken as occurred with regard to flow path 152. If the drop out count does match or exceed the drop out limit, the mode flag is set to auto-start at block 164, which is eventually checked at decisional block 60 of FIG. 2, and the drop out count is reinitialized in block 166 to zero. Exit is then made through exit 154.

If the skipped data count is equal to two, the processor is immediately set to start over automatically without the necessity of comparing the drop out count with the drop out limit. That is to say, the mode is automatically set equal to autostart at block 168 and the drop out count is reinitialized to zero at block 170. If SDC is greater than 2, the entire function of the transient episode detector in obtaining data samples from the analog sensor is considered to have failed and the mode is set to manual restart at block 172, which is the functional equivalent of block 62 of FIG. 2. The drop out count is then reinitialized to zero block 174 and exit is made from this final possible case through exit 154 to the appropriate portion of FIG. 2.

As may be seen from FIG. 2, the automatic re-start function 72 is undertaken whenever the test for mode in decisional block 60 indicates that the auto-start mode is set to TRUE. Referring now to FIG. 9, the automatic re-start begins operation with function 176 by setting the current state equal to initialize noise statistics. This is followed by function 178 which resets the mode as equivalent to automatic. At this point, the mode is set FALSE with regard to automatic, or otherwise the decisional block 54 of FIG. 2 would not have permitted the flow control to reach the automatic re-start 72 of FIG. 2. The remainder of the automatic re-start operation of FIG. 9 comprises additional resets. The clocked sample count is reset to zero at block 180, the processed sample count is reset to zero at block 182, and the skipped data count is reset to zero at 184. Exit is then made through exit 186 to the appropriate portion of FIG. 2.

Figure 10:
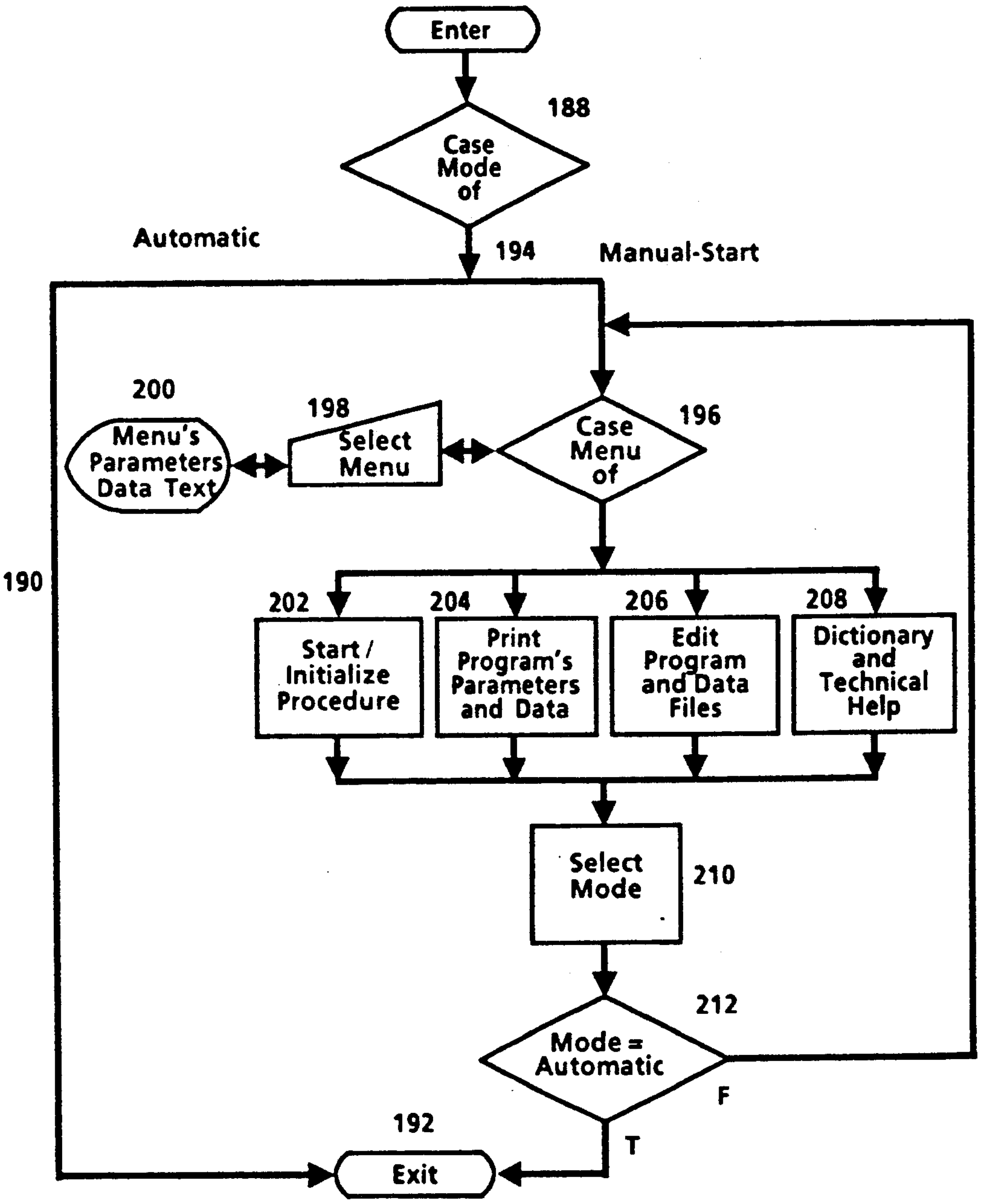
FIG. 10 is further detailed description of the manual start block of FIG. 2.

If the decision block 60 test of FIG. 2 indicated that the mode was FALSE with regard to auto-start, the manual edit/start function 62 of FIG. 2 will be undertaken. Referring now to FIG. 10, the details of the manual edit/start function are shown. Upon entering the FIG. 10 functions, decisional block 188 positively determines that the manual-start mode is appropriate. If the automatic mode is still indicated, then flow path 190 is taken to immediately exit through exit 192 and return is made to the decisional block 66 of FIG. 2 which will forward control under the automatic mode. However, if the manual edit/start mode is indicated, flow path 194 is followed and a early indication of the selected interactive procedure is tested in decisional block 196. A manual user indicates through select menu function 198 and the menu parameters data text 200 which functions will be undertaken. Manual edit procedures 202 through 208 show at least four different interactive procedures which may be determined. These include start/initialize procedures at block 202, print program's parameters and data at block 204, edit program and data files at block 206 and dictionary and technical help at block 208. At this point, the operator is in complete charge of selecting subsequent error check modes. For example, by printing all of the parameters and data, a dump of everything that is present may be obtained so that detailed operational checking may be undertaken. The manual user may then edit the existing functions to change algorithms or parameters being used (for example, change certain thresholds).

As may be seen from FIG. 2, the M5 buffer provides a file of program initialization parameters which the manual user may interact with in a debugging operation of the transient episode detector.

Upon completion of editing by an operator, menu driven initialization is performed to ensure that all parameters are initialized, or otherwise a default might occur. That is to say, the re-start mode of FIG. 10 is initialized to be certain that all parameters are properly initialized. This may be accomplished by the operator setting the mode select to automatic in block 210 of FIG. 10, whereupon decisional block 212 causes operation to exit and completely return to the automatic mode. That is to say, in mode select 210 the overall operational state of the transient episode detector is returned to automatic, and then this portion is exited through exit 192 Thus, on FIG. 2 the manual edit/start portion 62 returns through 66 to achieve full restart.

On the other hand, if mode select is not set to automatic in block 210, but remains at manual-start, operation is returned from decisional block 212 to the decisional block 196.

One consequence of being in these various restart modes of FIG. 2 is that particular transient episode detector (TED) will be off-line. The effect to the host computer maybe greatly reduced if a plurality of sensors are being operated in parallel, thus providing redundancy in the system. A failure of a single sensor would then not be critical. The remainder of operating sensors would continue to detect transient disturbances while the failed sensor could be properly restarted. A plurality of failed sensors also might not be critical, depending on the actual number or percentage of failures. A failure of the entire system would be a function of the supervisory program (host computer) which is looking at all of the objects sensors simultaneously. Thus, the terminal displaying the select menu of block 198 of FIG. 10 could also be used by a supervisor operator to monitor the percentage failure of sensors to determine the overall operating efficiency and reliability of the parallel combined sensor network.

Referring to FIG. 1(D), once the accept and transmit new data block 2 is functionally completed, the data prefilter block 4 performs the first processing on this data. The details of data prefilter block 4 are shown in FIG. 11(A).

Upon beginning the prefilter operation (with the new data defined as N), loop control LC is set to condition TRUE at block 213. Then, one of three cases of band pass filtering may be chosen as indicated by the data prefilter control decision block 214. A broad band case illustrated by block 215 passes all frequencies in a wide pass band of many octaves without amplitude distortion; an intermediate case illustrated by block 216 passes an octaves-range from one to several octaves bandwidth; or a narrow band case illustrated by block 217 passes a fraction of an octave or a small fixed bandwidth. The output of the filter bands are input to the differential analyzer 218 which is described in more detail in reference to FIG. 11(B).

At decision block 219, if the loop control LC condition is still TRUE, then the data prefilter operation is repeated by the feedback loop. On the other hand, if the loop control LC condition is FALSE, then the data prefilter operation is exited.

Multiple passes through the data prefilter can be preset upon initialization. Each pass splits the continuous analog sensor data into digitized data confined to separate and different frequency bands. Thus, data input by analog sensors are split into independent data channels processed in parallel by TED. Each channel is sampled at a rate, T, appropriate to the band width of the filtered channel, f; wherein, $fT=\frac{1}{2}$, and each sample is an independent degree of freedom statistic under the assumption of input data which is white random data. Due to certain overlaps of the bands of filtered sensor data, the amount of information processed is increased but less than twice that of a single broadband case.

FIG. 11(B) shows the differential analyzer block 218 of FIG. 11(A). In this exemplar, the zero'th, first, and second difference operators are calculated.

Upon entering the differential analyzer, the data $D_1^0$ is updated in block 218(*a*). Data value D2 is set equal to data value D1, data value D1 is set equal to data value D0, and data value D0 is set equal to new data N Therefore, data value D0 always represents the present data, data value D1 represents the previous new data and data value D2 represents the second most previous new data. Thus, operation is always based on the present sample plus the two most previous samples.

At block 218(*b*), the first differential values $D_i^1$ are updated and computed The first difference FD2 receives the value previously stored at first difference FD1, i.e., FD2=FD1. The first difference FD1 receives the value previously stored at first difference FD0, i.e., FD1=FD0. The new first difference is computed as the difference between the data values D0 and D1, i.e., FD0=D0−D1.

At block 218(*c*), the second difference values $D_1^2$ are updated and computed. Second difference SD2 is updated to the value previously stored as second difference SD1. Second difference SD1 is updated to the value previously stored as second difference SD0. Finally, second difference SD0 is computed as the difference between the first difference values FD0 and FD1, i.e., SD0=FD0−FD.

It should be noted that the second difference operations require only straightforward subtractions, which may be accomplished very rapidly in hardware, thereby preserving maximum efficiency. Furthermore, to obtain the two most previous data D1 and D2, first differential values FD1 and FD2, and second differential values SD1 and SD2, the next most recent data and values are simply restored as these later data and values. For example, to obtain data D2, next most recent data D1 is simply restored as data D2. This is done prior to establishing the new D1 (which then takes on the "old" next most recent data D0). Thus, all values are bumped by one notch. This is known as a recursive sort, a highly efficient sorting process, which is also used in other functional areas of the TED.

Following the updating of the differential operations, the case selected at decision block 218(*d*) generates a detection statistic for each frequency band split channel. Cases which may be selected include a differential operator at blocks 218(*g*)–218(*i*); a differential equation with constant coefficients, a,, at block 218(*f*); or a differential vector operator, where the $m^{th}$ differential operator is a measured component of the band split channel, at block 218(*e*). The selection of the differential operator coefficients is defined by the operator during set up.

At block 218(*j*), the absolute value of the outputs of the selected case of differential operators blocks 218(*g*)–218(*i*) and differential equation block 218(*f*) is calculated. This operation simply requires changing all signs to positive, which may be preformed very fast in hardware. The absolute value of the outputs of the selected case of vector differential operator blocks 218(*e*) is not calculated. Upon conclusion of the differential analyzer operation in FIG. 11(B), control is returned to block 218 in FIG. 11(A).

Upon exiting the data prefilter of FIG. 11(A), return is made to the analyze data pattern type block 6 of FIG. 1(D). The analyze data pattern type function at block 6 will operate on the most recent three data samples. The analyze data pattern type block 6 of FIG. 1(D) is further detailed in FIG. 12.

Figure 12:
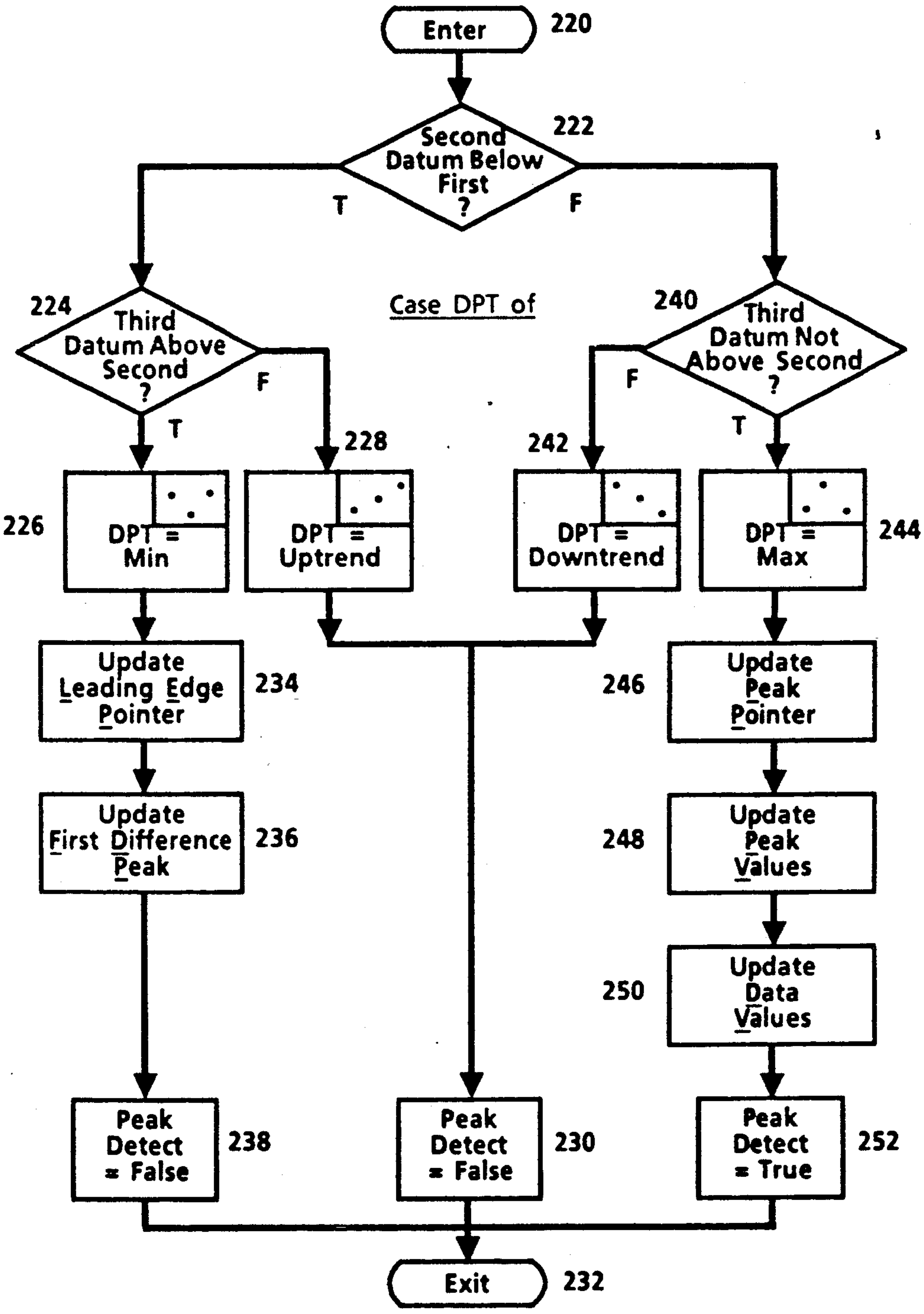
FIG. 12 is further detailed description of the data pattern type analysis block of FIG. 1(D)

Upon entering FIG. 12 at 220, a sort algorithm is followed to determine the data pattern type (DPT) in accordance with defined equations Straightforward mathematics is utilized in defining four basic terms These are minimum (min), downtrend, uptrend and maximum (max). These definitional equations are as follows:

| | |
|---|---|
| Min | ASD2 > ASD1 < ASDO |
| Downtrend | ASD2 > ASD1 ≧ ASDO |
| Uptrend | ASD2 ≦ ASD1 < ASDO |
| Max | ASD2 ≦ ASD1 ≧ ASDO |

where ASD0 represents the absolute second difference of the first most recent datum value, ASD1 represents the absolute second difference of the second most recent datum value, and ASD2 represents the absolute second difference of the third most recent datum value.

FIG. 12 sorts the data in accordance with the four data pattern types as defined. Decisional block 222 determines whether the second most recent datum is below the first most recent datum (i.e., ASD1<ASD0). A FALSE indication causes the right hand flow path to be taken while a TRUE indication causes the left-hand flow path to be taken. In the case of a TRUE indication, a subsequent decisional block 224 determines whether the third most recent datum is above the second most recent datum (i.e., ASD2>ASD1). A TRUE indication from this decisional block indicates a data pattern type of a defined minimum in accordance with functional block 226. A FALSE indication from decisional block 224 defines a data pattern type of an uptrend as shown in 228. The third point shown on blocks 226 and 228 (and blocks 242 and 244 discussed below) is the first most recent datum value, the second point is the second most recent datum value, and the first point is the third most recent datum value. It is illustrated in this manner to view past to present as left to right as is conventional for time line representations.

If an uptrend is indicated, the peak detect is set equal to FALSE, at block 230 and exit is made through exit 232 and return is made to peak detect 8 of FIG. 1(D).

If a minimum data pattern type was indicated by block 226, several updates will be made at blocks 234 and 236, and then the peak detect will be set equal to FALSE at block 238 and exit is taken through exit 232. The first update, indicated in block 234, is an update of the leading edge pointer (LEP). LEP2 is set equal to LEP1, LEP1 is set equal to LEPO and LEP0 set equal to the processed sample count minus one (i.e., LEP0=PSC−1). In block 236, the first difference peak is updated. Accordingly, FDP2 is set equal to FDP1, FDP1 is set equal to FDP0 and the new FDP0 is defined by first differential FD0 plus first differential FD1 (which were computed in block 218(b) of FIG. 11(B)). Peak detect is then set equal to FALSE under 238 and exit made through exit 232.

If the initial decisional block 222 yields a FALSE indication, decisional block 240 determines (analogous to the determination of decisional block 224) whether the third datum is not above the second datum. A FALSE indication of this test (i.e., the third datum is above the second datum) defines a data pattern type of a downtrend as shown in block 242, and the peak detect is again set equal to FALSE by block 230 and exit is made through exit 232.

If this decisional block 240 yields a TRUE response (i.e., the third datum is not above the second datum), a maximum data pattern type is indicated in block 244, As mentioned above, the third point shown on blocks 242 and 244 is the first most recent datum value, the second point is the second most recent datum value, and the first point is the third most recent datum value. It is illustrated in this manner to view past to present as left to right as is conventional for time line representations. After it is determined that the data pattern type is a maximum at block 244, the peak pointer is updated in block 246 by setting peak pointer PP2 equal to peak pointer PP1 and peak pointer PP1 equal to peak pointer PP0, and defining peak pointer PP0 as processed sample count PSC minus one (i.e., PP0=PSC−1). The peak pointer is updated because the determination of a data pattern type of a maximum is the only defined data pattern type which includes peak information. Accordingly, in block 248, the peak values are also updated by setting peak value PV2 equal to peak value PV1, peak value PV1 equal to peak value PV0 and peak value PVO equal to absolute second difference ASD1. Since this data information will be retained for further analysis and processing, the data values are also updated in block 250 by setting data value DV2 equal to data value DV1, data value DV1 equal to data value DV0 and data value DV0 equal to data D2. Finally, after these updates regarding peak values and data values, the peak detect is set equal to TRUE by block 252, and exit is made through exit 232 and operation is returned to the appropriate portion of FIG. 1(D).

This simple and straightforward processing method of analyzing the data pattern types (DPT) unambiguously covers all possible cases of the defined data pattern types. It should be noted that in block 246, the peak pointer PP0 is defined as the processed sample count minus one. This lag of one sample is necessary in order to have a peak. Determining the occurrence of a peak requires the ability to sense something smaller that occurred at a later time. Thus, it is necessary for the sample to be lagged by one, i.e. PP0=PSC−1.

The raw data of FIG. 12 has a lag of two because sampling the peak generates a lag of one and computing the second difference generates a second lag of one, generating a total lag of two samples. For example, the data value DV0 in block 250 is set equal to data D2.

Updating of leading edge pointer at block 234 of FIG. 12 indicates where the peak started. That is to say that every time a peak is obtained, here was always a minimum before that peak. Otherwise, the overall signal would simply keep increasing to infinity. Minimums are actually represented by zero crossings because the absolute value has been taken of the data. The update of the leading edge pointer is undertaken recursively, as has been previously discussed. This recursive update also incorporates a lag of one, because a lag of one is necessary to sample a minimum.

Following the data pattern type analysis at block 6, an important decision point is reached in FIG. 1(D). All further useful information will be derived from the fact of whether a peak exists. Accordingly, decisional block 8 of FIG. 1(D) examines the peak detect settings at blocks 230, 238 and 252 of FIG. 12. The peak detect will only be set to TRUE whenever a defined maximum data pattern type has occurred. If no peak has been detected at this point, loop 10 returns to accept and transmit data block 2, and all of the foregoing analysis is repeated after obtaining new samples. Only if the peak detect decision 8 is TRUE will the remainder of the low chart be entered.

If peak detect is TRUE, then analysis of the peak pattern type (PPT) will take place. This analysis is further detailed in FIG. 13(A).

Upon entering the analyze peak pattern type function of FIG. 13(A), a sort algorithm function is undertaken to establish one of four defined peak pattern types, which are analogous to the minimum, uptrend, downtrend, and maximum data pattern types of FIG. 12. The description of the sort process with regard to the determination of minimum, uptrend, maximum and downtrend is analogous to that of the upper half of FIG. 12, except that peak values are used. Three consecutive peaks are compared, these peaks being peak value PVO (first peak—the most recent), peak value PVI (second peak) and peak value PV2 (third peak—the oldest peak).

In decision block 254, a determination is made whether the second peak value is below the first peak value (i.e., PVI<PV0). An indication of TRUE yields a decisional block 256, while a FALSE indication yields a decisional block 258. The decisional block 256 determines whether the third peak value is above the second peak value (i.e., PV2>PV1). If the third peak value is above the second peak value, the peak pattern type is determined to be a minimum at block 260; whereas, if the third peak value is not above the second peak value, the peak pattern type is determined to be an uptrend at block 262.

The decisional block 258 determines whether the third peak value is below the second peak value. If the third peak value is below the second peak value, the peak pattern type is determined to be a maximum at block 266; whereas, if the third peak value is not below the second peak value, the peak pattern type is determined to be a downtrend at block 264. As in FIG. 12, the dot patterns shown in blocks 260-266 have the third dot representing the most recent first peak and the first dot representing the third peak. The dots are illustrated this way to exemplify real time.

Peak pattern types indicated at blocks 260 through 266 are determined uniquely and unambiguously by these series sort functions. Although all pattern types at blocks 260-266 are shown being input to the threshold status operations beginning with decisional block 268, for certain uses of the present invention, only one of the pattern types is of importance and thus only this pattern type is input to the threshold status operations. For example, one may only be concerned with the maximum peaks of the data and thus only max peak pattern type at block 266 is input to decisional block 268.

Additionally, the peak pattern type analysis involves a determination of threshold status for the resulting peak pattern types. The second peak value of the three consecutive peaks (i.e., PV1) is used in a comparison with established threshold levels which are defined as signal threshold level (STL) and verified threshold level (VTL). The VTL generally represents a threshold level with a very small probability that the transient signal is a false alarm (for example, a false alarm probability equal to $10^{-13}$). Therefore, if the VTL is crossed, the probability that the signal is a false alarm is so small that the data must be a transient signal, and thus, is classified as verified.

In decisional block 268, if the second peak value (i.e., PV1) is less than the STL, a threshold status (TS) is set to noise at block 270 and exit is made through exit 272 with a return to the reset state variable function 14 of FIG. 1(D).

If the second peak value PV1 less than the signal threshold level STL, a second test is made in decisional block 274 to determine whether PV1 is less than VTL (verified signal threshold level) If a TRUE indication is given from this test at block 274, the threshold status TS is established as signal in block 276, and exit is made through exit 272. If PV1 is not less than VTL, then the threshold status is established as a verified signal in block 278 and exit is again made through exit 272.

Figure 13:
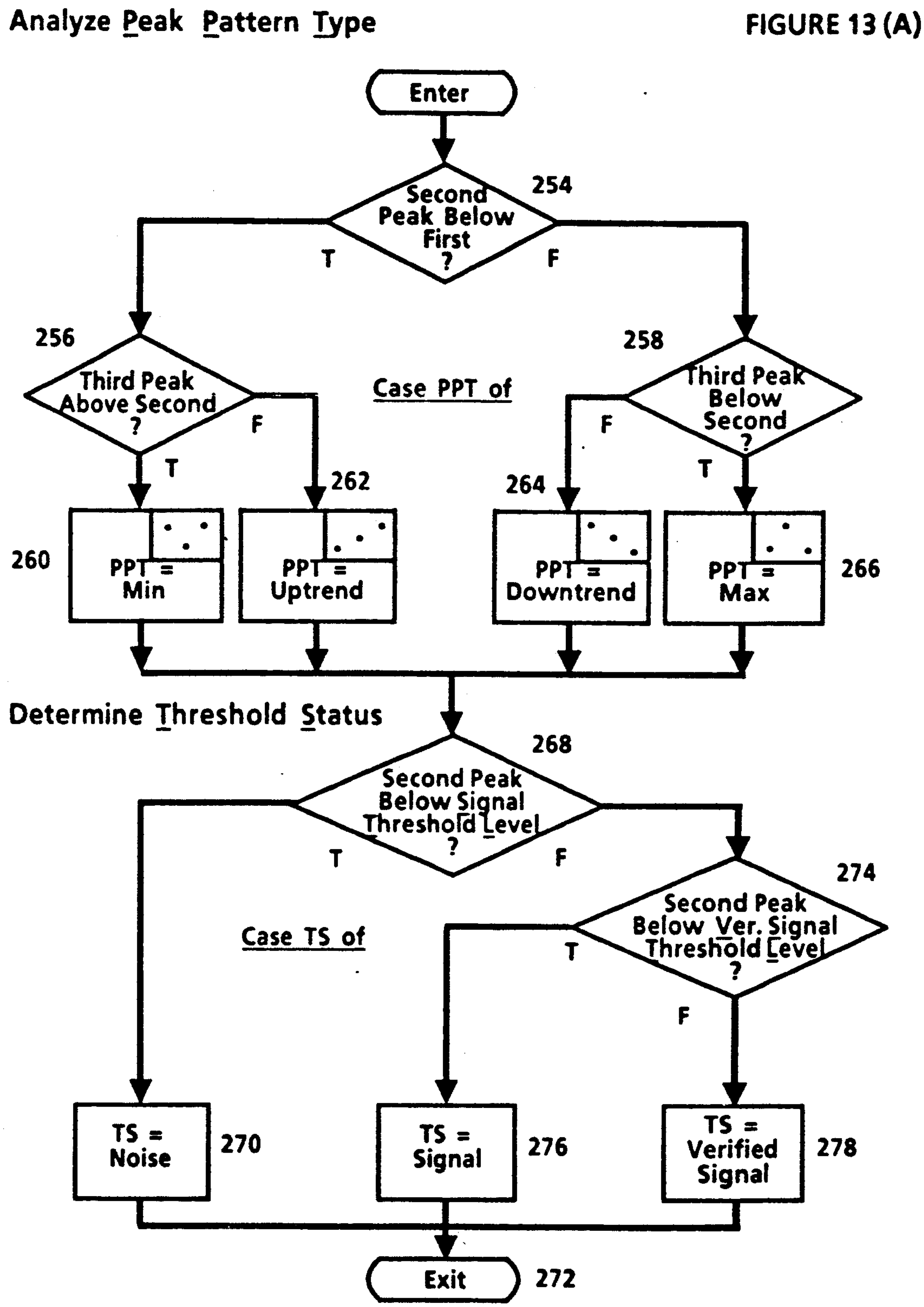
FIG. 13(A) is further detailed description of the peak pattern type analysis block of FIG. 1(D)
FIG. 13(B) illustrates the peak pattern type analysis of FIG. 13(A)
Figure 13B:
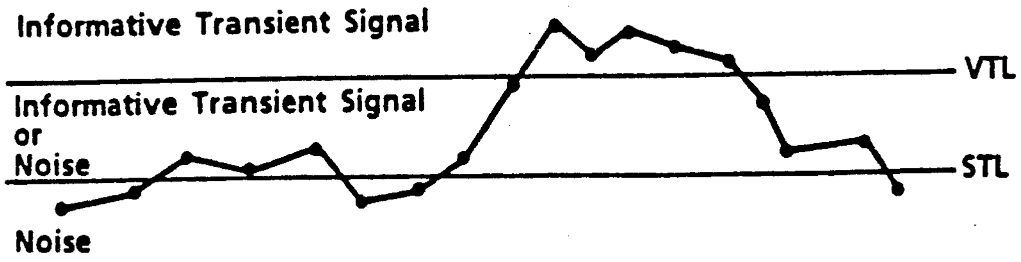
Figure 14:
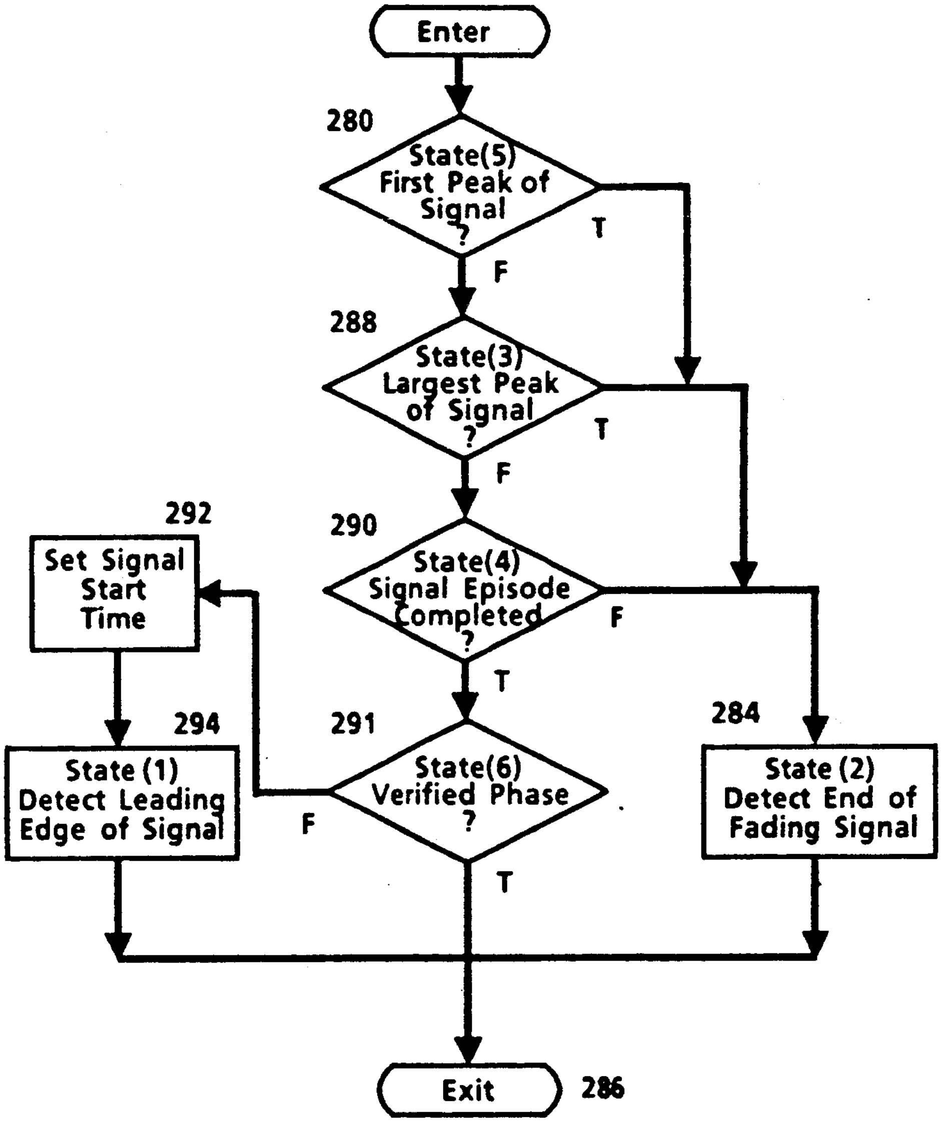
FIGS. 14(A) and 14(B) is further detailed description of the reset state variable block of FIG. 1(D)

As shown in FIG. 13(B), the threshold status operations provide two thresholds VTL and STL. For this illustration, the data points are maximum peak values (referred to as "MaxPeaks") determined in block 266. Those MaxPeaks above the VTL are verified signals and indicate the confirmed existence of informative transient signals. The MaxPeaks between the VTL and the STL may or may not be informative transient signals, depending upon the number of repetitions out of N trials between an arbitrary starting and stopping point. Further analysis, as described hereinafter in FIGS. 19(A)-19(G), is required to determine whether the MaxPeaks represent informative signals or noise. The MaxPeaks below the STL are considered noise.

These levels are not static, but are variable and adaptive as will be described with respect to FIGS. 27(A), 27(B)(i)-27(B)(iii) and 28. Several initialization options may provide some selection of different STL and VTL values. Direct selection of these threshold levels is not generally available to the user because the initialization options when grouped together as packages enable rapid and efficient utilization of the overall system. The initialization options will be further detailed with regard to the update noise statistics block 20 of FIG. 1(D).

The detected peak pattern types are the subject of much further processing, as may be seen from FIG. 1(D) as represented by the resetting of state variables in block 14 and updating of state variables in block 16.

The reset state variables function 14 of FIG. 1(D) is further defined in detail in FIGS. 14(A) and 14(B).

FIG. 14(B) illustrates seven state variables which are initialized and then reset in accordance with information obtained from the analyze peak pattern type block 12 of FIG. 1(D). These states include: S(0)—initialize noise statistics; S(1)—detect leading edge of signal; S(2)—detect end of fading signal; S(3)—largest peak of signal; S(4)—signal episode completed; and S(5)—first peak of signal and S(6)—signal episode verified. Once the transient episode detector is fully initialized and operating, the initialization process will not be necessary each time. Accordingly, FIG. 14(A) functionally proceeds to reset the state variables with known information.

The process for resetting the state variables in FIG. 14(A) amounts to a sort procedure which establishes a particular signal start time with regard to a reference point for the timing of episodic disturbances. Entry into FIG. 14(A) is followed by a first decisional block 280 which determines whether state 5 (i.e., the first peak of signal) is occurring. A TRUE indication causes state 2 (i.e., detect end of fading signal) to be set in block 284. Afterwards, exit is made through exit 286 to the update state variable function 16 of FIG. 1(D).

If the initial decisional block 280 is FALSE, another decisional block 288 determines whether state 3 (i.e., the largest peak of a signal) has occurred. If this is TRUE, again the second state is established in block 284. If, however, the decisional block 288 detection is FALSE, an additional decisional block 290 is entered.

Decisional block 290 determines whether state 4 exists, i.e., signal episode completed. A FALSE indication at this point will again set the second state in established in block 284. A TRUE indication will yield another decisional block 291 to determine whether state 6 exits, i.e., signal episode verified. A TRUE indication at decisional block 291 will yield no further resetting of state variables; only a direct exit through exit 286 and return to the update state variables portion 16 of FIG. 1(D). On the other hand, a FALSE indication will cause the signal start time to be set equal to the signal end time at block 292, inasmuch as that information is now known because state 4 (i.e., signal episode complete) has been established. Upon completion of setting the signal start time in block 292, state 1 (i.e., detect leading edge of signal) is established in block 294 meaning that the transient episode detector is preparing to look for the next leading edge of a signal inasmuch as a previous signal has just been terminated. After establishment of this state, exit is again made through exit 286.

It is apparent from an overall review of FIG. 14(A) that orderly tests are made to enable the transient episode detector to describe and determine transitional changes of the detection status and to control the timing of transients. Accordingly, it is possible for the transient episode detector to rapidly adapt to signal determinations and to move forward to subsequent determinations based on new data.

Figure 15:
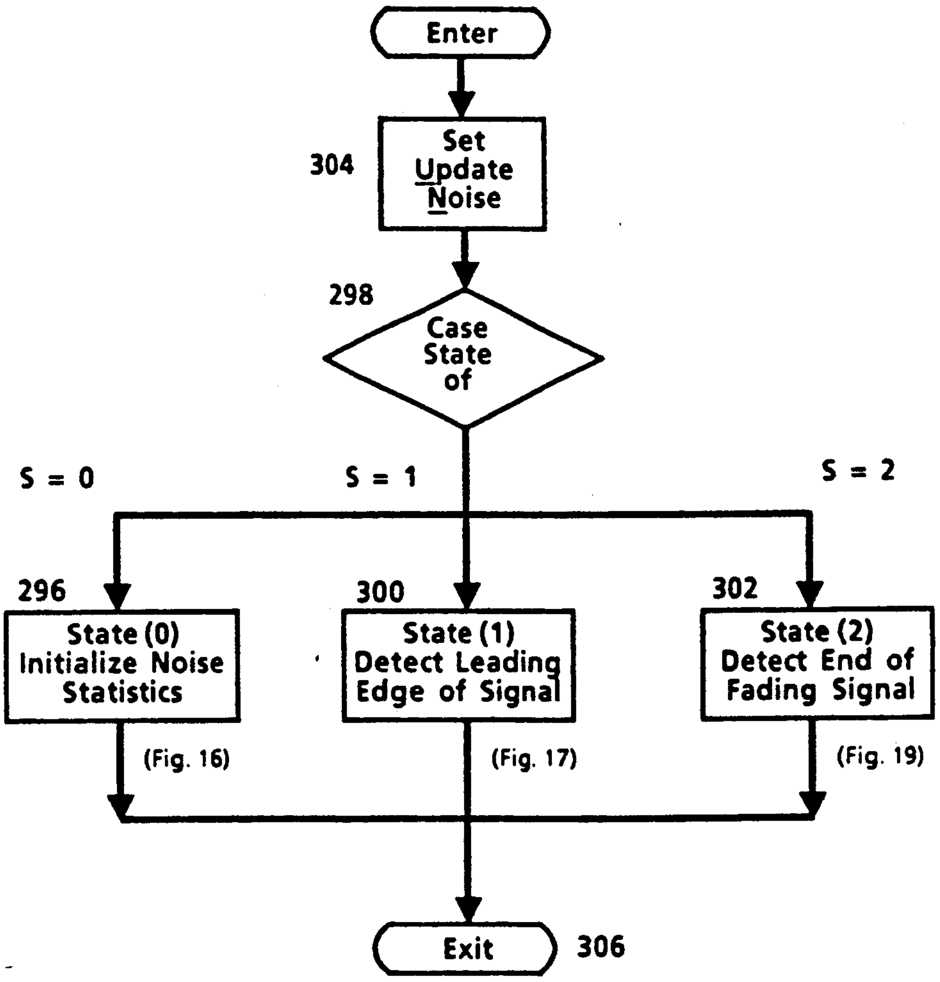
FIG. 15 is further detailed description of the update state variable block of FIG. 1(D)

Referring now to FIG. 1(D), the update state variable function 16 is entered following the reset state variable function 14. The update state variable function is further detailed beginning in FIG. 15. FIG. 15 plainly demonstrates the practical effect of the reset state variable functions of FIG. 14(A). Upon entering the operation of FIG. 15, the update noise indicator is set to FALSE at block 304. Decisional block 298 then determines the current operation state. Only three major states may be declared which require direct action. State 0, the initialize noise statistics state, will be directly declared from a warm up condition. This state, shown in block 296 at FIG. 15 is further detailed and described in FIG. 16(A). If state 1 is established in block 294 of FIG. 14(A), the decisional block 298 of FIG. 15 will direct flow through the functions of block 300 of FIG. 15. Block 300 is further detailed in FIG. 17. State 1 is one of only two steady states which may be ultimately established by the reset state variables functions of FIG. 14(A). The only remaining possible state is state 2, the detect end of fading signal state. The decisional block 298 of FIG. 15 sends control through the functions of block 302 if state 2 is established. The functions block 302 of FIG. 15 are further defined and detailed with regard to FIG. 19(A).

Figure 17:
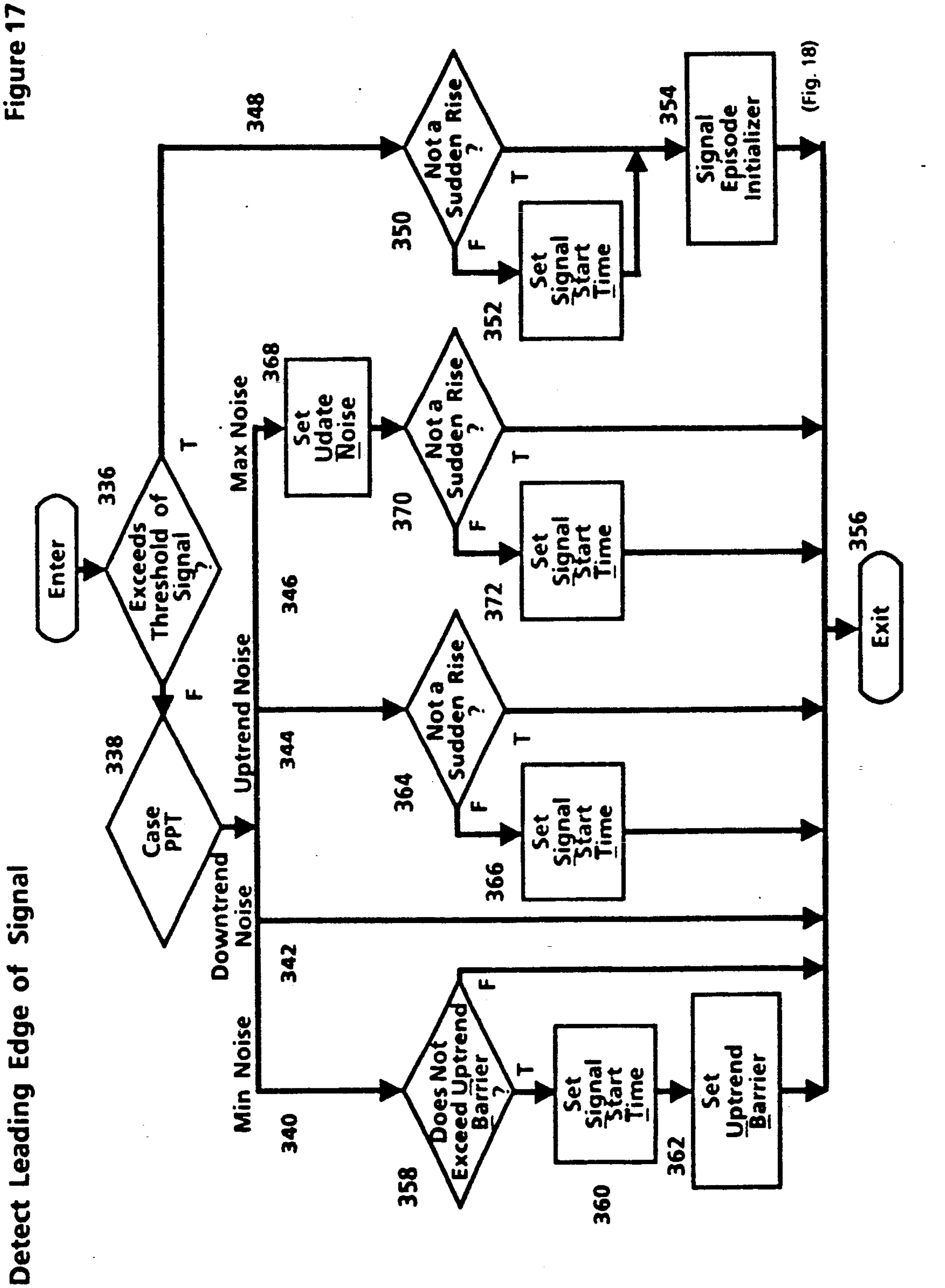
FIG. 17 is further detailed description of the state (1) detect leading edge of signal block of FIG. 15.

Before entering the functions of blocks 296, 300 and 302, the update noise indicator is always set equal to FALSE at block 304 inasmuch as only signal processing will follow unless processing of noise considerations is indicated by a subsequent state (e.g., block 368 of FIG. 17). Upon completion of the three states, exit is then made through 306 and return made to the appropriate portion of FIG. 1(D).

The three states shown in FIG. 15 may be considered as primary states, or state variable processes. Other states indicated at other portions of the transient episode detector functions may be viewed as transitory states which do not directly indicate detection of the beginning or ending of a signal. The primary interest of the transient episode detector is to note the beginning and end of episodic disturbances (and their duration) and provide this detected information to the host computer. Accordingly, the two indicated states of FIG. 15, along with the initialization state, are the most critical states in accordance with the chief mission of the transient episode detector. All other categories or state variables actually lead to the main state processes, as may be seen when comparing the effect of states 3 through 6 in FIG. 14(B).

The initialize noise statistics state (0) is further detailed and discussed as a warm up process in FIGS. 16(A), and 16(B)(i) and 16(B)(ii). This state process utilizes a recursive sort buffered noise stack 308 (FIG. 16(B)(ii)) to obtain ordered noise statistics with the stack arrangement such that the largest is BN(1) and the smallest is BN(BNL) (i.e., BN(1)>BN(2)>. . .>BN(BNL)). The number BNL represents the buffered noise statistic limit which has a default of 99. The stack 308 has N positions which is established as an odd integer. The actual initialization of the noise statistics is dependent upon the fact that a stat number L is entered in the stack which is much larger than any data which could possibly reasonably be expected. A recursive sort process is followed in FIG. 16(A) to fill stack 308. The data which fills this stack subsequently is used in an update noise statistics mode to measure new noise statistics.

Whenever the stack has been filled, the largest value will be at the top of the stack, and the data will be in descending order of value from there. The top value will be the large value L used as the upper bound. This sorting process is known as a recursive sorting process. Because a recursive sorting process is used, only one new value at a time need be placed in its proper place. Everything else is already in order. Only a new value coming in needs to be sorted in an algorithm with respect to data numbers which are already present. To each element of the BN array, there is a corresponding CN array 309 (FIG. 16(B)(i)) which records of the noise statistics to provide a histogram of the noise array.

Given the specifics of stack 308 and the initialization of L, it is known that all new data numbers coming in are going to be smaller than L. Thus, the new data will all be fed in from the bottom of stack 308. This means that for each new piece of data which is taken in, something will be removed. Thus, old dummy data will be popped off the top of the stack 308 until L reaches the top. The stack will continue to operate by always pulling the largest number off the top (i.e., popping or pulling the stack) as new information feeds in. This process will continue until there are no more unboundedly large numbers in the stack. At this point, the stack 308 is completely filled with new data after N number of operations (given that there are N positions in the stack to be filled with such new data). The means and methodology of FIG. 16 perform the recited recursive sorting process for stack 308.

A present statistic is sorted with regard to the prior noise observations. The noise buffer is being initialized by filling it up with new data and throwing out (i.e., popping off) the initialization dummy data. Everything is interpreted as noise until the buffer is initially filled.

The basic decisional block 310 performs this initial filling of stack 308 by determining whether BN(1) exceeds the established data bound L. This test is performed by determining whether BN(1)=L. It is already known that L>BN(N). Accordingly, the only case of interest deals with the equality. If they are equal, BN(1) is set equal to peak value PV1 in block 312 and a state determination is made through block 314 to establish state (1) (i.e., detect leading edge of signal). After establishment of state (1), exit is taken through exit 316 and return made to block 304 of FIG. 15.

However, if the test of block 310 is FALSE, the recursive sort process will take place. Three potential cases exist, that is to say that peak value PV1 may be greater than, equal to or less than the value in the buffered noise stack at location corresponding to a buffered noise counter, BN(BNC). Prior to such a determination, the buffered noise counter (BNC) is set equal to 2 in block 324, and this value is tested against the buffered noise limit (BNL) in block 326 (i.e., Is BNC=BNL?). If the buffered noise counter equals the buffered noise limit, the determined smallest data sample is deposited at block 328, i.e., BN(BNL)=PV1.

On the other hand, if the buffered noise counter BNC is not equal to the buffered noise limit BNL, decisional block 332 determines whether the peak value PV1 is greater than, equal to, or less than the value of the buffered noise stack corresponding to the position indicated by the buffered noise counter BN(BNC). If the peak value PV1 is greater than the buffered noise counter BN(BNC), the intermediate data is deposited at block 318. That is, the peak value PV1 is stored at the stack location BN(BNC−1) which is one position higher than the stack location BN(BNC) (i.e., BN(BNC−1)=PV1). Exit is then made through exit 316. If the peak value PV1 is equal to the buffered noise counter BN(BNC), the count of the CN array 309 at CN(BNC) is incremented at block 320 to update the histogram and exit is made through exit 316. If the peak value PV1 is less than the buffered noise counter BN(BNC), the stack is pulled at block 322 (i.e., BN(BNC−1)=BN(BNC)) and operation is looped back via block 330, which updates the buffered noise counter, to decisional block 326 to test the updated buffered noise counter against the buffered noise limit. All paths ultimately lead to exit 316, indicating the completion of the initialization of the noise statistics, i.e., the first filling of the stack 308.

This initialization process is complete whenever the top position of the stack 308 pops off the arbitrary data bound L. As long as BN(1) is smaller than L, the stack has not yet replaced the dummy data with real data points. The largest real data number will be smaller than L, which is unboundedly large relative to the data. The stack operation will be completed when something below L is forced into BN(1).

This means that the first sample point picked up is going to be less than L which starts by occupying the lowermost location BN(BNL). Thus, L is replaced at this location and begins its upward movement in the stack. This upward movement of L will continue until it reaches the uppermost position of the stack. The dummy data is pulled off the top of the stack as it makes room for the real data which is rolling in.

As can be seen from block 320 of FIG. 16(A), subsequent values which are equal to prior values provide redundant information only and are not sorted; however, the redundant values are used to count the number of repetitions to thereby establish a histogram of the noise array and hence are maintained in the CN array 309 (FIG. 16(B)(i)). This redundant information would corrupt the adaptive threshold procedure and result in a progressively higher rate of false alarms with time. This sort stack methodology is further protected by rounding off real noise data or by converting random noise variates to an integer value of the appropriate noise quantum. If this protection were not included, the stack could become corrupted in due time with a large number of nearly equal numbers because of the limit placed on the size of the noise array. Accordingly, block 320 constitutes a means for assuring viable information in the stack 308. If block 320 were not present, underquantized ambient noise, e.g., on the order of −2 to+2, would fill the stack with replicative values of no useful information to the overall device or would fail to control the false alarm rate.

Accordingly, with inclusion of a round off or integer criteria and the operation of block 320, no small set of data values or small range of data values can be predicted with certainty to jam the array of noise values. It is impossible to accurately predict the number of redundant data values which will be stopped from entering the stack. At least N+1 data values will be necessary to fill the stack if no redundant data values are present. However, any number of redundant values may be held back and cause the total number of values necessary to fill the stack with new actual data to be large.

Block 322 is operative whenever the new peak value PV1 is less than BN(BNC). This generates a pull stack operation wherein BN(BNC−1) is set equal to BN(BNC). This is the only condition for which a pull stack operation will be generated, but pull stack operation at block 322 does not exit at exit 316. Rather, path 334 is taken to block 330, wherein the buffered noise counter BNC is incremented (i.e., BNC=BNC+1). The updated buffered noise counter BNC is then tested against the buffered noise limit BNL at block 326, as described previously. According to the feedback loop formed from block 322, through block 330, and back to block 326, multiple passes through block 322 enables the particular peak value PV1 to be positioned in the proper stack location. Thus, after the initial warm-up in state (1), the methodology and means of FIG. 16(A) constitute a recursive sorter device for adapting rapidly to changing noise statistics and for controlling false alarms by applying a threshold determined by the histogram, CN(1), based on parametric or nonparametric criteria.

FIG. 15 indicates that a second potential state process is state (1), detect leading edge of signal 300. Specifically, FIG. 17 concerns expanded detail of this state process. The detect leading edge of signal includes processing signal information based on both the peak pattern type and the threshold status of the three peak values which are being operated on. The initialization of FIG. 17 includes the establishment of an uptrend barrier (UB) which is defined as a large integer which exceeds the largest possible data, i.e., peak value.

As with other processes and functions of the transient episode detector, initial determinations are made based on the median value of the three peak values currently being handled. Accordingly, the first decisional block 336 of FIG. 17 determines the threshold status of the present signal group based on the median peak value PV1. Peak value PV1 is compared with the signal threshold level (i.e., Is PV1>STL), with a TRUE indication meaning that peak value PV1 exceeds the signal threshold level, thereby defining a signal. If PV1 does not exceeds the signal threshold level, a FALSE indication is given indicating that noise is defined.

Keeping in mind that the overall function of FIG. 17 is to determine or detect the leading edge of a signal, an important feature of each flow path of FIG. 17 includes the setting or establishment of a signal start time. The transient episode detector is constantly attempting to establish leading edges and signal completed times by shifting the reference point of an established signal start time with regard to the three-part peak values. Accordingly, each flow path of FIG. 17 updates the signal start time based on the appropriate determinations.

As previously stated, the updating of state variables in block 16 of FIG. 1(D) depends on the analyzed peak pattern types from block 12 of FIG. 1. This is shown in FIG. 17 as different cases of peak pattern types and threshold status determinations from FIG. 13(A), previously discussed.

These various cases of peak pattern type and threshold status are represented by paths 340 through 348 of FIG. 17. They may include, at least, minimum peaks noise, downtrend peaks noise, uptrend peaks noise, maximum peaks noise, and all peaks signal. Recalling from earlier disclosure, noise means that the signal is below both the signal threshold level and, of course, the verified signal threshold level. All determinations are based on the three sample method (peak values), such that the middle sample is of particular importance with regard to the establishment of peaks. Thus, the middle peak is defined as the normal or framed peak. If this peak is less than twice the one that came before it, it is not defined as not being a sudden rise. Such determinations are important with regard to the establishment of timing and determinations of leading edges of signals. Thus, the detect leading edge of signal means of FIG. 17 is constantly reorienting a start time under different conditions. The sudden rise test is only important in the context of establishing timing. Thus, FIG. 17 may be viewed as a timing system which adapts to determined peak pattern types and threshold status determination.

For example, if a peak value moves from noise to signal, it is realized that a large peak was present and the start time may be set at the leading edge pointer 2 (i.e., LEP2). That is, the two zero crossings preceding that peak. Thus, a state is established for the first peak of signal. If there is a downtrend of peaks from this point on and the signal falls into noise (i.e., below the STL), the sample start time is moved as far forward in time as can be done so as to be at a zero-crossing of the most current peak.

If the threshold status determination at block 336 determines that a signal is present, flow path 348 leads to the sudden rise test at block 350. The sudden rise test is defined as whether the present peak value (PV1) is more than twice as large as the previous peak value (PV2). This is shown as PV1 is less than or equal to PV2 plus PV2 inasmuch as addition is preferred over multiplication. If the rise does not satisfy the sudden rise test, a signal initializer operation (discussed in more detail with reference to FIG. 18) is performed at block 354, and exit is made through exit 356. On the other hand, if the rise is considered a sudden rise, the signal start time is set to the leading edge pointer LEP2 at block 352, followed by the signal episode initializer operation at block 354.

If the peak value PV1 does not exceed the signal threshold level STL at block 336, block 338 determines which peak pattern type exists: minimum, downtrend, uptrend, or maximum.

The maximum peaks noise path 346 of FIG. 17 potentially contains the most important information present, and accordingly an additional function is contained in this flow path which is not found in any of the others. Specifically, in block 368, the update noise flag is set equal to TRUE. This means that the peak values which are directed to flow path 346 will be used to update the noise characteristics held in the buffered noise stack 308 previously discussed in FIG. 16(B)(ii). Following this function, the sudden rise test at block 370 is repeated as it was described with respect to block 350. A FALSE indication at block 370 will cause the signal start time SST to be set equal to the leading edge pointer LEP2 at block 372, and thereafter exit is made through exit 356. On the other hand, a TRUE indication at block 370 will cause immediate exit through exit 356. Thus it may be seen from FIG. 17 that all flow paths consider the establishment of a new signal start time in accordance with the characteristic peak pattern types and threshold status indications of their respective flow paths and then the detect leading edge of signal function is exited and a return made to the appropriate portion of FIG. 15.

Exemplary reasoning behind the signal start time establishment includes a normal case, which might occur when a noise defined peak value groups is on an uptrend, when it would be desirable to determine the leading edge of that uptrend and verify it as such. This could be accomplished through uptrend peaks noise flow path 344 which first tests in block 364 for a sudden rise (i.e., Is PV1≦PV2+PV2?), as has been previously noted. If there is not a sudden rise, nothing is done as it is already established that the signal is on an uptrend and exit is made through exit 356. The earliest peak (PV2) was below the middle one (PV1) and the most current peak (PV0) is above the middle (PV1), so clearly an uptrend exists. But if there is a sudden rise in this apparent uptrend (i.e., a FALSE indication from block 364), it is desirable to set the leading edge pointer two zero-crossings back from the most current peak to obtain the maximum information. This means setting the signal start time SST equal to leading edge pointer LEP2 at block 366. After the signal start time SST is set in block 366, exit is made through exit 356.

If a minimum peak flow path 340 is indicated and a believed uptrend of the signal is present, the expectation is that each peak will continue to increase until the signal threshold is passed. However, a change in the leading edge pointer will also be necessary here if that expectation of continued uptrend is not met. Accordingly, at decisional block 358, the peak value is compared to the uptrend barrier. That is, if the peak value PV1 exceeds the uptrend barrier UB, exit is made at exit 356. On the other hand, if the peak value PV1 does not exceed the uptrend barrier, the signal start time SST is set to the leading edge pointer LEP0 at block 360. The uptrend barrier is constantly reset in block 362 of FIG. 17 each time it is exceeded so that accurate tracking of the uptrend is possible. After the uptrend barrier is reset in block 362, exit is made through exit 356.

When the peak pattern type is determined by block 338 to be a downtrend, path 342 flows directly to exit 356. Since FIG. 17 is concerned with detecting a leading edge of a signal, a downtrend pattern is of no value in this operation.

Figure 18:
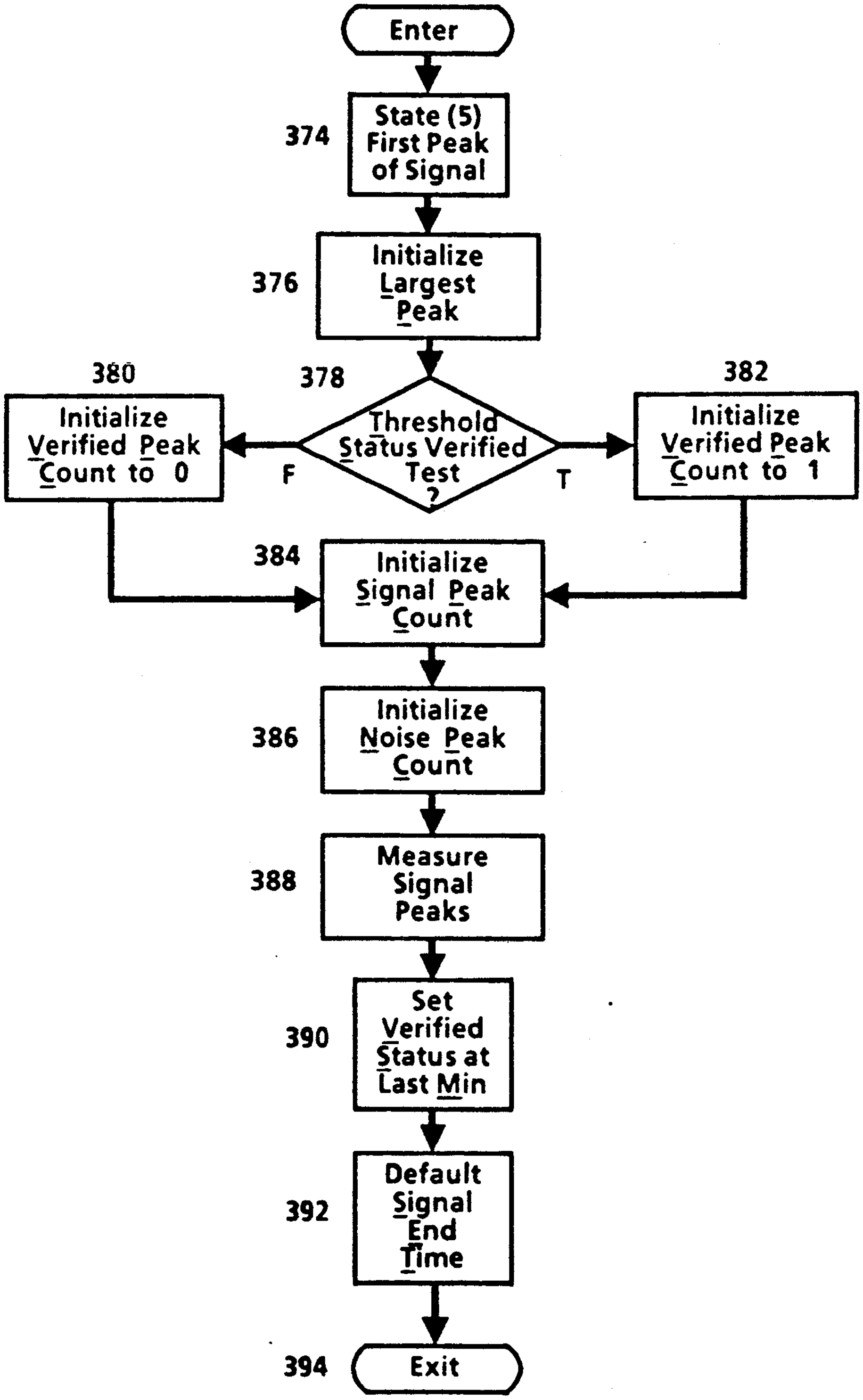
FIG. 18 is further detailed description of the signal episode initializer block of FIG. 17.

As previously noted, if the detect leading edge of signal FIG. 17 function determines that the median peak value PV1 exceeds the signal threshold limit, subsequent function of the signal episode initializer 354 will be undertaken. Details of the signal episode initializer are examined with regard to FIG. 18. Referring to FIG. 18, upon entering the signal episode initializer, state variable 5 (i.e., first peak signal) is established at block 374. After establishment of the state 5 condition in block 374, the largest peak indicator is initialized to zero, i.e., LP equals 0. This initializing of largest peak in block 376 is followed by a secondary threshold status test in block 378 to determine whether the signal level peak values presently handled also exceed the verified signal threshold level (i.e., PV1>VTL, or threshold status TS is equal to verified signal as determined in FIG. 13(A)). If the verified status is FALSE, the verified peaks count (VPC) is initialized to zero in block 380. If the verified signal test is TRUE, the verified peaks count (VPC) is initialized to one in block 382. Accordingly, the verified peak counter will be initialized to either zero or one depending on determination of the verified signal threshold level test.

Subsequent to initialization of the verified peak count, a single flow path is followed regardless of what initialization took place. In functional block 384, the signal peak count (SPC) is initialized to one. This logically follows inasmuch as a verified signal is also a signal. An additional initialization is undertaken in block 386 where the noise peak count (NPC) is set to zero. This again logically follows the functional establishment of a signal threshold limit exceeded in block 336 of FIG. 17 inasmuch as a noise indication is precluded by a TRUE determination in block 336.

After completing these four initializations in FIG. 18, the signal peaks are measured in block 388 wherein a signal measurement array is established as a window in the transient episode detector which may be accessed by the host computer, as described above with regard to the shared memory M3 of FIGS. 2 and 6. The measure signal peaks function 388 of FIG. 18 will be further described with regard to FIG. 21; in terms of an exemplar set of measured features.

The function of the signal episode initializer of FIG. 18 is completed by two additional steps of block 390 which sets the verified status at last minimum (VSM) equal to FALSE and block 392 which sets the signal end time (SET) equal to the signal start time (SST), i.e., indicating a default in the signal end time. Conclusion of these resets causes exit through block 394 and return to the appropriate portion of FIG. 17.

Figure 21:
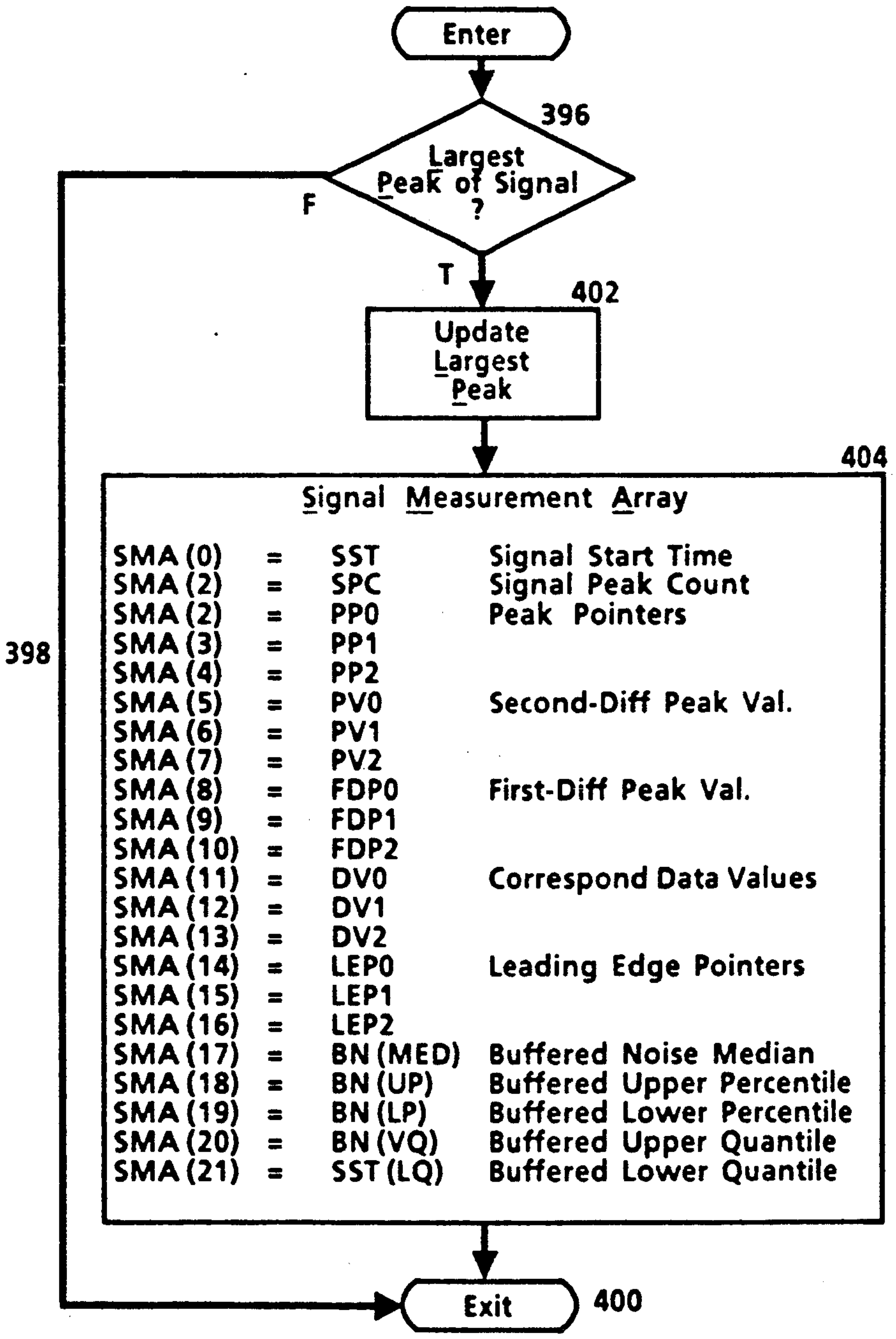
FIG. 21 is further detailed description of the measure signal peaks block of FIG. 19(A)

The measure signal peaks function 388 of FIG. 18 is further defined in FIG. 21. Upon entering FIG. 21, decisional block 396 determines whether the presently indicated peak values constitute the largest peak of the signal. If they do not, flow path 398 is followed and immediate exit taken through exit 400 and returned to the appropriate portion (i.e., block 390) of FIG. 18. That is to say, only the largest peak information will be used to update the signal measurement array at block 404. The largest peak indicator is updated in block 402 by setting the largest peak indicator LP equal to peak value PV1, the mid-point present peak value. Following this update, the signal measurement array is established for the new largest peak information in the array in block 404, as previously discussed. This array constitutes a window in the transient episode detector which may be accessed by the host computer such that the host computer obtains the most important (by definition) information presently contained in a particular transient episode detector. Completion of establishment of the signal measurement array in block 404 will also cause exit through exit 400 and a return to the appropriate portion of FIG. 18.

This window in the transient episode detector permits the overall host computer to look into the transient episode detector and determine a variety of information based on these measurements. The actual reaching in of the host computer through this virtual window may occur upon certain indications as discussed above with regard to the bell ringer control circuit. The array is prepared and waits to be grabbed off by the host computer at a time the host computer selects. The host computer can utilize this relatively raw data in a great variety of ways to make calculations such as the frequency of the established signals or the peak frequency of the signals. Yet obtaining these basic measurements does not require any multiplication or division in a transient episode detector, which would lead to less efficient operation. The host computer generally has more time available to make more complex manipulations of data.

FIG. 19(A) concerns the details of the determination of the end of a fading signal (state (2), block 302 of FIG. 15), and is a relatively complex function inasmuch as a final decision to terminate a signal is more critical than selecting or determining the establishment (leading edge) of a signal.

The elapsed duration of a signal is defined in block 406 as the difference between the leading edge pointer LEP0 and the signal start time SST, i.e., DU=-LEP0−SST. Decisional block 408 is then entered to determine which case of threshold status the present fading signal constitutes. That is, it is determined which threshold status is obtained by the peak value PV1. As previously explained with respect to FIGS. 13(A) and 13(B), three threshold status (TS) cases are possible: noise status (i.e., DPT=Max is below STL), signal status (i.e., DPT=Max is between STL and VTL) and verified signal status (i.e., DPT=Max is above VTL). However, as an alternative embodiment which further reduces the amount of information retained by TED, an additional path may be chosen which only requires that the peaks be maximum (i.e., All PPT=Max, from operation block 266 in FIG. 13(A)).

As an illustration of the use of PPT and TS as control variables by the host, determination of the four cases may be performed simultaneously in parallel, or a combination of the different paths. For example, determination of the all max peaks case may be coupled in parallel only with the case where all DPT=Max are above the verified signal threshold VTL.

The data pattern type cases utilize a concept known as VOTE. The chief function of FIG. 19(A) is to detect or determine the end of a fading signal. It is desirable to provide every opportunity for a signal to be established or maintained as opposed to erroneously ending the same. Accordingly, the VOTE concept is utilized to assist in determinations where some signals extend over a threshold (and thus appear to achieve signal status) but do not remain above the threshold long enough to be deemed a signal. Signals which are not large enough to be verified (i.e., do not cross the VTL) may be either signals which last for a long time or which are complex and have durations of mixed signal and noise peaks contained therein.

The vote counter is based on sensing long multiple degree of freedom signals sensed at power levels above the median or some other appropriate threshold (e.g. decile) of noise. A signal may be deemed established if a threshold is crossed a sufficient number, even if there is no verification due to the signal energy never exceeding the verification threshold level.

In most general terms, VOTE is defined as a cumulative count of hits exceeding a threshold minus misses falling below the threshold (which is deemed noise). For each signal hit, a value X is added to the VOTE count. On the other hand, for each miss, a value Y is subtracted from the VOTE count. The values X and Y vary according to a desired probability of false alarm $P_{fa}$, which in the VOTE operation is $P_{fa}=10^{-A}$, and Z is a variable chosen by the user.

Figure 19:
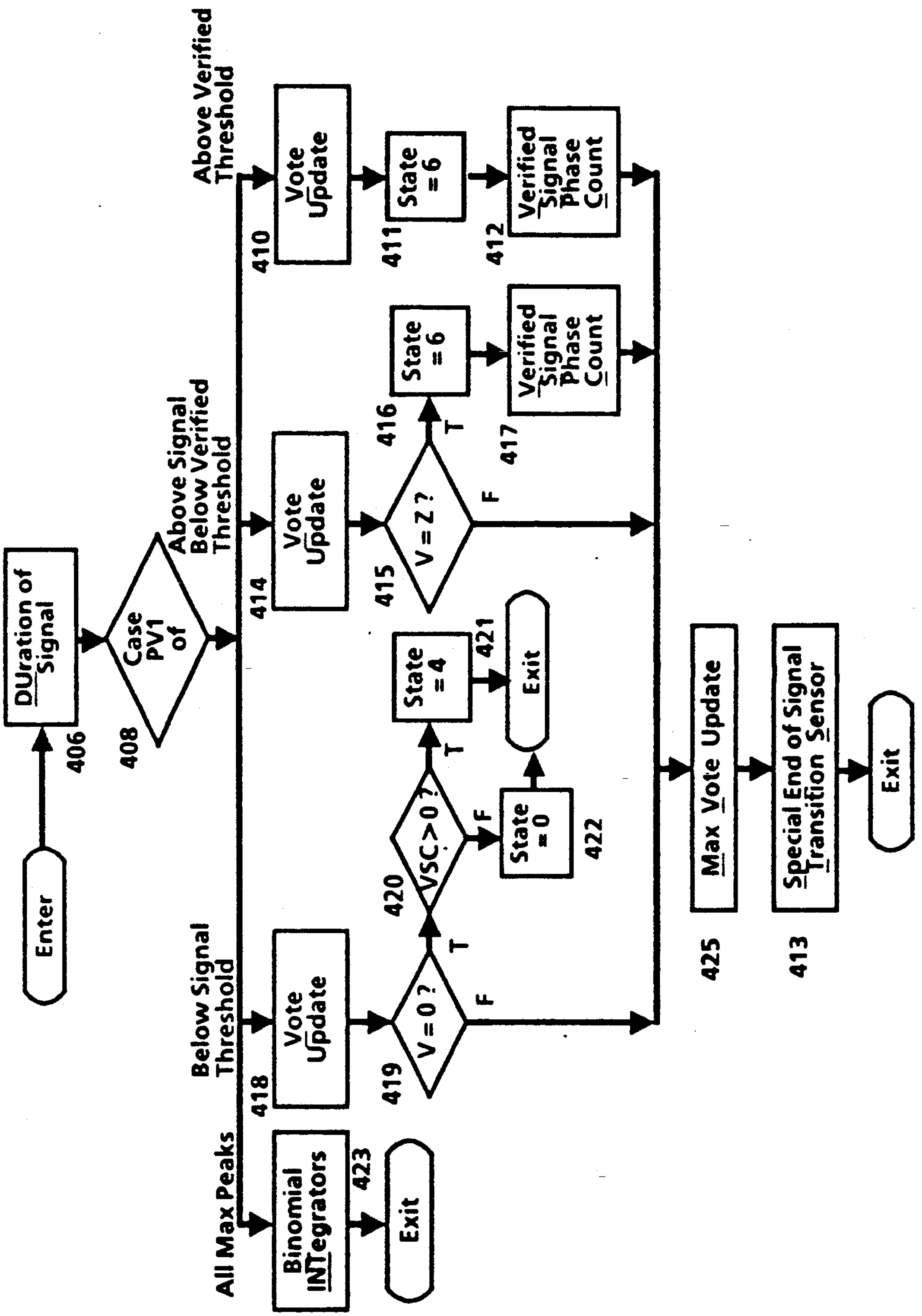
FIG. 19(A) is further detailed description of the state (2) detect end of fading signal block of FIG. 15.
FIGS. 19(B) shows an example of classifying a signal based upon statistical analysis.
FIGS. 19(C)(i) and 19(C)(ii) demonstrate a look-up table employed by VOTE and multinomial VOTE functions.
FIG. 19(D) is an example of a VOTE function.
FIG. 19(E) is an example of a multinomial VOTE function.
FIG. 19(F) is an example of the differing threshold levels established by the end of signal detection operation of FIG. 19(A)
FIG. 19(G) is further detailed description of the special end of signal transition sensor block of FIG. 19(A)
Figure 19B:
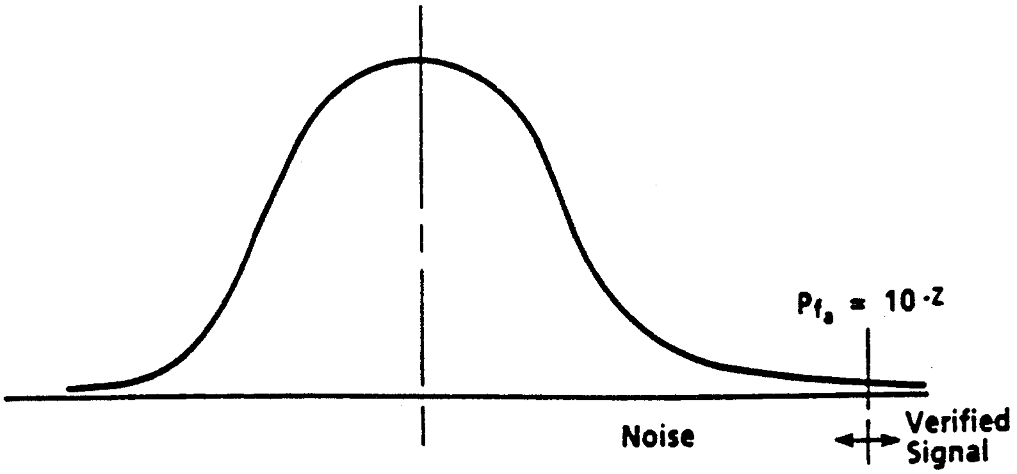

As shown in FIG. 19(B), $P_{fa}=10^{-Z}$ establishes a statistical threshold level (for example, the verified signal threshold level (VSL)) wherein all values to the left of the level are considered noise and all values to the right of the level are verified as a signal. Thus, if a peak is detected having a sufficient amount of energy to satisfy this probability (i.e., rejects the noise hypothesis that the peak merely represents noise), then the peak is verified as a signal. Variable Z will be described in more detail below.

To enhance the speed of the TED, once Z has been chosen by the user, the values X and Y may be easily obtained from a look up table. Such a table is provide for exemplary purposes in FIG. 19(C)(i).

In this example, variable Z is set equal to 10 by the user, thereby establishing a probability of false alarm threshold of $P_{fa}-10^{-10}$. The first column lists the different noise threshold probabilities. The user also sets this noise threshold probability. The tradeoff between the different noise threshold probabilities is time versus flexibility to detect low energy events over a long period of time. For example, if the noise threshold probability is set to $10^{-10}$, then only high energy peaks will be detected and deemed an event. Although only high energy peaks will be detected, they are verified immediately. Conversely, if the noise threshold probability is set to 0.1, then the user is interested in counting numerous low energy peaks to determine whether they constitute an event. Although the lower noise threshold probability detects more events, the counting procedure requires more time.

The second column lists the corresponding number of hits i (i.e., peak energies exceeding the given noise threshold probability) at that threshold probability required to satisfy the false alarm probability $P_{fa}=10^{-10}$. The third column lists the total number of trials allowed to cumulate the corresponding number of hits. For example, for a noise threshold probability of 0.1, ten hits out of 13 consecutive peaks are required to satisfy the false alarm probability $P_{fa}=10^{-10}$.

The fourth and fifth columns list the corresponding X and Y values for each noise threshold probability. As mentioned above, VOTE count V is equal to the X value times each hit i, minus the Y value times each miss j; which is equivalent to saying for each hit, a value X is added to V and for each miss, a value Y is subtracted from V.

VOTE may now be explained with reference to a simple example shown in FIG. 19(D), wherein Z is preset to 10 and the noise threshold is preset to 0.1, a decile threshold level (as shown by the blocked row in the table of FIG. 19(C)(i)). Each "." represents a data peak. When the data peaks begin exceeding the 0.1 noise threshold, VOTE V begins counting. Since X=1 (from FIG. 19(C)(i)), each hit i adds 1 to the VOTE count. After the VOTE count reached 7, the next data peak was a miss and did not exceed the 0.1 noise threshold, thereby indicating that this data string may be noise. Since Y=2, for this miss, two was subtracted from the VOTE count leaving a total VOTE V of 5. A value Y must be subtracted to adjust for the probability that this previous string of hits were merely noise.

The next data peak was a hit; thus, another value X=1 was added to VOTE V. After four more hits, VOTE V=10, the total necessary to verify the data peaks as an event (column two in the table of FIG. 19(C)(i)). When VOTE count verifies the presence of a signal, the previous data peaks, which have been stored, are analyzed to extract the information.

It should be emphasized that the VOTE count will vary depending upon the selected probability of false alarm $P_{fa}$ (i.e., the selected variable Z) and the selected noise threshold. Thus VOTE may require a count of 10, as with the previous example, or a count of 25 when the desired noise threshold is 0.398 as shown in the table of FIG. 19(C)(i).

The above example considered how many hits satisfying the 0.1 noise threshold were required to satisfy the probability of false alarm $P_{fa}=10^{-10}$. According to the table, ten hits were required, with each hit adding a value of one to the VOTE V. However, suppose two or three very large peaks easily exceeded the 0.1 noise threshold. It would be important to detect such peaks as a signal. Yet, since there were only two or three peaks, the VOTE V as described above would not detect these peaks as a signal because only a total number of ten peaks would verify a signal.

To solve this dilemma, the present invention may also employ a multinomial event VOTE count. According to this scheme, arbitrary "scores" are given for each peak depending upon its energy level and what noise probability such a peak would satisfy.

This scheme employs variable Z as the multinomial event VOTE count which must be met to verify a signal. For example, when the user selects a probability of $P_{fa}=10^{-10}$, then the multinomial event VOTE count Z is 10. Then, when the user chooses the noise threshold, the arbitrary scores for corresponding peak levels are established.

The table in FIG. 19(C)(ii) shows the arbitrary scores for a 0.1 noise threshold and a Z=10. According to this table, when a hit has sufficient energy to satisfy a noise probability of $10_{-10}$, a score of 10 is assigned; when a noise probability of $10^{-6}$ is satisfied, a score of 6 is assigned.

Figure 19D:
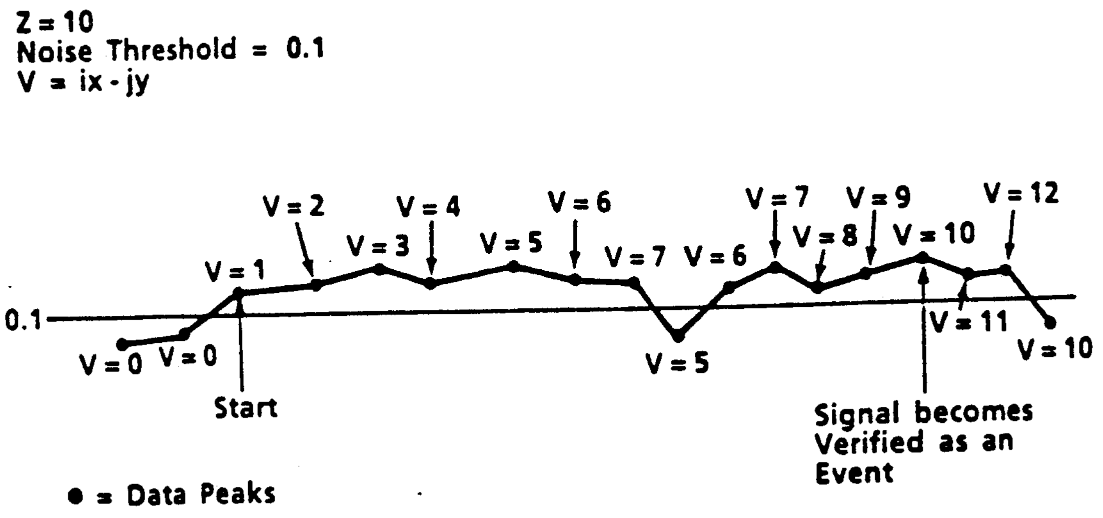
Figure 19E:
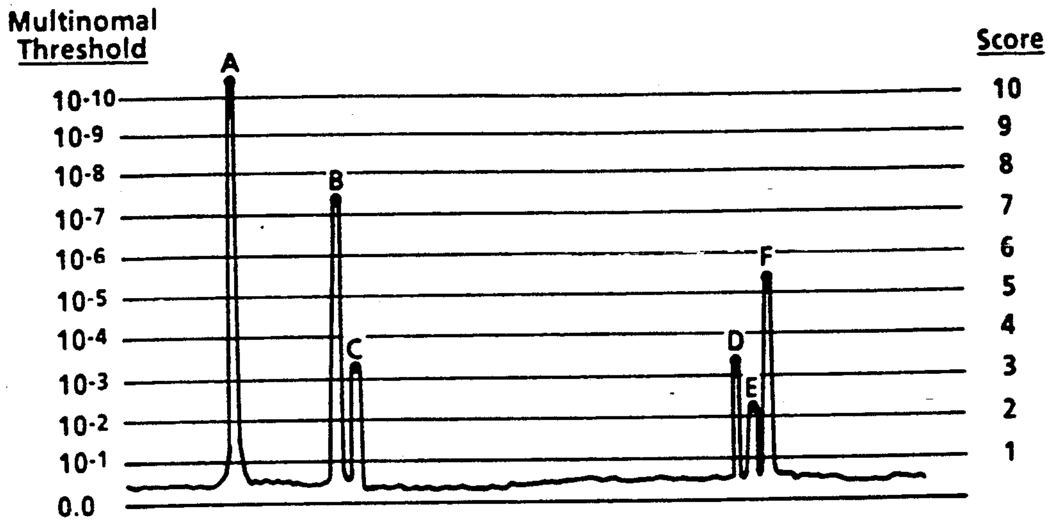

The multinomial score scheme may be better understood with reference to FIG. 19(E). Peak value A has sufficient energy to satisfy a noise probability of $10^{-10}$. As shown in the table of FIG. 19(C)(ii), this probability is given a score of 10. Since a score of 10 equals the desired multinomial event VOTE count Z=10, then this peak is immediately verified as a signal. This last example is analogous to saying the peak exceeded the verified signal threshold level VTL.

On the other hand, successive peaks B and C have energy sufficient to satisfy noise probabilities of $10^{-7}$ and $10^{-3}$, respectively. Such probabilities receive a score of 7 and 3, respectively. Each score taken alone does not exceed Z=10. However, it is desireable to detect these two peaks as a signal and not reject them as noise because the combined energy of these two peaks would be sufficient to satisfy the desired false alarm probability $P_{fa}=10^{-10}$. Therefore, the multinomial event VOTE count permits these scores to be combined to 10, which equals the desire multinomial event VOTE count Z=10. Accordingly, peaks B and C are verified as a signal.

Successive peaks D, E and F yield respective scores of 3, 2 and 5 which combine to yield 10. Accordingly, peaks D, E and F provide a verified signal. In the case of D and E followed by a miss, where the amplitude is below the threshold of $P_{fn}=0.1$, then, according to 19(C)(i) table, VOTE is decremented by two. If VOTE gets below zero, without reaching a VOTE of 10, the peaks are classed as noise. The state (1) is set and TED begins looking for a new starting point.

Returning now to FIG. 19(A), for the case of all DPT=Max above the verified signal threshold level VTL, VOTE is updated at block 410. Here, a single data peak exceeded the desired verified threshold level and thus is automatically verified. Thus, if the probability of false alarm $P_{fa}=10^{-10}$, then V=10 and the data peak is deemed an event. Accordingly, the state variable is set to state 6, detect verified episode, which rejects the noise hypothesis, in block 411. At block 412, the verified signal phase count VSC is incremented by one (i.e., VSC=VSC+1). Next, the MAX VOTE is updated at block 425.

The MAX VOTE concept is a further extension of the VOTE count. MAX VOTE is defined as the larger of either the MAX VOTE or the current VOTE count (i.e., MAX VOTE=Max{MAX VOTE, VOTE}). As can be seen by the VOTE equation, a succession of misses will cause the VOTE count to drop sharply thus requiring a lengthy succession of signal status values to overcome such a negative vote; or will classify the peaks as noise, thereafter starting at the next peak over threshold as a start of a new set of multinomial trials. The MAX VOTE concept provides a safety valve against such an occurrence by always establishing a recent MAX VOTE for ready reference. The MAX VOTE count is also useful in signal status determinations.

For example, with reference to the examples shown in FIG. 19(D), MAX VOTE MV=12 because this is the maximum value the VOTE V count attained. After the end of the signal has been detected, reference may be made to the MAX VOTE MV count to determine if the value exceeds the desired threshold hit requirement (which in this example was 10). The MAX VOTE concept is further discussed below.

For the case of all DPT=Max above the signal threshold level STL and below the verified signal threshold level VTL, VOTE V is updated at block 414. Here, a data peak has exceeded the signal threshold level (such as the selected noise threshold probability shown in the table in FIG. 19(C)(i)), and thus a value X must be added to the VOTE V. If the cumulative VOTE V exceeds the variable Z (i.e., the exponent of the desired false alarm probability $P_{fa}$), then V is set to Z because the cumulative VOTE V indicates that the string of hits has become verified (similar to the example shown in FIG. 19(D) when V reached a cumulative count of 10).

After the VOTE update, decisional block 415 determines whether the succession of data peaks has been verified as an event (i.e., V=Z?). If a TRUE indication results, the state variable is set to state 6 at block 416, the verified signal phase count VSC is incremented by one at block 417 and MAX VOTE update is performed at block 425. On the other hand, if a FALSE indication results, flow proceeds directly to the MAX VOTE update operation 425.

For the case of all DPT=Max below the signal threshold level STL, VOTE V is updated at block 418. Here, a data peak did not exceed the signal threshold level STL constituting a miss, and thus a value Y must be subtracted from the VOTE V count. This update operation is illustrated in the example of FIG. 19(D) when the data peak fell below the 0.1 noise threshold, whereby a value of two was subtracted from the VOTE V count to reduce V from 7 to 5.

After the VOTE update at block 418, decisional block 419 determines whether V=0. If a FALSE indication results, flow continues to the MAX VOTE update operation 425.

However, if a TRUE indication results (i.e., V=0), a second decisional block 420 discerns whether the verified signal phase count VSC exceeds zero. If a TRUE indication from decisional block 420 results (i.e., VSC>0), then state 4 is set at block 421 indicating that the verified signal has ended and the operation described in FIG. 19(A) is exited. If a FALSE indication from decisional block 420 results (i.e., VSC=0), then state 0 is set of block 422 indicating that no signal has been detected and the detector is to revert back to a noise status.

Operation blocks 419–422 help discern whether a few detected hits are sufficient to constitute a signal. Consider two examples. First, suppose that two hits were detected above the verified signal threshold level VTL. From the operation of blocks 410–412, VOTE V and VSC would be incremented. Then, if no further hits were detected, VOTE V would eventually be decremented to zero via the VOTE update operation 418. When VOTE V reached zero, decisional block 419 would direct flow to decisional block 420. Since two verified signals were detected, VSC=2 and thus state 4 would be set indicating a verified signal was detected and has ended.

For a second example, suppose a series of five hits were detected above the signal threshold level STL, but below the verified signal threshold level VTL. Suppose also that 10 such hits were required to verify a signal and that this series of five hits were followed by a long series of misses. During the series of hits, VOTE V would be incremented through blocks 414 and 415 (VSC is not incremented because no peaks were above the verified signal threshold). After the series of misses, VOTE V would be reduced to zero via block 418. Thus, when VOTE V=0, decisional block 419 directs flow to decisional block 420. Since VSC=0, state 0 would be set indicating that five hits were statistically considered noise and no further action is required.

In FIG. 19(A), when decisional block 408 directs flow to the all maximum peaks case shown in parallel with the threshold cases, all maximum peaks (noise, signal and verified) determined in block 266 of FIG. 13(A) are input to the binomial integrator (BINT) operator at block 423. As mentioned above, the BINT may be employed independently, or in combination with the three peak cases.

The BINT operation at block 423 is a different technique of determining the existence of a transient signal.

The binomial integration technique is based upon a probability that the signals received is a false alarm and not an informational transient signal. This probability is derived from the binomial distribution of the number of peaks above a predefined threshold with respect to the total number of peaks observed. Accordingly, the BINT may also be used to establish a desired threshold (for example, the signal threshold level STL) based upon a desired probability. The details of the BINT will be described with respect to FIGS. 20(A)–20(C).

Figure 19F:
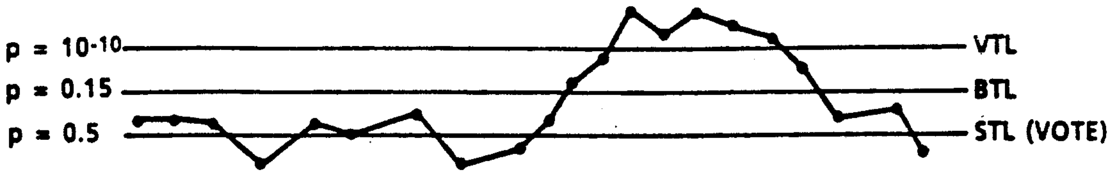
Figure 19:
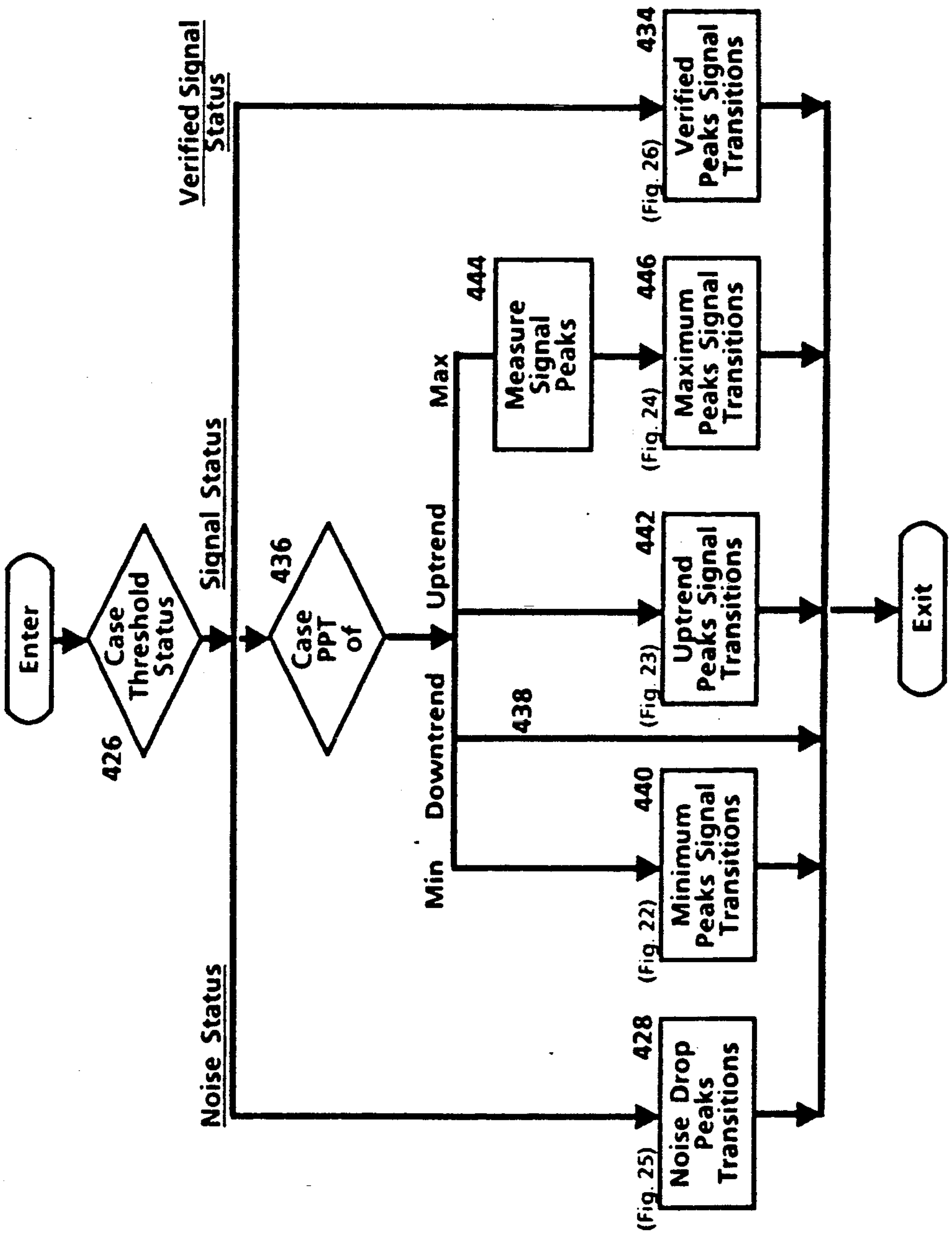

The BINT, when employed in parallel with the other cases, effectively establishes another threshold level as shown in FIG. 19(F). In terms of probabilities, a probability p may be defined as the probability that the MaxPeaks (i.e., maximum peaks) are noise, and thus not a transient signal. Then, the three thresholds may be established according to probabilities. The STL (to which VOTE is gauged) may be set to a probability of $p=0.5$, the BINT threshold level (BTL) may be set to a probability of $p=0.15$ (approximately one standard deviation) and the VTL may be set to a probability of $p=10^{-10}$. Accordingly, four possibilities result. First, if a MaxPeak is above the VTL, the probability of noise is so low that the peak signal values are verified as a signal. Second, if the MaxPeaks lie between the BTL and VTL the peak signal values is likely to be a signal (because there is only a 30% chance that it is noise), but additional peaks are required to verify. Third, if the MaxPeaks lie between STL and BTL, the peak signal values may be a signal, but a larger number of additional peaks are required to verify. Finally, if the MaxPeaks lie below STL, the data is determined to be noise. The determination of these probability values will be described with respect to FIGS. 27(A), 27(B)(i)–27(B)(iii) and 28.

Returning to FIG. 19(A), after the MAX VOTE has been update at block 425, a special end of signal transition sensor SETS operation is performed as indicated by block 413. FIG. 19(G) shows in more detail the special end of signal transition sensor operation 413 of FIG. 19(A).

Upon entering the SETS operation of FIG. 19(G), decisional block 426 determines the threshold status case. For the noise status case (i.e., $\tau<$signal threshold level STL), flow is directed to a noise drop peaks transition function at block 428 (discussed in further detail with regard to FIG. 25) and then the SETS operation of FIG. 19(G) is exited.

For the verified signal status case (i.e., $\tau\geqq$verified signal threshold level VTL), flow is directed to a verified peaks signal transitions function at block 434 (further discussed in detail with regard to FIG. 26) and then the SETS operation is exited.

For the signal status case (i.e., $STL<\tau<VTL$), decisional block 436 determines the peak pattern type unambiguously for the four previously defined cases: minimum, downtrend, uptrend and maximum. The downtrend flow path 438 logically does not require further processing, and immediate exit is made.

Each of the other three peak pattern types will require a transitions determination before the final decisions may be rendered with regard to ending a fading signal. It is readily apparent that a fading signal which is established in a downtrend peak pattern type does not require further monitoring. If the fading signal is established as being in a current minimum, minimum signal peaks transitions function at block 440 (further discussed in detail with regard to FIG. 22) is followed and then the SETS function is exited.

Figure 23:
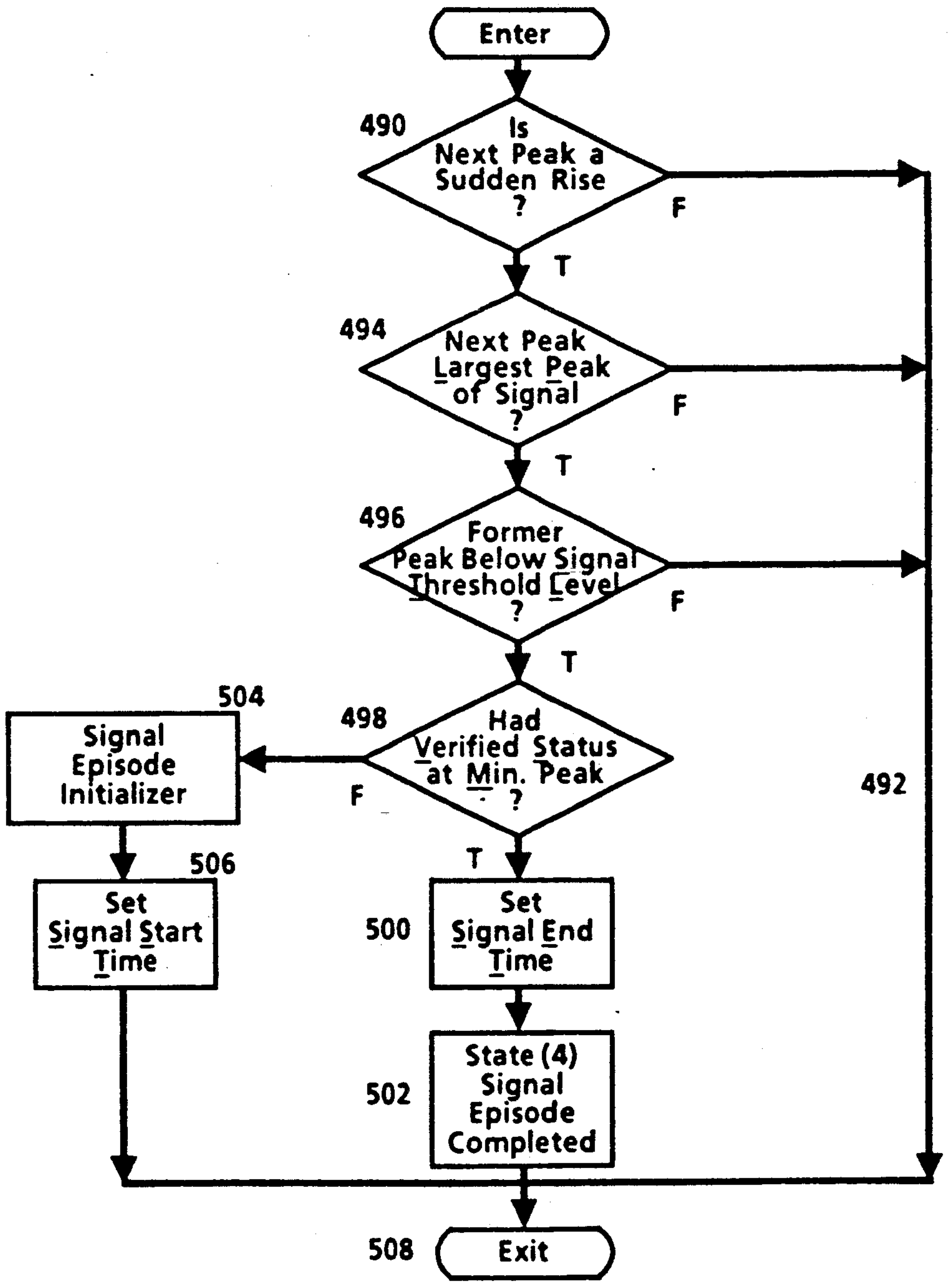
FIG. 23 is further detailed description of the uptrend signal peaks transitions block of FIG. 19(G)

Likewise, an uptrend peak pattern type in a fading signal state requires subsequent consideration in uptrend signal peaks transitions function at block 442 (further discussed in detail with regard to FIG. 23). Thereafter, the SETS function is exited.

If a maximum peak pattern type is detected during a fading signal state, the measure signal peaks array is updated in block 444 because by definition the maximum peak signals are always considered to be of special relevance with regard to episodic information. After the measure signal peaks array is updated, as previously discussed with respect to FIG. 21, a maximum signal peaks transitions function at block 446 (further discussed in detail with regard to FIG. 24) is undertaken. Thereafter, the SETS function is edited.

The transition cases of FIG. 19(G), including blocks 428, 434, 440, 442 and 446, require further detailed consideration because the existing peak value signals are of a mixed nature to the extent that it is difficult to rapidly ascertain the end of a fading signal state. Accordingly, each such transitions state is further detailed in separate figures.

FIG. 20(A) shows a binomial integrator operation 423 of FIG. 19(A). As mentioned above, the BINT determines a probability that the signals received is a false alarm based upon the binomial distribution of the number of peaks above a predefined threshold with respect to the total number of peaks observed.

To better describe this binomial integration embodiment, the following terms are defined for explanatory purposes. Each maximum peak on the peak pattern is referred to as a "MaxPeak". The count of MaxPeak occurrences (i.e., number of maximum peaks observed) is referred to as "Trials". In relation to the threshold level, the MaxPeaks above the threshold are referred to as "Hits", and those below the threshold are referred to as "Misses".

In reference to the imposed threshold level, each Trial will either be a Hit or a Miss. Further, in accordance with binomial distribution principles, each MaxPeak is presumed to be a statistically independent Trial. (This presumption is valid when dealing with data preconditioned to be white and band limited. This preconditioning is preformed by the data prefilter operation 4 of FIG. 1(D), as hereinbefore mentioned.) Thus, a fixed probability p may be defined to represent the probability that the peak signal values are noise and a probability $1-p$ may represent the probability of the signal being a transient event.

Accordingly, the probability of a false alarm where n Hits are counted after observing m Trials is given by a binomial distribution, $$Pfa(n)=C(n,m)p^{n}(1-p)^{m-n}.$$

Since probability p is preset to a desired threshold level (generally one to two standard deviations from the median) and the number of Trials m is continuously counted, a look up table may be employed to quickly determine whether the probability is acceptable. Such a table is shown in FIG. 20(B).

To enhance speed, the table is employed in a unique manner. First, a probability p is preset to a desired value. This probability p establishes a curve, referred to as "CriteriaTrials(Hits)", which relates the number of Hits to the number of Trials required to satisfy the desired probability. Thus, as Hits are received, the present invention merely looks up the number of Hits to determine the Trials satisfying CriteriaTrials(Hits) and compares it to the actual number of Trials. If satisfied, the peak signal values are verified. In other words, CriteriaTrials(Hits) determines the minimum number of Trials required for a given number of Hits wherein the noise hypothesis (i.e., that the peak signal values are noise) is acceptable; otherwise the noise hypothesis is rejected in favor of the transient event hypothesis.

Figure 20:
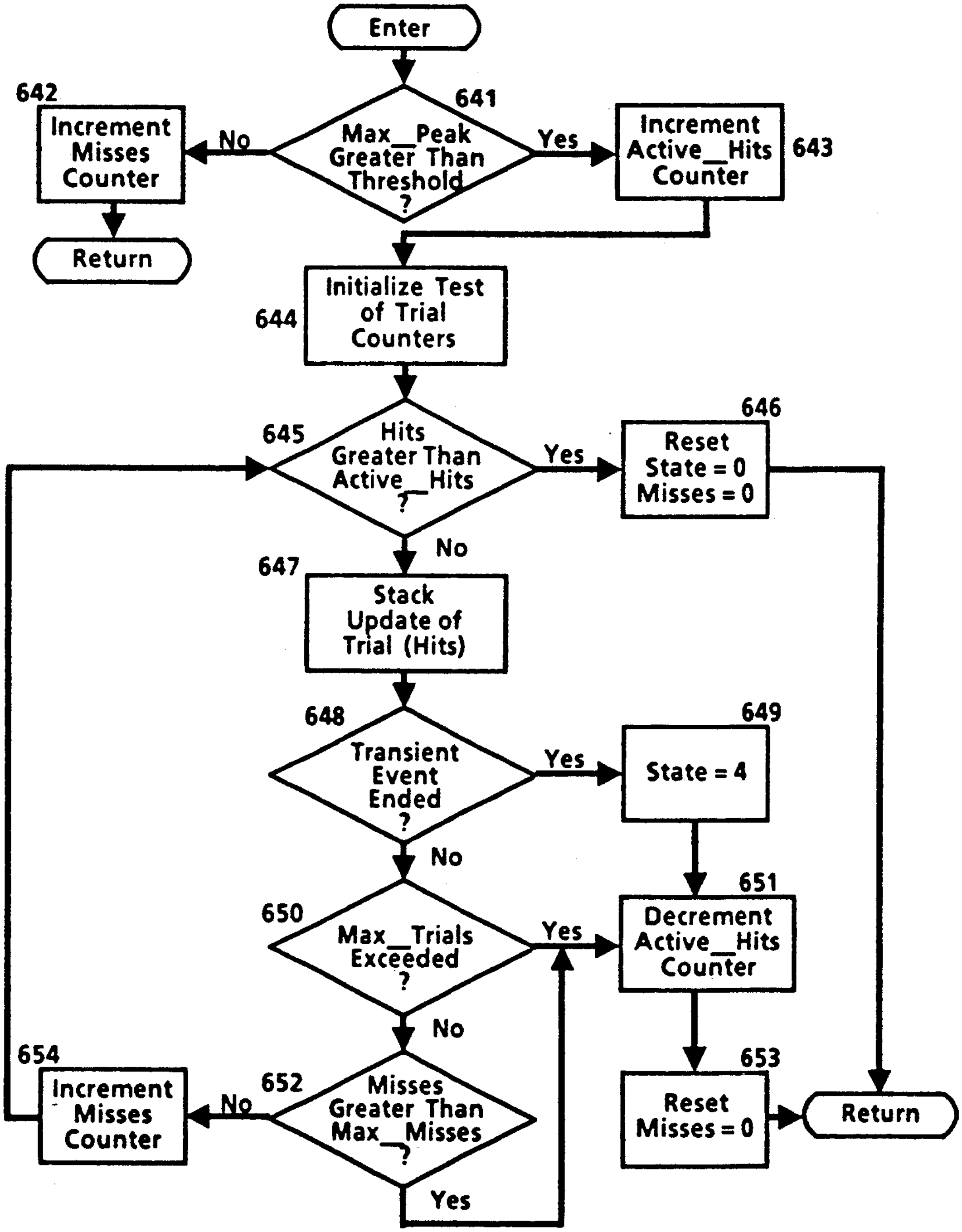
FIG. 20(A) is further detailed description of the binomial integration block of FIG. 19(A)
FIGS. 20(B) and 20(C) illustrate the function of the binomial integrator of FIG. 20(A)
Figure 20B:
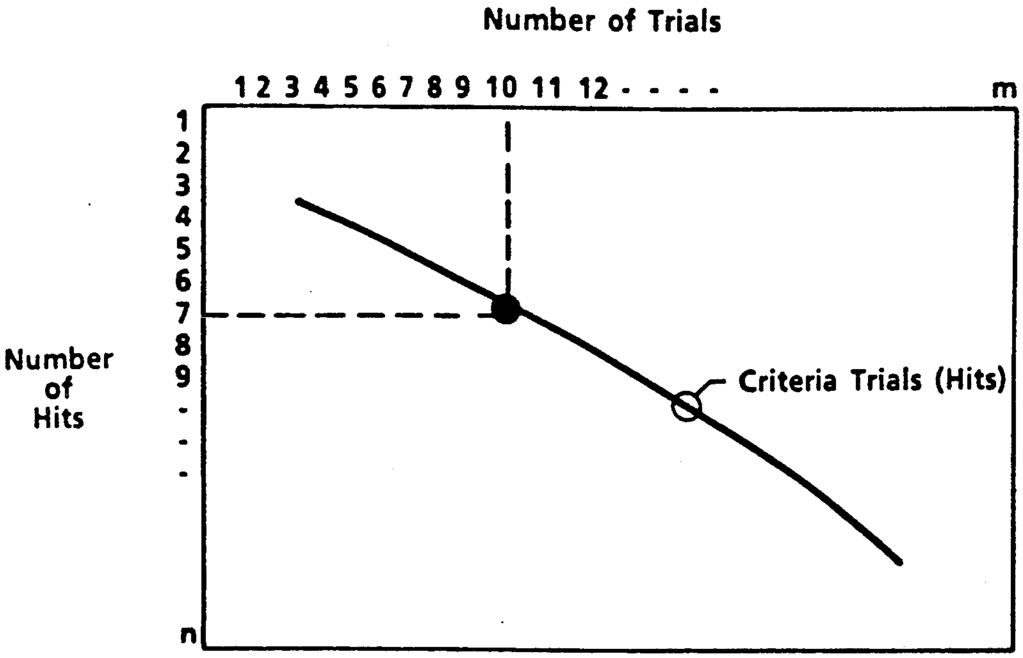

For example, in FIG. 20(B), assume the curve CriteriaTrials(Hits) represents the desired probability to be satisfied before classifying the peak signal values as a transient signal. As the seventh Hit is received, the curve at Hit 7 (i.e., CriteriaTrials(7)) indicates that 10 Trials are necessary for seven Hits to be considered statistically significant. If the actual number of trials is less than or equal to 10 Trials, then the signal is confirmed to be a transient event.

Thus, the table according to the present invention provides high speed determination with no sorting. Further, as shown above, presetting a probability reduces the table to a locus of points along the CriteriaTrials(Hits) curve, and thus, the entire table is no longer used, thereby increasing the lookup speed.

The CriteriaTrials(Hits) curve also provides a method for extrapolating to determine the existence of a transient signal when very few Trials and Hits are counted (dotted line portion of CriteriaTrials(Hits).

Figure 20C:
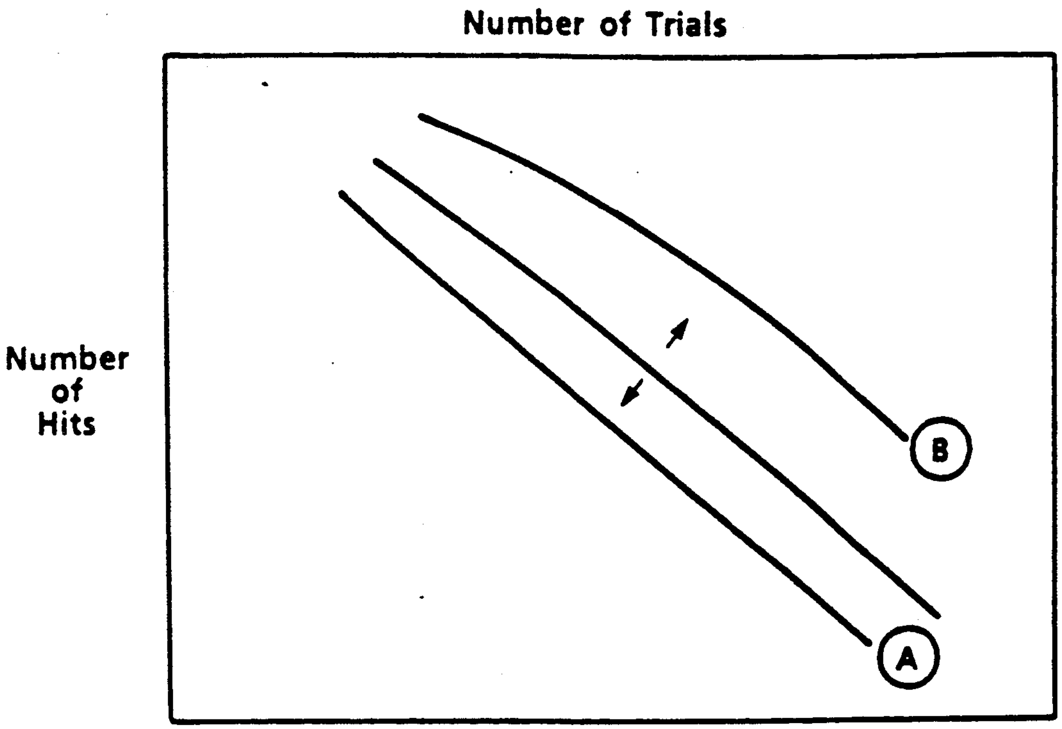

As shown in FIG. 20(C), the CriteriaTrials(Hits) curve, which is determined by the desired preset probability, may be shifted depending upon the probability chosen. For a lower probability (for example, p=0.15) the curve would be shifted in the direction of curve A so that for each Hit, only slightly more Trials would satisfy the probability. For a higher probability (for example, p=0.5), the curve would be shifted in the direction of curve B so that less hits in relation to more Trials would satisfy the probability. In relation to FIG. 19(F), this shifting results in moving the binary integrator threshold level (BTL) up and down.

In FIG. 20(A), upon entering the binomial integrator, the maximum peak pattern of MaxPeaks is compared to a threshold at decisional block 641. If the MaxPeak is equal to or less than the threshold, then a scaler counter of the number of Misses is incremented by a single count at block 642 and the BINT operation is exited. On the other hand, if the MaxPeak is greater than the threshold, a scaler counter of the number of active components of the dynamic array Trials(Hits), referred to as "ActiveHits", is incremented by a single count at block 643. The ActiveHits counter counts the number of trials from oldest active Hits to most recent.

At block 644, a loop for testing an active stack of candidate transient events is initialized by setting the component of the stack of Hits equal to two. The interval between the last two Hits is the first candidate to be tested. NewTrials, the initial value of Trials(Hits) before the update keyed by the most recent Hit, is set to one.

At block 645, if Hits is greater than ActiveHits, the state variable filter value, State, and the Misses counter are reset to zero at block 646 indicating ambient noise, and control is returned to the next process of the Transient Episodic Detector. If Hits is less than or equal to ActiveHits, a three element circular stack updates the component of Trials(Hits) corresponding to the current value of Hits at block 647. The first-in element of the stack, OldTrials, is reset to the value of Trials(Hits). The second-in value of the stack then updates Trials(Hits) with current information obtained from the current counters. Trials(Hits) is incremented by the current count of Misses plus one to account for the last Hit. The last-in element of the stack operator, NewTrials, is reset to the next old value of Trials(Hits) given by OldTrials.

At block 648, Trials(Hits) for the current value of Hits is tested to determine the detection status of the Transient Episodic Detector. If Trials(Hits) is less than a critical number given by CriteriaTrials, then the current candidate transient detection is both verified and the end of the event's code is also verified.

When the transient event is verified at decisional block 648 to have ended, the state variable filter of the Transient Episodic Detector is set to a transitional operating status of four at block 649. This status of four indicates to the detector that a verified transient event was detected and that the detection has ended. Then, in the current duty cycle of collecting the last sample of data, the detector accepts the signal and responds as programmed. At block 651, the ActiveHits counter is decremented by a single count to limit further consideration of events to the remaining recent Hits. At block 653, the Misses counter is reset to zero and control is returned to the next processor of the Transient Episode Detector.

On the other hand, when the transient event is verified not to have ended at decisional block 648, decisional block 650 determines if Trials(Hits) exceeds the maximum allowable number of trials, MaxTrials. If Trials(Hits) is greater than MaxTrials, then ActiveHits is decremented by one at block 651, the Misses counter is reset to zero at block 653 and control is returned to the next process of the detector If Trials(Hits) is less than or equal to MaxTrials, then at block 652, the number of Misses is compared to a limit on an allowable number of consecutive misses, referred to as MaxMisses.

If Misses is greater than MaxMisses then at block 652, ActiveHits is decremented by one at block 651, the Misses counter is reset to zero at block 653 and control is returned to the next activated process of the Transient Episode Detector. However, if Misses is less than or equal to MaxMisses, then Hits is incremented by one at block 654. (Hits is both a statistical parameter and a pointer to the current component of Trials(Hits)). This dynamically expands the number of components of the array Trials(Hits). Following the incrementation of Hits, control is returned to decisional block 645.

This binomial integrator embodiment is particularly well suited for short transient events because it identifies the transient event quickly, and is statistically accurate.

Figure 22:
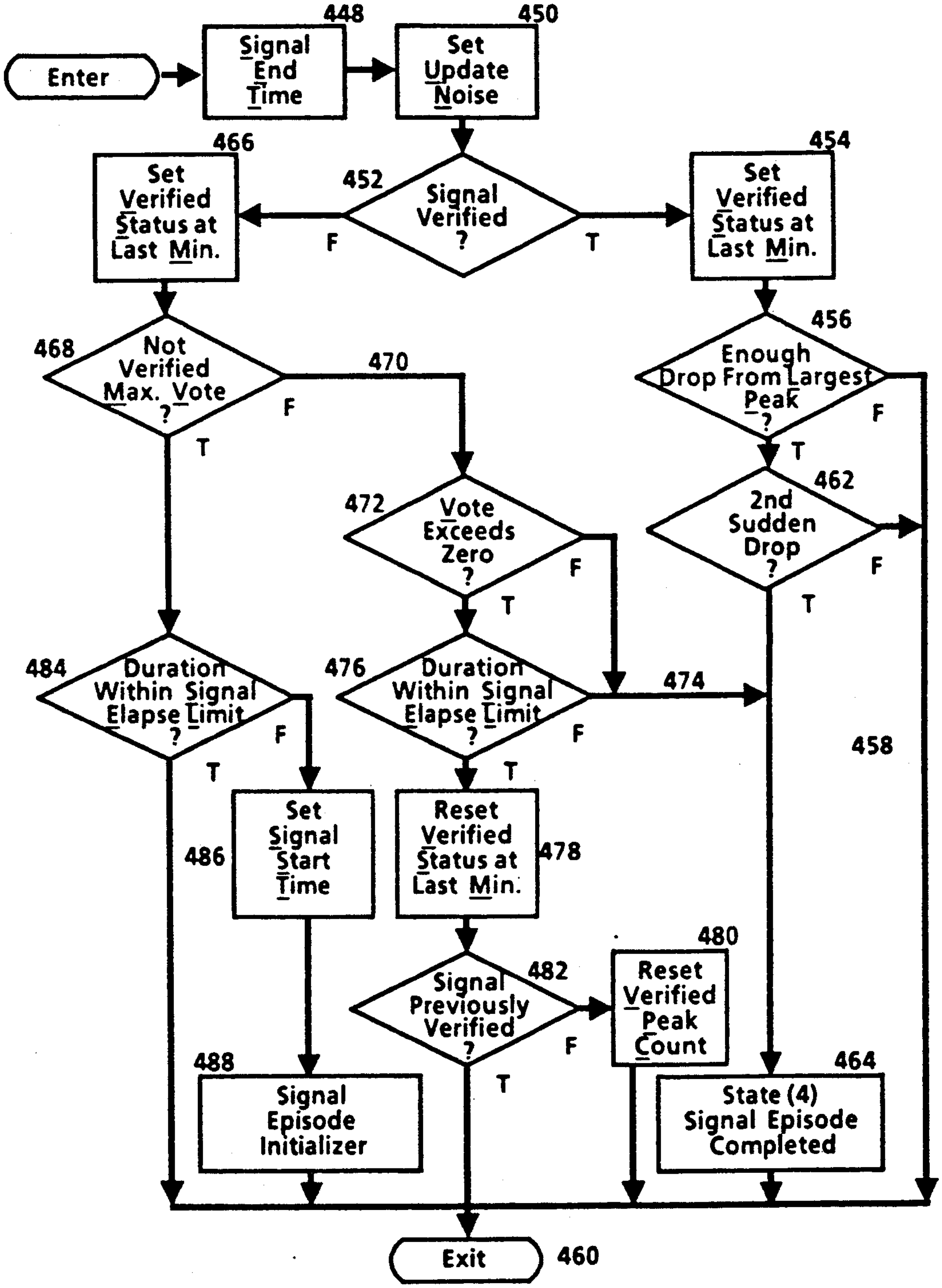
FIG. 22 is further detailed description of the minimum signal peaks transitions block of FIG. 19(G)

With respect to FIG. 22, the minimum signal peaks transitions, flow path is discussed and is of particular importance to the fading signal flow charting of FIG. 18 inasmuch as a minimum peak occurring in a fading signal state generates marginal or gray-line circumstances for ending a signal. The first function of FIG. 22 (shown in block 448) is to reset the signal end time equivalent to the leading edge pointer for the most current peak (i.e., SET=LEP0). Then, the update noise is set equal to TRUE in block 450 inasmuch as the presently declared signal might not actually be a signal, and updating with this noise at this point provides symmetry to other updates of noise.

Noise is updated in the minimum signal peaks transitions case so that a signal which is not verified sufficiently fast will be adapted to by wiping it out. As an example, a noise background may be merely ambient noise when a fan or other steady hum signal is introduced. Initially, this fan may be interpreted as a possible signal, but eventually the transient episode detector adapts to this and treats it as noise. This is accomplished by applying update noise on the random minimum signal peaks. That is to say, a signal cannot be shut off by the introduction of coherent noise sources which are masked by the transient episode detector.

The initial decisional block of FIG. 22 is the verified signal test of branch point 452 which determines whether the signal is verified by examining whether the verified peaks count VPC plus the max vote count MV has exceeded zero. If the signal is verified, the right hand branch is followed and the verified status of the last minimum (i.e., VSM) is set equal to TRUE in block 454. Subsequent to establishment of VSM equals TRUE, two tests are undertaken. First, at decisional block 456, it is determined whether a defined sufficient drop from the largest peak has occurred. This test for sufficient drop is defined as whether four times the peak value PV1 is less than the largest peak (LP). A FALSE indication for this test follows flow path 458, and FIG. 22 is exited through exit 460. A TRUE indication of sufficient drop will lead to a second test conducted in decisional block 462 for defined sudden drop. Sudden drop is defined as whether two times the peak value PV1 is less than the peak value PV2 (i.e., is the current median peak value less than or equal one half of the peak value immediately prior to it).

The practical significance of the sufficient drop test is that if a present signal has dropped to less than one-fourth of the previous peak value, then this signal period will be ended. This permits adaption to changing signals based on their relative values, and not some arbitrarily established absolute scale. If there is a sufficient drop, then the test for sudden drop is performed. This sudden drop test is used in other areas of the transient episode detector. Sufficient drop can be more long-term than the sudden drop concept. Thus, the required condition for ending verified signals is that both sufficient and sudden drop have occurred. Whenever both of these conditions are TRUE for the verified signal, the present state is set equal to state (4), i.e., signal episode completed, to block 464 and the function of FIG. 22 is completed. On the other hand, if either condition is FALSE for the verified signal (i.e., decisional blocks 456 and 462 return a FALSE indication), path 458 is taken to exit operation of FIG. 22.

If the verified signal determination of decision point 452 is FALSE, the verification status at last minimum (i.e. VSM) is set equal to FALSE in block 466. The functional task of the left-hand side of FIG. 22 is to end a signal if at all possible inasmuch as minimums are occurring in a fading signals state. Furthermore, it is known after decisional block 452 that this set of signals have never been verified. Subsequent to the setting of VSM equal FALSE, several tests are undertaken to determine whether it is appropriate to end the present signal.

The first such test is decisional block 468 to determine whether peak values are not verified by the maximum vote count. If the peak values are verified by maximum vote count, the flow path of 470 is followed and a subsequent test in decisional block 472 determines whether the vote exceeds zero. If this is also FALSE, the flow path of 474 is followed and the state (4) signal completed state is entered at block 464, as previously described.

If the vote does exceed zero, decisional block 476 tests to determine whether the duration of the signal is within an established signal elapse time limit. This is similar to other determinations in the transient episode detector where the duration is checked against a signal time limit. A FALSE indication at block 476 will again follow flow path 474 and the signal episode completed state will be adopted.

A TRUE indication in decisional block 476 will cause the verification status at last minimum to be updated in 478, i.e., changed from the FALSE status established in block 466 to a TRUE status as established by block 478. Subsequent to this, decisional block 482 determines whether the signal has been previously verified In other words, has the verified peaks count VPC exceeded zero. If the signal has been previously verified, exit is taken at exit 460. If the signal has not been previously verified, the verified peaks count is reset in block 480, (i.e., VPC is set equal to one) and exit is taken through exit 460.

Returning to the decisional block 468, if a TRUE status is obtained, the decisional block 484 tests the signal for duration within the signal time limit. This is similar to the duration within signal time limit check of decisional block 476, but is different inasmuch as different flow paths have led to this decisional block. A FALSE indication from decisional block 484 will cause the signal start time to be set to the leading edge pointer 1 in block 486 (i.e., SST=LEP1) and the current state is established in the signal episode initializer at block 488 (discussed above with regard to FIG. 18). Upon completion of the signal episode initializer, FIG. 22 is exited through exit 460. If the duration within signal time limit check of decisional block 484 is TRUE, no change to the state or VSM is made, and the flow chart of FIG. 22 is again exited.

In understanding FIG. 22, it should be noted that the maximum vote count, as established in FIG. 19(A) of the transient episode detector, is utilized in the negative sense. That is to say that the maximum vote count is used to dismiss peak values as signals rather than absolutely verify them as such. Any time a maximum vote count check is undertaken, subsequent checks are also undertaken to more fully ascertain the status of a particular signal.

The signal elapsed time limit function of decisional blocks 476 and 484 may be considered to be similar to the edge time limit or noise time limit checks performed in other areas of a transient episode detector Duration is compared against a particular signal time limit inasmuch as only a finite amount of time will be permitted to accomplish verification of a signal in any particular way, for example, max vote or other. If the permitted duration of a signal is exceeded, that signal is automatically cut off and a new start time is established. For example, exiting from the decisional block 484, the signal or leading edge verified state is ultimately established because minimums had been previously detected, and these minimums may provide some information at later points due to usage of the three consecutive time intervals detecting system format. That is to say, the TED when dealing with leading edge pointers LEP2 or 1 always knows what is going to happen in the "future"

inasmuch as LEP0 is known as a part of the set of three formatted detections (data or peak values).

The uptrend signal peaks transitions function at block 442 of FIG. 19(G) is further detailed and described in FIG. 23. Referring to FIG. 23, a sudden rise test is made in block 490 by comparing whether two times peak value PV1 is less than peak value PV0. If there is no sudden rise, the fading signal state is maintained and the uptrend signal peaks transitions block is exited via path 492. If there is a sudden rise, decisional block 494 is entered to determine whether the most recent peak value is the largest peak of the present episode, i.e., PV0>LP. If a FALSE indication is given, again exit is made through path 492 and the uptrend signal peaks transitions flow chart is completed.

As previously discussed, a largest peak (i.e., LP) is determined from peak value PV1. Peak value PV1 is the present peak value (i.e., middle signal). The test indicated in block 494 is whether peak value PV0 is greater than LP. Accordingly, this test is performed on a peak which follows peak value PV1. This permits the transient episode detector to "know" information regarding a "future" signal. If the next peak is not going to be very large (i.e., maximum signal peak), the exit takes place. If it is a very large peak, the next peak is assigned a largest peak value. As long as the sudden rise chain is followed, even previous peaks below the threshold of this signal will be of interest and will be followed because even such a signal will be a maximum value, as long as the sudden rise test was TRUE.

Thus, the transient episode detector realizes that the next peak is going to be largest peak of signal and it adaptively times the overall circuit by retiming the circuit based on the new largest peak value. Since the TED knows that peak values are about to rise sharply, the present start of signal estimate is discarded in favor of the better information which is about to be at hand. Accordingly, an adaptive timing function is established with the means of FIG. 23.

If the next peak is the largest peak of the signal, decisional block 496 tests whether the previous peak value PV2 is below the signal threshold level signal, i.e., whether PV2<STL. If it is, exit is again taken through path 492 from the uptrend signal peaks transitions flow chart. A TRUE indication will cause a verification test in block 498 of the status at the last minimum in the peak. The substantive meaning of such a check is to determine whether the last minimum signal was verified (i.e., VSM=TRUE?). If the last minimum signal was verified, the totality of the signal has already been verified at the last minimum on ending the signal. This is equivalent to setting the signal end time equal to LEP2 (i.e. the earliest zero crossing which is still available information-wise) in block 500 and setting the operational state equal to signal completed state (4) in block 502.

This function prevents loosing the information from the old signal Instead of totally removing that information, the old signal is merely ended and a new signal is started. In effect, two signals of desirable information have been detected consecutively, and this function places a proper brake point between the two separate signals. That is to say, that back-to-back signals are appropriately separated, or chopped. The foregoing chopping or separating function occurs where VSM=TRUE.

If VSM equals FALSE however, the substantive information is that the previous minimum was not verified. This means that a new signal is being started, so the signal start time SST is updated to LEP2 in block 506 after the signal episode initializer at block 504 is completed (previously described in FIG. 18). This obtains the earliest available information to gain the fullest advantage of the new signal information which is apparently beginning. The state is set by the signal episode initializer at block 504 to the first peak of signal, this first peak of signal is measured and then the uptrend signal peaks transitions function of FIG. 23 is exited through exit 508. Return is then made to the appropriate portion of FIG. 19(G).

Referring to FIG. 19(G), it has already been pointed out that the measure signal peaks at block 444 is updated only when all maximums are obtained in the peak pattern type determination at block 436. That is to say, the TED does not measure signal peaks for other peak pattern types. Only the signal peaks of max peak signals peak pattern type are measured. Following measurement of the signal peaks in block 444, the maximum signal peaks transitions in block 446 is entered. This function is further detailed in FIG. 24.

Figure 24:
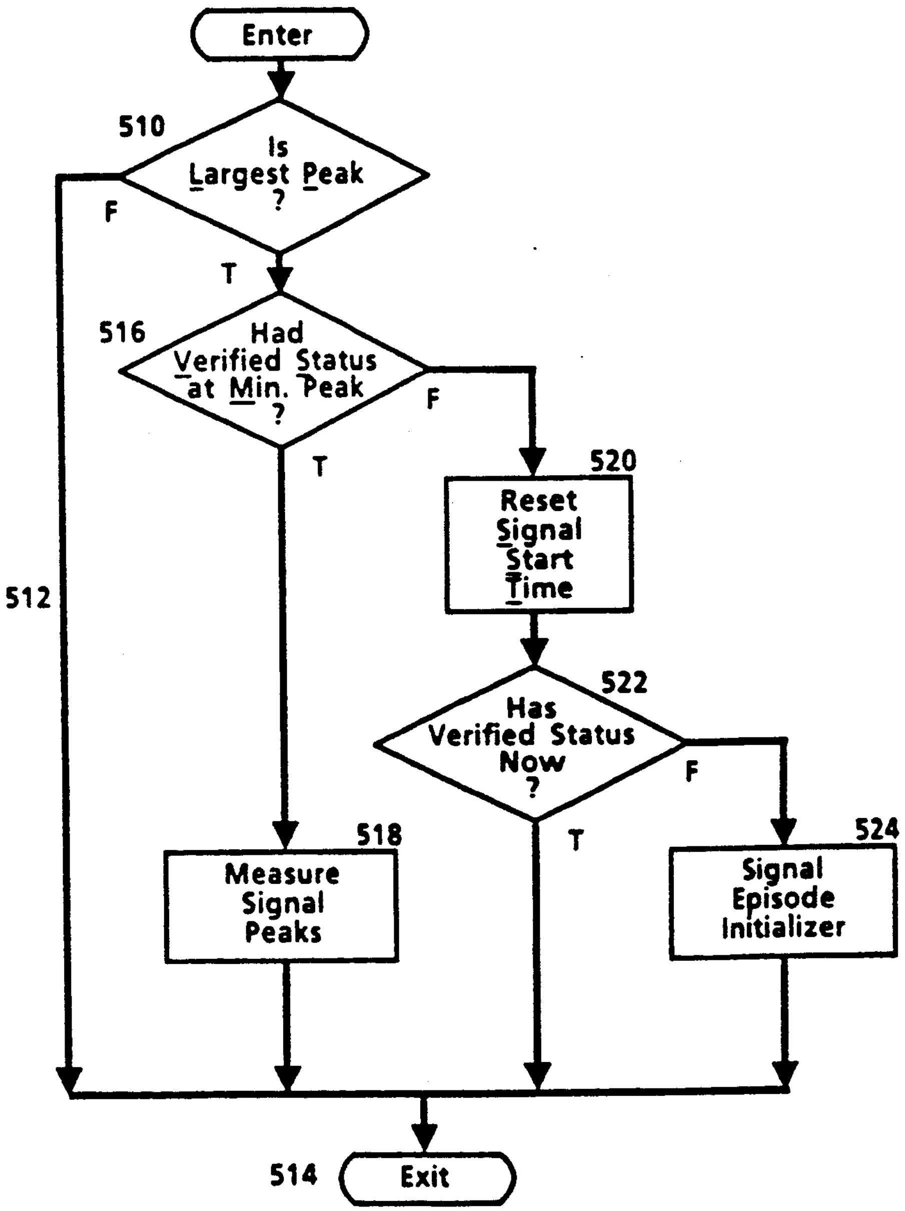
FIG. 24 is further detailed description of the maximum signal peaks transitions block of FIG. 19(G)

Upon entering the max signal peaks transition function of FIG. 24, the initial step is to determine in decisional block 510 whether the present peak is the largest maximum signal peak. That is, whether the peak value PV1 exceeds the largest peak LP. If the peak value PV1 is not the largest maximum signal peak, flow path 512 is followed and FIG. 24 is exited through exit 514 and return made to FIG. 19(G). If this indication is TRUE, the verified status of the minimum peak VSM is checked in decisional block 516. A true verified status at the minimum peak (i.e., VSM=TRUE) would cause the measure signal peaks function at block 518 to be undertaken as previously described with regard to FIG. 21. The substantive importance of this function to the host computer is that the largest maximum peak encountered to the present time is now available in the measure signal peaks array 404.

If the verification test at block 516 is FALSE, the signal start time is set equal to the previous signal end time in block 520 (i.e., SST=SET), and the MAX VOTE count is utilized in block 522 to further test for verification status. If the signal is verified in block 522 by the MAX VOTE count (i.e., MV>0), direct exit is made through exit 514. If no verification is possible through MAX VOTE (i.e., MV≦0), the signal episode initializer at block 524 is undertaken and then exit is made through exit 514.

The functional importance of the latter portion of FIG. 24 is that unimportant information is excised from a series of informational pulses leading up to a large episodic peak. The peak information (which is of importance to the ultimate program) is effectively lifted from the other non-informational signals and is continued available to the host computer through this measure signal peaks window at block 518. Comparing this with the uptrend signal peaks transitions discussed with FIG. 23, the FIG. 23 function amounted to a bisecting of two signals whereas the FIG. 24 function amounts to chopping off or eliminating unimportant information from important information. The eliminated information is the frontal portion of a total signal. The usable information is continued on through the system. The nonimportant information is so defined because it was never verified, either through achieving the verified threshold status or through the vote count or max vote count.

Referring again to FIG. 19(G), the threshold status case of all noise peaks covers a situation where a fading signal state exists but the signal is very complex and has repetitive small levels of peaks that are below threshold and in the noise. As previously discussed, this flow path will determine whether it is appropriate to end the signal and to look for a start time for a subsequent signal. This is the only flow path of FIG. 19(G) for a fading signal which is in the noise threshold status, and the path leads to the noise drop peaks transitions function at block 428 which is further discussed in detail with reference to FIG. 25.

Figure 25:
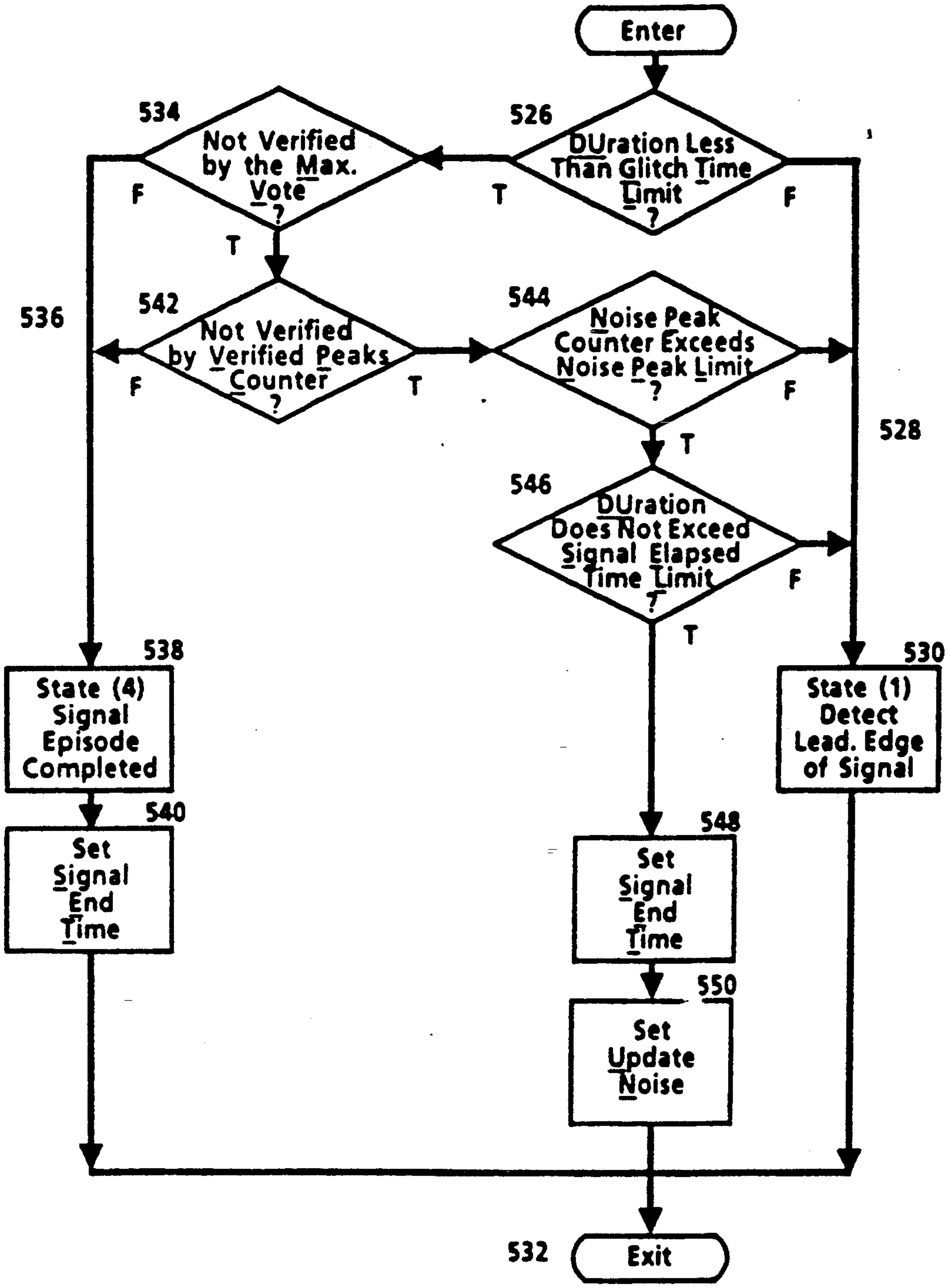
FIG. 25 is further detailed description of the noise drop peaks transitions block of FIG. 19(G)

Referring now to FIG. 25, the noise drop peaks transitions begins by comparing the established duration with a defined selectable glitch time limit in block 526. Very sudden noise peaks can occur due to lightning and other such undesirable signals which will be defined as glitches in the data. The glitch time is minimum time duration which will be acceptable for usable informational signals. The establishment of the glitch data is best suited in the context of a particular environment where the transient episode detector is used. Visual inspection of waveforms may be used to indicate time durations of events which would never be desired to be declared as signals. This time can then be related to this minimum time duration or glitch time and applied in decisional block 526.

The glitch time is a minimum threshold time duration for accepting peak value information as a signal and the glitch time limit defaults to six during initialization. Anything of duration below the established glitch time will indicate that the signal has fallen into noise and path 528 is taken to establish in block 530 the current state as state (1) detect leading edge of signal, and FIG. 25 is exited through exit 532.

If the glitch time hurdle is cleared, several verifications steps are undertaken. In decisional block 534 a determination is made whether the signal has been verified by the maximum vote count. If the signal has been verified (i.e., $MV>0$), flow path 536 is followed and the current state is set in block 538 equal to state(4) signal episode completed and the signal end time SET is updated in block 540 to leading edge pointer LEP1, followed by an exit through exit 532.

If the signal has not been verified by the maximum vote count (i.e., $MV \leqq 0$), a further verification test is attempted in decisional block 542 to determine whether verification has been made by the verified peaks counter. The logic behind this function is that it is desirable to permit a particular signal to be afforded every opportunity to be verified or established as a signal. Accordingly, multiple tests are made before a signal is completely dismissed. If the signal is verified in decisional block 542, flow path 536 is then again followed to set the current state equal to signal episode completed and update the signal end time prior to exiting the flow path. If the decisional block 542 verification also fails, the noise peak counter is tested in block 544 to determine whether it exceeds the noise peak limit (i.e., $NPC>NPL$). The noise peak limit defaults to three during initialization.

If this determination at block 544 is FALSE, flow path 528 is then again followed to set the current state equal to detect leading edge of signal and exit is taken. A TRUE indication from block 544 will again cause a further test in decisional block 546. This test is to determine whether the duration exceeds the signal elapsed time limit. A FALSE indication from block 546 again produces a following of flow path 528 which sets the current state equal to detect leading edge of signal. This is the last decisional test made within the function of FIG. 25. Accordingly, if a TRUE indication is received in this last test, the signal end time SET is updated to leading edge pointer LEP1 in block 548 and the update noise flag is set to TRUE in block 550. Completion of the update noise function in block 550 will also cause an exit from FIG. 25 and a return to the main fading signal function of FIG. 19(G).

To summarize the overall function of FIG. 25, it should be noted that the signal end time is updated to leading edge pointer LEP1 for two of the three possible cases. The third case (flow path 528) generates a change of state to state (1) detect leading edge of signal. A new comparison item was first set forth in decisional block 544 whenever the noise peak counter was compared with a noise peak limit. The number of times that the noise range has been entered is counted, and whenever a particular limit is reached the signal is cancelled. Similar to the glitch time, this prevents an undue amount of noise from hanging on too long and ultimately being verified as a signal. The functions of FIG. 25 involve multiple decisional blocks to provide every opportunity for a signal to be verified or established. That is to say that it is desirable to prevent the filtering out of true signal information to the extent that such action can be prevented.

Referring again to the special end of signal transition sensor function in block 413 of FIG. 19(A), all subsequent figures with regard to the transitions blocks have been discussed and explained with the exception of the verified peaks transitions function of block 434 of FIG. 19(G). The verified peaks transitions function 434 is further detailed with reference to FIG. 26.

Figure 26:
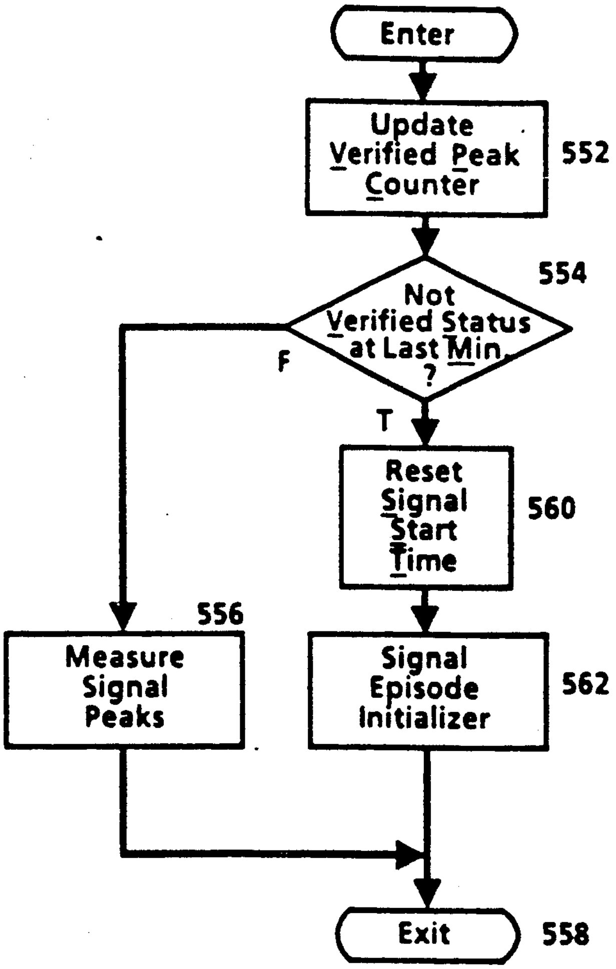
FIG. 26 is further detailed description of the verified peaks transitions block of FIG. 19(G)
Figure 27:
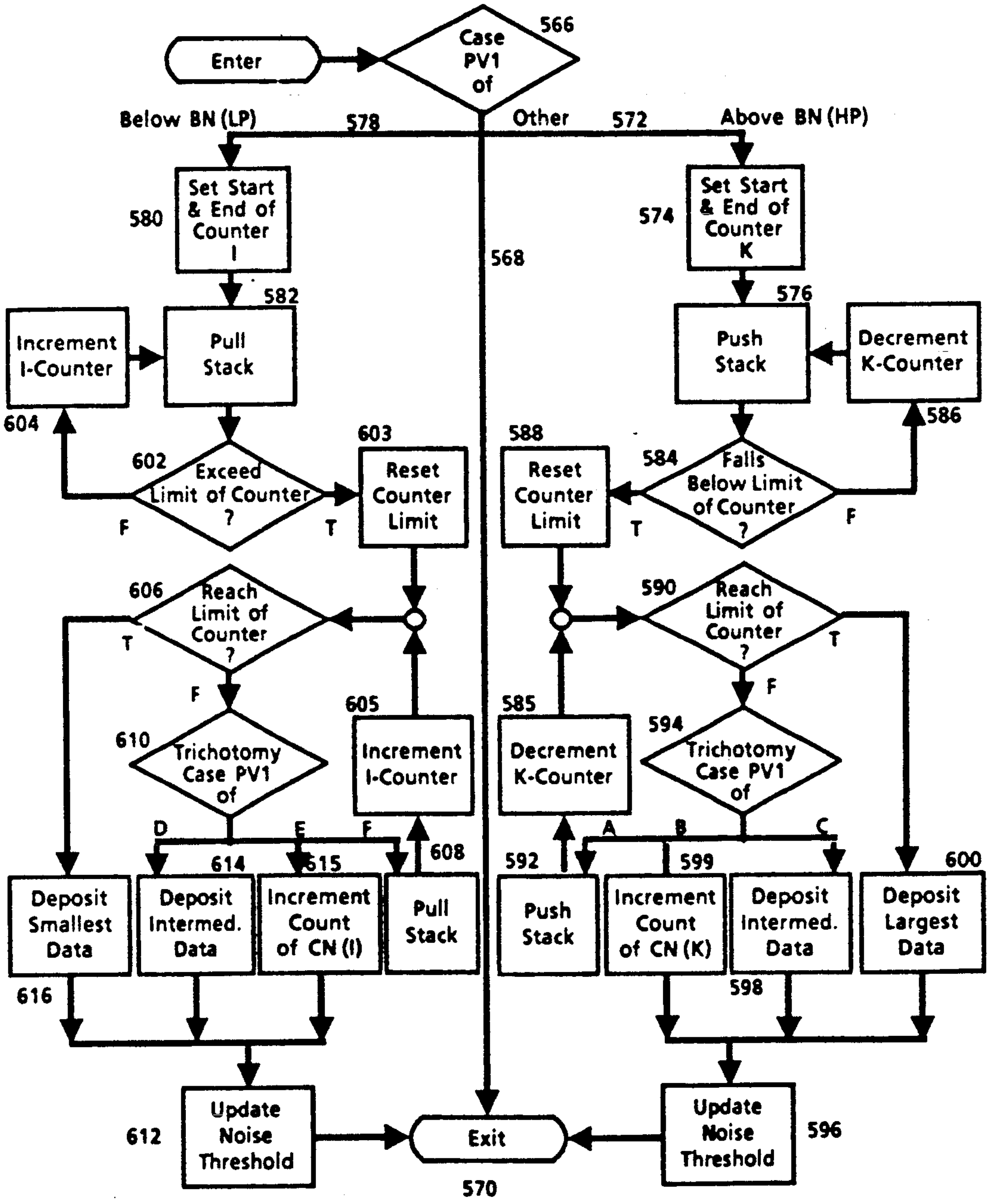
FIG. 27(A) is further detailed description of the update noise statistics block of FIG. 1(D)
FIGS. 27(B)(i)–27(B)(iii) illustrate the stack function of the noise statistics array and corresponding histogram array utilized in conjunction with the update noise statistics function of FIGS. 27(A) and 1(D)
FIGS. 27(C)(i) and 27(C)(ii) illustrate how the stack structures of FIGS. 27(B)(i) and 27(B)(ii) may be used to determine probability levels.

Referring to FIG. 26, upon entering the verified peaks transitions functions, the verified peak counter VPC is incremented in block 552, i.e., $VPC=VPC+1$. Subsequently, a single decisional block 554 is undertaken. This block determines whether the verified status at last minimum (i.e., VSM) is set equal to FALSE. If this detection is FALSE, the measure signal peaks process of block 556 (further defined and explained with reference to FIG. 21) is undertaken and then exit made through exit 558. A TRUE indication for VSM equal FALSE causes the signal start time SST to be reset to the signal end time SET at block 560. That is to say that a signal has been established and ended and the signal episode initializer at block 562 (previously discussed with reference to FIG. 18) is undertaken exit is made through exit 558.

Conclusion of the description for FIG. 26 completes description of the update state variables function at block 16 of FIG. 1(D). The final functions of FIG. 1(D) include the decisional block 18 to determine whether it is appropriate to update the noise, and the actual updating of the noise statistics in functional block 20. As was previously discussed, if the update state variables function at block 16 has not produced an update noise true status, flow path 24 returns the transient episode detector to the start point of accept and transmit data, block 2 of FIG. 1(D). If, on the other hand, operation of the update state variables function at block 16 of FIG. 1(D) has generated an update noise true indicator, then update noise statistics function block 20 is entered. This updating of noise statistics is further defined and detailed in FIGS. 27(A), 27(B)(i), 27(B)(ii) and 28. Upon completion of the updating of noise statistics, flow path 22 is followed, again returning the transient episode detector to its start point of accepting or transmitting data.

Referring now to FIGS. 27(A), 27(B)(i) and 27(B)(ii) with regard to updating noise statistics function block 20 of FIG. 1(D), a positive feedback noise updating process incorporates use of the previously discussed stack (buffered noise array) 564 which may be pushed or pulled, i.e. moved up or down, in the process of incorporating new noise statistics therein. The previous stack discussed with regard to FIG. 16(B)(ii) was the same stack operated to initialize noise statistics, i.e., warm up process state (0), and its operation is similar to present stack 564 in certain regards. However, the distinctions between the operation modes of previous stack 30B and present stack 564 are of functional importance.

The previous stack operation began with a very large number L, much larger than any expected data, entered in the bottom of the stack, and new data was recursively sorted into the stack by constantly rolling the larger data in an upwards fashion. That is to say that initializing noise statistics, which were dummy data, were constantly being popped off the top until the very large number L had been moved to the topmost position.

The operation of present stack 564 of FIG. 27(B)(i) is a positive feedback recursive sort noise updating process which will permit movement of the stack in either an upwards or downwards direction That is to say that data may be popped off at either end, with a pop off occurring at the top being defined as pulling the stack, and a pop off from the bottom being defined as pushing the stack. Thus, the stack updates extremal values only.

The stack 564 operation is similar to the stack 308 operation in that the larger numbers are at the top of the stack and the smaller numbers are at the bottom. That is to say that buffered noise BN(1) would be the largest number and buffered noise BN(BNL) is the smallest number. N represents the size of the stack, which is changes for a particular operating time frame of the transient episode detector. The previous stack 308 operation was to fill the stack with new data to warm up or start up the overall TED.

The importance of the size of present stack 564 is that the number N will govern how fast the stack will be able to adapt to any change in the noise source. That is to say that the size of the stack is in direct relation to the amount of time available to declare a particular signal to be of a certain status, and then adapt the stack 564 to the newly declared signal For example, referring to the fan background noise example discussed above, the size of the stack 564 will determine how long it will take that new fan noise to work its way into the stack and for the statistics to adapt to that particular noise as being background. This adaptation time is therefore directly controlled by the size of the stack N. The physical dimension of the stack is the time determinative force in responding to new signals, i.e. adaptation time.

The time scale is the only criterion utilized in distinguishing an informational disturbance from ordinary background noise. Nothing else is assumed, and the determinative force in governing the time scale is only the size N of stack 564. To place the time function of the stack 564 in perspective, it may be considered that the determination of what is short term is a relative concept, which could be several seconds or several microseconds depending on the sampling rate and size of the informational signals.

Referring to the stack 564 of FIG. 27(B)(i), buffered noise BN(1) is the largest sample, buffered noise BN(BNL) is the smallest sample. Buffered noise BN(HP) is defined as the high percentile and may be selected as a particular default percentage of the present stack values, e.g., 10%. Likewise, buffered noise BN(LP) is defined as the low percentile and is the same percentage from the bottom of the stack. This concept is necessary because the present data is all integer data, i.e , meaning frequent repetitions of the same numbers in the stack. It is readily apparent that no particular new information is obtained whenever repetitive integers are filling the stack. Introduction of the high percentile and low percentile concept eliminates this particular repetition problem and operates to make adaptation of the stack more efficient in that the stack is not constantly updating. Specifically, if a particular data point is within the range of BN(HP) and BN(LP) in the stack, the stack does not attempt to update with this data. This saves significant amounts of time by eliminating an update routine based on low information data.

The effective sampling rate is not changed, but the update process is only required for about one-tenth of all the available values because of this high percentile-low percentile operation. These values are actually selected by the user, as will be seen with further discussion below, and they provide a convenient means of normalizing distributions for skewness and kurtosis.

In addition to the percentile ratings of the stack which may be established and processed in the update noise statistics function of FIG. 27(A), high quartiles and low quartiles may be established and similarly utilized. The high quartile would be defined by buffered noise BN(HQ) meaning the twenty-fifth percentile mark. The seventy-fifth percentile mark with regard to the totality of the stack would be the low quartile, buffered noise BN(LQ). Utilization of these values will be fully explained with reference to FIG. 27(A).

An example of a push situation is introduction of a data point which is larger than buffered noise BN(2). This will require that everything else be pushed down to make room for the new data point. The positive feedback algorithms, which will be discussed in further detail with regard to FIG. 27(A), achieves the pushing effect. This positive feedback algorithm provides the fastest possible adaptation to a noise transition. Negative feedback at this point could not achieve a desired effect of both stabilizing the stack and providing sufficiently fast adaptation to changing noise statistics. Negative feedback would require a new high value coming in to be balanced off by rejecting the highest extremal values. That is, negative feedback requires that the extremal value be thrown away to make room within the stack for the new data acquired. This means that particularly useful information may be artificially discarded to preserve a stable system. Such a system does not ever change or adapt sufficiently to wide fluctuations in noise statistics. In effect, negative feedback established for stack 564 would tend to center on certain data and lock in on it, as opposed to being adaptable to important fluctuations in noise statistics.

The positive feedback system of the present invention overcomes the problem of simultaneous rapid adaptation with stability in a stack system. This is accomplished by discarding extremal values which are opposite the sense of the new data. If new data is obtained which is above the median, then the data which is discarded is the smallest extremal as opposed to the largest extremal. If the noise were suddenly to grow large in a consistent fashion, the positive feedback would roll the new high data into the stack and push down the old normal group (i.e., those values between the percentile or quartile values) and replace it with higher data. Accordingly, the normal group also rapidly adapts to changes in the noise statistics which causes the entire stack to be extremely responsive and adaptive to significant noise statistical changes.

Similar to FIG. 16(B)(i), FIG. 27(B)(ii) shows a CN array 565 which is the number of repetitions (or histogram) of the corresponding noise statistic in the BN array 564. Accordingly, when subsequent values are equal to prior values in the BN array 564, these values only provide redundant information and are not sorted. However, these redundant values are counted in the CN array 565 to maintain the number of repetitions of each noise statistic value (i.e., the histogram).

FIG. 27(B)(iii) is a table listing the default values for the statistical parameters employed in the buffered noise array 564 and the CN array 565. These default values are initially filled during the initial statistics state (0).

This adaptive behavior is achieved through the recursive sort set forth in the flow charting of FIG. 27(A). Upon entering this sort decisional block 566 determines the nature of the new noise statistics (i.e., value of peak value PV1 with reference to the present stack contents). As was previously stated, any new statistic which falls within the normal of the present contents of stack 564 (i.e., BN(LP)<PV1<BN(HP)) is simply passed over. That is to say that flow path 568 is followed immediately to the exit 570 of FIG. 27(A).

Data which is above the high percentile mark of stack 564 (i.e., PV1≧BN(HP)) will follow flow path 572 and generate a push stack operation in block 576 after setting the start and end of counter K in block 574. The start of counter K is set to the value BNL−1 and the end of counter K is set to the high percentile value HP. Data which is below the low percentile data point of current stack 564 (i.e., PV1≦BN(LP)) will follow the flow path 578 and generate a pull stack operation in block 582 after setting the start and end of counter I in block 580. The start of counter I is set to two and the end of counter I is set to the low percentile value HP.

Following along the flow path 572, a decisional block 584 determines the proper point of entry for the new data bit. If the counter K is greater than the end of the counter (set to HP), the counter is decremented in block 586 (i.e., K=K 1)−1) and the stack is pushed at block 576 (i.e., BN(K+1)=B(K)). Accordingly, a push stack operation is handled by the K counter system of blocks 586, 576 and 584. If the counter K is less than the counter limit, the recursive sort continues through blocks 588 and 590, as was fully described with regard to a recursive sort system of the stack for FIG. 16(A). That is, the limit of counter K is reset to one at block 588. Then, at block 590, it is determined whether the counter K has reached the counter limit of one. If counter K has not reached the counter limit, the peak value PV1 is compared to the present stack value BN(K) at block 594.

If peak value PV1 is greater than the stack value BN(K) (i.e. case A), the push stack operation is performed at block 592 (i.e., BN(K+1)=BN(K)), the Counter K is decremented at block 585, and flow is returned to block 590. If peak value PV1 is equal to the stack value BN(K) (i.e., case B), then the CN array count at CN(K) is incremented at block 599, thereby updating the histogram data, and the noise threshold is updated at block 596. If the peak value PV1 is less than the stack value BN(K) (i.e., case C), it is deposited as intermediate data at block 598 (i.e., BN(K+1)=PV1) and then the noise threshold is updated at block 596.

Referring to block 590, if the counter K reaches the counter limit, the data is deposited as the largest data at block 600 (i.e., BN(K)=PV1), thereby establishing a new noise extremal. Subsequently, the noise update threshold operation is performed at block 596 and then exit is made through exit 570 and return to FIG. 1(D).

The noise update threshold operation at block 596 is discussed in more detail with reference to FIG. 28.

Flow path 578 of FIG. 27(A) (i.e. the left-hand side) is descriptive of a pull stack operation of the present recursive sorter algorithm, which is fully analogous to the push stack operation described with regard to flow path 572. The distinction is, of course, that the data being handled is lower than the low percentile value for the current stack 564 contents Pull stack operator 582 incorporates the recursive sort process, which was fully described with regard to FIG. 16(A) above. That is, if the counter I has not exceeded the counter limit (which is set to the low percentile value LP) block 602, the counter I is incremented at block 604 (i.e., I=I+1) and the stack is pulled at block 582 (i.e., BN(I-1)=BN(I)). On the other hand, if the counter I exceeds the counter limit, the counter I is reset to BNL at block 603.

At block 606, it is determined whether counter I has reached the counter limit which was just reset at block 603. If a FALSE indication is returned, the peak value PV1 is compared to the present stack value BN(I) in block 610. If peak value PV1 is less than the stack value BN(I) (i.e., case F), the pull stack operation is performed at block 608 (i.e., BN(I-1)=BN(I)), the counter I is incremented at block 605, and flow is returned to block 606 If peak value PV1 is equal to the stack value BN(I) (i.e., case E), then the count of the CN array 565 at CN(I) is incremented at block 615 and the noise threshold is updated at block 612. If the (i.e., case D), it is deposited as intermediate data at block 614 (i.e., BN(I-1)=PV1) and then the noise threshold is updated at block 612.

Referring to block 606, if the counter I reaches the counter limit, the peak value PV1 is deposited as the largest data at block 616 (i.e., BN(I)=PV1), thereby establishing a new noise extremal. Subsequently, the noise update threshold operation is performed at block 612 and then exit is made through exit 570 and return to FIG. 1(D).

An exemplar overview of the FIG. 27(A) operation yields the realization that the precise definition of a low percentile and high percentile value may be subject to selection by an operator. Statistically speaking, the integral above a normal distribution of one standard deviation is approximately 0.15 of the total. That is to say that if N is equivalent to 100, the high normal value could be the fifteenth highest value in stack 564, if a statistical standard deviation were sought. The low normal value would then be defined as the fifteenth value from the bottom. Viewing the low and high normal values on a percentile basis for standard statistical deviations, the high percentile would be the fifteenth percentile value and the low percentile would be the eighty-fifth percentile value. Specific values of low and high percentile distributions are selectable by an ultimate user so that calculations for skewness, kurtosis and other statistical determinations may be most readily facilitated.

The statistical relevance is better shown in FIG. 27(C)(i) which shows a normal distribution curve. The median, high quartile and high percentile are all identified with respect to this distribution. These distribution percentages may be used to establish the probability levels as shown in FIG. 27(C)(ii). For example, the median could establish a 50% probability level, the high percentile could establish a 10% probability level, and the largest noise data BN(1) may be used to establish the lowest probability level (e.g., 1%).

Further, these probability levels may correspond directly to the verified threshold level (VTL), the BINT threshold level (BTL), and the signal threshold level (STL), respectively. Thus, the stack 564 may be employed to set one or more of the threshold levels described above in relation to FIGS. 19(C).

It is further apparent in reviewing FIG. 27(A) that the positive feedback recursive sort scheme requires that all of the values in the stack be moved upwards or downwards in response to a pull or push stack operation. Negative feedback would require simply popping off extremal values without further significant alteration of the stack. The positive feedback approach permits very rapid adaptation to values which come in above or below the median values. Changes such as these in a negative feedback stack would simply keep pushing in or out the new extremal values and not pick up quickly on significant multiple changes in noise statistics.

The necessity of two push stacks and two pull stacks is grounded on utilization of the percentile values approach The breakup simplifies working with the percentile value by pulling or pushing down or up to the percentile and separately operating on new data which may be effecting the determination of the percentile values in a newly established current stack. That is to say, the breaking into parts permits greater efficiency of the overall stack operation. Utilization of the high percentile-low percentile concept with the positive feedback and recursive sort process permits the overall value and the normal values of the stack to be rapidly changed thereby permitting maximum adaptability to changing noise statistics.

Non-parametrical statistical approaches are available via the histogram generated during the warm-up phase of the detector shown in FIG. 16(A). One option is to freeze the histogram and utilize update noise statistics operation (FIG. 27(A)) to merely shift the range of ranked normal noise statistics pertaining to the fixed histograms. A second alternative is to update the histogram upon encountering repetitions of the ranked noise statistics (see blocks 598 and 614 of FIG. 27(A)). In this latter option, both the values of the ranked statistics and their frequency of occurrence vary with time.

Figure 28:
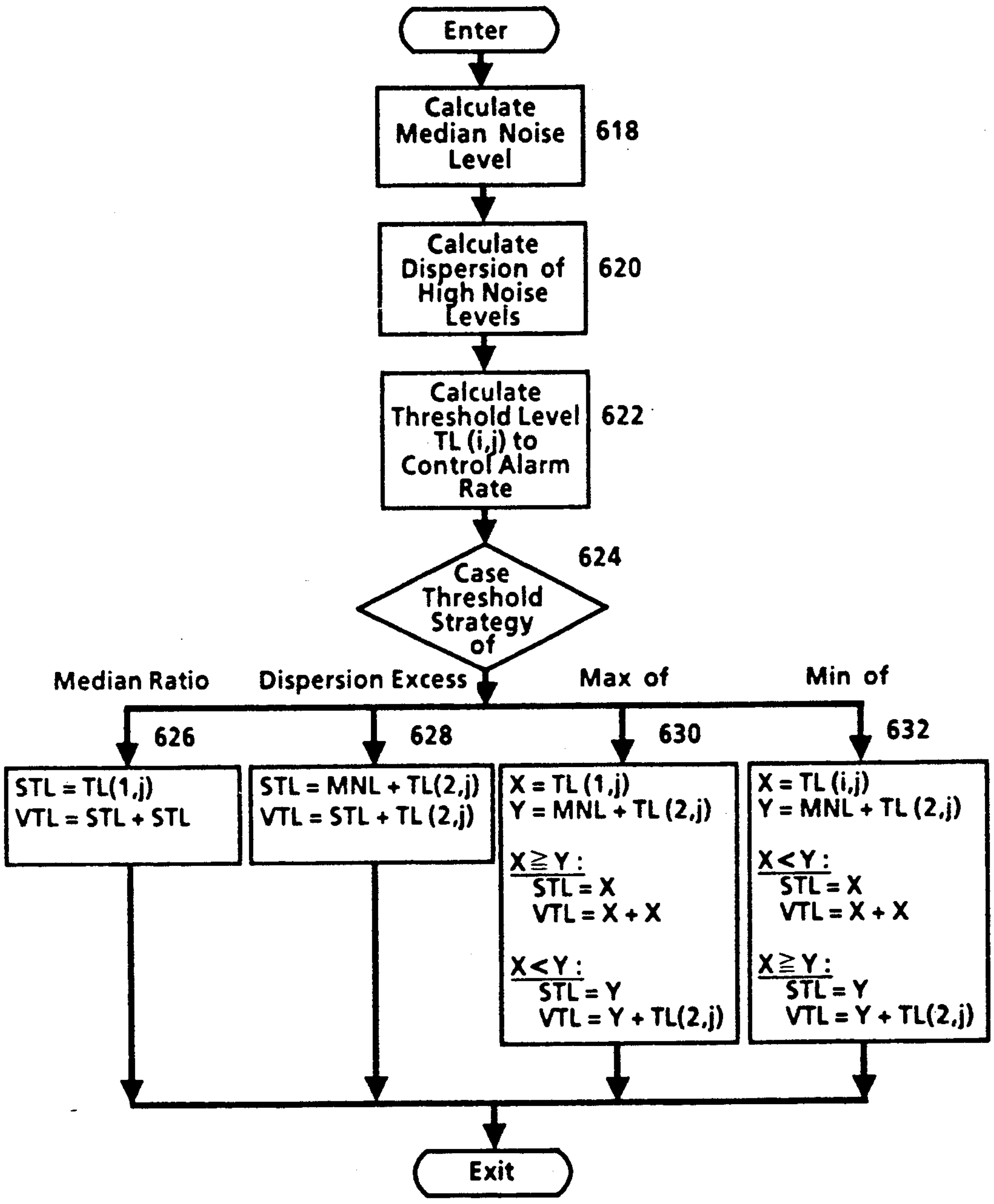
FIG. 28 is further detailed description of the update noise threshold blocks of FIG. 27(A).

Referring now to FIG. 28, calculations are indicated which establish the noise thresholds. These calculations are limited to additions or subtractions in order to maintain maximum efficiency and simplicity. Upon entering FIG. 28 the initial calculation undertaken is to calculate the median noise level MNL in block 618. This is effectively to determine the middle value in the stack 564 of FIG. 27(B)(i). Dispersion is then calculated for the high noise levels at block 620 (i.e. DHNL=Stack(MHI)-- Stack(Median noise level)) and measured to determined the standard deviation.

The operation of block 622 is a calculation which is central to the update noise threshold function In it, the threshold level subject to user determined array values for i and j are calculated to control the alarm rate. The i values may be either one or two in the ij arrays. This option permits the selection between one, which is equivalent to the median ratio, or two, which is equivalent to dispersion excess.

Levels greater than verified signal threshold levels are interpreted as probably being signals of significant and important episodic disturbances. These i values are arrayed with four different j values based on false alarm and/or signal capture rate ratios. The arrayed value for j is defined as the selected threshold option. J1 is the highest, j2 a higher value, j3 a lower value and j4 the lowest value possible.

The threshold level TL(i,j) is calculated in block 622 to control the signal alarm rate. Given that the value i has two possibilities and the value j has four possibilities, the eight permutations of the threshold level TL(i,j) are as follows:

TL(1,1)=MNL+MNL

TL(1,2)=MNL+TL(1,1)

TL(1,3)=MNL+TL(1,2)

TL(1,4)=MNL+TL(1,3)

TL(2,1)=DHNL+DHNL

TL(2,2)=DNHL+TL(2,1)

TL(2,3)=DNHL+TL(2,2)

TL(2,4)=DNHL+TL(2,3)

Decision point 624 demonstrates the user's ability to establish a threshold strategy based on the user options. Using the i and j options, four threshold strategies emerge from decisional block 624 which include calculating in each instance the signal threshold level (STL) and verified signal threshold level (VTL).

The four potential cases include median ratio, dispersion excess, maximum and minimum. STL and VTL are defined in blocks 626, 628, 630 and 632 for each of the four cases. All of these calculations involve straightforward addition or subtraction of integers to offer the greatest simplicity and efficiency in operation.

At block 626, the signal threshold level STL is set equal to the calculated threshold level TL(1,j) and the verified threshold level VTL is set equal twice the signal threshold level STL. At block 628 (case of dispersion excess), the STL is set equal to the median noise level MNL plus the threshold level TL(2,j) and the VTL is set equal to the STL plus the threshold level TL(2,j). At block 630 (case of maximum), the STL and the VTL are set according to the threshold levels TL(l,j) and TL(2,j) and the median noise level MNL. If the threshold level TL(1,j) is greater than or equal to the sum of the median noise level MNL plus the threshold level TL (2,j), the STL is set to the threshold level TL(1,j) and the VTL is set to twice the threshold level TL(1,j). On the other hand, if TL(1,j) is less than MNL plus TL(2,j), then the STL is set to MNL plus TL(2,j) and the VTL is set to MNL plus two times TL(2,j). At block 632 (case of minimum), the STL and the VTL are set according to the following equations:

$$X = TL(i,j)$$
$$Y = MNL + TL(2,j)$$

-continued $$\text{If } X < Y, \quad STL = X$$
$$VTL = X + X$$

$$\text{If } X \geqq Y, \quad STL = Y$$
$$VTL = Y + TL(2,j)$$

After the operation of the blocks 626 through 632, the update noise thresholds operation is exited.

These threshold strategy updates (i.e., update noise threshold operator of FIG. 28) are needed only about every tenth reiteration of data. That is to say that actual updating is necessary for stack 564 in only about 10 percent of the data cases. Accordingly, the stack operation achieves the highest possible efficiency.

The user selectable array permits maximum flexibility of selection of threshold strategies while minimizing the effort by a user to change such strategies. For example, one of the median ratio strategies may be adopted if ideally random noise is expected. This would then be quite similar to using the transient episode detector as a Gaussian detector. However, if the background is partly deterministic (for example, much like the background fan noise example used throughout the disclosure) such that dispersion or some high value (i.e., very narrow dispersion) exists, then the dispersion excess threshold strategy 628 would be more appropriate. This means that smaller variations around a fixed mean would be expected and adaptively detected. It would be inappropriate to treat such expected signals as a random number whenever a threshold strategy particularly adapted to a mixed periodic and random source is available. Using one of the max options would be a good strategy for such random number expectations.

Both the median ratio and dispersion excess threshold strategies are appropriate strategies for mixed noise cases. The max portion might be used if there was great concern about false alarms and detection of episodes was a secondary priority. False alarms are usually the critical link in the system, not missed signals, inasmuch as a multiplicity of sensors and transient episode detectors may be utilized.

If the highest priority were sufficient power to detect weak signals, then the min option of threshold strategy 632 would be more appropriate. However, in the real world, it is generally expected to have a mixed case. The user experience level will help determine the appropriate threshold strategy to select for achieving the desired detection criteria.

In conjunction with the exemplary embodiment above-described in detail, those skilled in the art will appreciate that many variations and modifications may be made in this embodiment without departing from the many the advantages of and novel features of the present invention. Therefore, all such modifications and variations are intended to be included within the scope of the appended claims.

What is claimed is:

1. A method of detecting transient events in a sequence of digital signals supplied by a monitoring system of an environment, said transient events corresponding to physical episodes in the monitored environment, said method comprising the steps of:

inputting said digital signals into a digital processor;

digitally processing said input digital signals to determine a magnitude and time duration of peak value occurrences in said input digital signals representing possible physical episodes in the monitored environment;

storing in a shared memory peak value data; said peak value data being the time duration of a peak value occurrence and magnitude of the peak value occurrence;

digitally analyzing said peak value data to determine predefined patterns in said peak value data;

storing in said shared memory the determined peak value data patterns as peak pattern data;

digitally analyzing said peak pattern data to detect a transient event corresponding to a physical episode in said monitored environment; and initiating a course of action in response to said physical episode.

2. A method as in claim 1, wherein said digitally processing step comprises the steps of:

transforming said sequence of input digital signals into sequential approximate envelope values by detecting peaks and troughs which are absolute value local maxima;

transforming said sequence of input digital signals into an approximate zero-crossing count by detecting absolute value local minima;

transforming said sequential approximate envelope values into an approximate peak pulse energy value by detecting local envelope maxima; and estimating a beginning and end of the peak pulse energy value by local envelope minima.

3. A method as in claim 1 further comprising an initial step of:

transducing time-dependent variations detected by said monitoring system into a time-consecutive sequence of digital electrical signals which, in turn, are provided as said input digital signals.

4. A method as in claim 1, wherein said digitally processing step comprises the step of conditioning the input digital signals by at least one of (1) broad band pass filtering, (2) octaves-range band pass filtering, and (3) narrow band pass filtering.

5. A method as in claim 4, wherein said digitally processing step further comprises the step of differentially analyzing the conditioned input digital signals.

6. A method as in claim 5, wherein said differential analyzing step comprises the steps of:

updating said input digital signals;

subtracting time-consecutive ones of said input digital signals from one another to provide a corresponding sequence of first-difference digital signals;

subtracting time-consecutive ones of said first-difference digital signals from one another to provide a corresponding sequence of second-difference digital signals; and selecting one of a differential operator, a differential equation with constant coefficients, and a differential vector operator.

7. A method as in claim 1 wherein said digitally analyzing said peak value data step further comprises the steps of:

comparing the peak value data to a predetermined threshold level;

compiling occurrences of peak value data above the predetermined threshold level;

compiling total occurrences of all peak value data above and below the predetermined threshold level;

determining if said compiled total occurrences is sufficient to satisfy a predetermined probability given said compiled occurrences above the threshold level; and classifying the peak value data as a "signal" if the predetermined probability is satisfied.

8. A method as in claim 7 wherein said determining step comprises the steps of:

looking up on a table a desired total occurrences which satisfies the predetermined probability given the number of compiled occurrences above the threshold level; and comparing said compiled total occurrences with the desired total occurrences; and classifying the peak value data as "signal" if said compiled total occurrences is one of less than and equal to the desired total occurrences.

9. A method as in claim 8 wherein said predetermined probability and said predetermined threshold level are adjustable and user selectable.

10. A method as in claim 1 wherein in said digitally analyzing said peak value data step said predefined patterns are (1) a minimum, (2) part of an uptrend, (3) part of a downtrend, and (4) maximum detected peak value.

11. A method as in claim 10 wherein in said digitally analyzing said peak value data step further comprises:

a classifying pattern step for classifying a pattern of said peak value data as one of (1) a minimum, (2) part of an uptrend, (3) part of a downtrend, and (4) a maximum detected peak value based on a comparison of said peak value data with said predefined patterns.

12. A method as in claim 11 wherein said digitally analyzing said peak value data step further comprises:

a classifying signal step for classifying peak value data as "noise" if below a predetermined first threshold value, as "signal" if above said predetermined first threshold value and below a predetermined second threshold value, and as a "verified signal" if above said predetermined second threshold value.

13. A method as in claim 11 wherein said digitally analyzing said peak value data step further comprises:

a classifying signal step for classifying peak value data as "noise" if below a predetermined first threshold value and as being a "signal" if above said predetermined first threshold value.

14. A method as in claim 13, wherein said digitally analyzing said peak pattern data step includes detecting the occurrence of a transient episode based on the classifying pattern and signal steps.

15. A method as in claim 13, further comprising the step of compiling classified "noise" peak value data.

16. A method as in claim 15, wherein said compiling step further comprises continuous updating of the compiled "noise" peak value data based on newly classified "noise" peak value data.

17. A method as in claim 16, wherein said updating step is undertaken only when new "noise" peak value data fall outside a defined central normal portion of the compiled "noise" peak value data, thereby constituting a positive feedback recursive sort of significant non-redundant "noise" peak value data.

18. A method as in claim 17, wherein said digitally analyzing said peak pattern data step further includes the steps of establishing and maintaining a VOTE count and a MAX VOTE count, both said VOTE and MAX VOTE counts being related to the signal classifications of the peak value data, and both of said VOTE and MAX VOTE counts being used in detecting transient events.

19. A method as in claim 18, wherein said VOTE count step comprises providing a running count of classified "noise" and "signal" peak value data, with a classification of "noise" generating a negative increment of said VOTE count and a classification of "signal" generating a positive increment of said VOTE count, and a transient event is detected when said VOTE count reaches a predefined positive count value and minimally holds the same for a predefined period of time.

20. A method of detecting transient episodes in a monitored environment having a monitoring system which produces analog data representing the condition of said monitored environment; said method comprising the steps of:

inputting said analog data into a converter;

converting said input analog data to digital data;

inputting said digital data to a digital processor;

instructing said digital processor to perform the following steps of:

grouping said input digital data into at least three time consecutive data samples;

comparing said at least three time consecutive data samples with predefined patterns to determine the occurrence of a predefined pattern within said data samples;

selecting peak values of said data samples as indicated by said determined data sample patterns;

storing said selected peak values in a shared memory;

grouping at least three time consecutive selected peak values;

comparing said at least three time consecutive selected peak values with said predefined patterns to determine the occurrence of a predefined pattern in said selected peak values;

determining a peak value threshold status of one of "noise" level for at least one of said at least three time consecutive selected peak values;

detecting transient episodes based on said determined predefined pattern in said at least three consecutive selected peak values and determined peak value threshold status; and initiating a course of action in response to said transient episode.

21. A method as in claim 20, further comprising the steps of:

establishing a leading edge pointer which indicates a presently established start time of a detected transient episode, said pointer being selectively associated with said at least three time-consecutive selected peak values;

advancing said leading edge pointer in time relative to said three time-consecutive selected peak values whenever no start time of a transient episode is indicated; and retarding said leading edge pointer in time relative to said three time-consecutive selected peak values whenever a start time of a transient episode is indicated.

22. A method as in claim 20, further comprising the steps of:

establishing "noise" statistics based on determined "noise" level selected peak values;

updating said "noise" statistics with subsequent determined "noise" level selected peak values which are significant non-redundant determinations with respect to currently established noise statistics; and utilizing said established "noise" statistics to determine start and stop times for said detected transient episodes.

23. A method as in claim 22, wherein said predefined patterns include a minimum pattern defined by the second data sample having a value less than the first or third data sample, an uptrend pattern defined by the third data sample having a value greater than the second data sample and the second data sample having a value greater than the first data sample, a downtrend pattern defined by the first data sample having a value greater than the second data sample and the second data sample having a value greater than the third data sample, and a maximum pattern defined by said second data sample having a value greater than the first and third data samples.

24. A method as in claim 23, wherein selected peak values are indicated when a maximum pattern is determined.

25. A method as in claim 22, wherein said comparing said at least three time-consecutive data samples step includes establishing rectified second-difference values for said at least three times-consecutive data samples.

26. A method as in claim 25, wherein said establishing "noise" statistics step further comprises the steps of initializing a noise stack by filling the stack with unordered dummy data, and filling the bottom stack position with an integer value L which is larger than any possible "noise" level selected peak value; and said updating "noise" statistics step further comprises the steps of performing an upward recursive sort of incoming "noise" level peak values to order said "noise" level selected peak values according to a relative value until said integer value L is pulled to a top of said stack and all dummy data have been popped off the top of said stack, and updating said stack thereafter with significant non-redundant "noise+ level selected peak values.

27. A method as in claim 26, wherein said updating said stack step includes using positive feedback to push and pull "noise" level selected peak values to and from said stack such that, when said stack is updated with a new "noise+ level selected peak value, the "noise" level selected peak value discarded from the stack to make room for said new "noise" level selected peak value is the extremal value of the stack opposite a median stack value from the point of stack entry of said new "noise" level selected peak value.

28. A method as in claim 26, wherein said updating said stack is undertaken only for new "noise" level selected peak values which, according to said relative value, fall outside a defined normal portion of said stack, said defined normal portion including all values between a high percentile value, which is an established percentile below the upper extremal stack value, and a low percentile value, which is said established percentile above the lower extremal stack value.

29. A method as in claim 28, wherein said established percentile is initialized by a user of the present method.

30. A method of detecting transient events in a stream of digital data supplied by a monitoring system of an environment using a real time adaptive filter, said transient events corresponding to a physical episode in the monitored environment, said method comprising the steps of:

grouping said digital data into at least three time consecutive data samples;

comparing said at least three time consecutive data samples with specific predefined patterns to determine the occurrence of a specific predefined pattern in said at least three times consecutive data samples;

selectively establishing peak values from said digital data based on the determined specific predefined pattern occurrence in said at least three times consecutive data samples;

grouping established peak values into at least three times consecutive peak values;

determining a peak pattern type by comparing said at least three times consecutive peak values with said specific predefined patterns to determine the occurrence of said specific predefined patterns in said at least three times consecutive peak values;

analyzing said peak values to determine specific threshold levels indicative of "noise" level or "verified signal" level;

detecting start and end times, duration and value for transient events based on said determined peak pattern type and associated peak value threshold level; and initiating a course of action in response to said physical episode based on said detected transient events.

31. A method as in claim 30, further comprising the step of providing a "noise" statistic array by one of (1) a parametric statistical distribution, (2) a fixed histogram empirically determined during a warm-up phase of operation, and (3) a variable updated histogram wherein the "noise" statistics and frequency of occurrence are updated with time.

32. A method as in claim 30, further comprising the steps of establishing process states and transitory operation states for said adaptive filter in accordance with said determined peak pattern type and specific threshold level.

33. A method as in claim 32, further comprising the step of:

establishing a leading edge pointer to the leading edge of a detected transient event by advancing said leading edge pointer in time relative to said at least three time-consecutive peak values whenever no start time of an event is indicated, and retarding said leading edge pointer in time relative to said at least three time-consecutive peak values whenever a start time of an event is indicated.

34. A method as in claim 30, further comprising the steps of establishing and maintaining a "noise" statistic array based on indicated "noise" level peak values, including initializing said array with dummy data which are replaced with ordered "noise" level peak values by way of a recursive sort of incoming noise level peak values, and maintaining said array with current significant non-redundant "noise" level peak values with positive feedback of new "noise" level peak values.

35. A method as in claim 34, wherein said adaptive filter adaptively detects transient episodes based on current determined peak-pattern type and threshold status in accordance with the maintained "noise" statistic array.

36. A method of detecting episodic disturbances in an environment, comprising the steps of:

placing at least one analog sensor in said environment;

sensing the condition of the environment using said at least one analog sensor;

converting data generated by said at least one analog sensor into digital data;

transmitting said digital data to at least one transient episode detector corresponding to said at least one analog sensor;

utilizing said at least one transient episode detector in parallel to determine a transient episode based on said digital data;

transmitting from said at least one transient episode detector a determined transient episode to a supervisory disturbance processor; and determining an episodic disturbance in said environment by parallel processing the transmitted determined transient episodes.

37. A method as in claim 36, wherein a transient episode is determined by the following steps:

grouping said digital data into at least three time-consecutive samples;

determining the pattern type of said data values in accordance with specific predefined patterns;

detecting peak values of said data samples in accordance with the data pattern type determinations;

grouping detected peak values into at least three time-consecutive peak values;

determining pattern types of said peak values in accordance with said specific predefined patterns;

determining threshold status level of one of said at least three time-consecutive peak values to characterize the same as "noise" level, "signal" level or "verified signal" level; and determining the start and end times, duration and relative value of a transient episode based on the determined peak pattern type and threshold status.

38. A method as in claim 37, wherein said determining a episodic disturbance step includes comparing the relative values of detected transient episodes from all of the parallel transient episode detectors to select the highest relative transient episode value for initial processing to adaptively seek the most significant detected transient episodes relative to defining an episodic disturbance.

39. A method as in claim 36, wherein said transient episode detection step includes the steps of:

grouping said digital data into at least three time-consecutive samples;

determining the pattern type of said data values in accordance with specific predefined patterns;

detecting peak values of said data samples in accordance with the data pattern type determinations;

comparing the detected peak value to a predetermined threshold level;

compiling occurrences of the peak values above the threshold level;

compiling total occurrences of all peak values; and determining if said compiled total occurrences is sufficient to satisfy a predetermined probability given said compiled occurrences above the threshold level; and classifying a peak value as "signal" if the predetermined probability is satisfied and as "noise" if the predetermined probability is not satisfied.

40. A method as in claim 39 wherein said determination and classification steps comprise:

looking up on a table a desired total occurrences which satisfies the predetermined probability given the number of compiled occurrences above the threshold level; and comparing said compiled total occurrences with the desired total occurrences; and classifying the peak value as "signal" if said compiled total occurrences is one of less than and equal to the desired total occurrences.

41. A method as in claim 40 wherein said predetermined probability and said predetermined threshold level are adjustable and user selectable.

42. An Apparatus for detecting transient events in a sequence of digital signals supplied by a monitoring system of an environment, said transient events corresponding to a physical episode in the monitored environment, said apparatus comprising:

inputting means for inputting said digital signals into a digital processor;

said digital processor for digitally processing said input digital signals to determine a magnitude and time duration of peak value occurrences in said input digital signals representing possible physical episodes in the monitored environment;

shared memory for storing peak value data; said stored peak value data being the time duration of a peak value occurrence and magnitude of said peak value occurrences.

microprocessor circuit means for digitally analyzing said peak value data to determine predefined patterns in said peak value data;

said shared memory for storing the determined peak value data patterns as peak pattern data;

said microprocessor circuit means digitally analyzing said peak pattern data to detect a transient event corresponding to a transient episode in said monitored environment, and initiating a course of action in response to said physical episode.

43. An apparatus as in claim 42, wherein said digital processor is also for:

conditioning the input digital data by at least one of (1) broad band pass filtering, (2) octaves-range band pass filtering, and (3) narrow band pass filtering;

differentially analyzing said input digital data by updating said input digital signals, subtracting time-consecutive ones of said input digital signals from one another to provide a corresponding sequence of first-difference digital signals, subtracting time-consecutive ones of said first-difference digital signals from one another to provide a corresponding sequence of second-difference digital signals, and providing at least one of (1) an absolute value of at least one of said input digital signals, first-difference digital signals, and second-difference digital signals, (2) a differential equation having said input signals, first-difference digital signals, and second-difference digital signals as variables and constant coefficients, and (3) a vector differential operator.

44. An apparatus as in claim 42, wherein said digital processor is also for differentially analyzing said input digital signals.

45. An apparatus as in claim 44, wherein said digital processor is also for:

updating said input digital signals;

subtracting time-consecutive ones of said input digital signals from one another to provide a corresponding sequence of first-difference digital signals;

subtracting means for subtracting time-consecutive ones of said first-difference digital signals from one another to provide a corresponding sequence of second-difference digital signals; and providing at least one of (1) an absolute value of at least one of said input digital signals, first-difference digital signals, and second-difference digital signals, (2) a differential equation having said input digital signals, first-difference digital signals, and second-difference digital signals as variables and constant coefficients, and (3) a vector differential operator.

46. An apparatus as in claim 42, wherein said digital processor is also for:

selectively conditioning the input digital signals by at least one of (1) broad band pass filtering, (2) octaves-range band pass filtering, and (3) narrow band pass filtering.

47. An apparatus as in claim 46, wherein said digital processor is also for selectively passing all frequencies in a band having many octaves, frequencies in a band having one to several octaves, and frequencies in a band having a fraction of an octave.

48. An apparatus as in claim 46, wherein said digital processor is also for differentially analyzing said input digital signals.

49. An apparatus as in claim 42 wherein said microprocessor circuit means is also for:

comparing the peak values in said peak value data to a predetermined threshold level;

compiling occurrences of the peak values above the threshold level;

compiling total occurrences of all peak signal values above and below the threshold level; determining if said compiled total occurrences is sufficient to satisfy a predetermined probability given said compiled occurrences above the threshold level; and classifying the peak value as "signal" if the predetermined probability is satisfied.

50. An apparatus as in claim 49 wherein said microprocessor circuit means is also for:

looking up a desired total occurrences which satisfies the predetermined probability given the number of compiled occurrences above the threshold level; and comparing said compiled total occurrences with the desired total occurrences;

wherein the peak value is classified as a "signal" if said compiled total occurrences is one of less than and equal to the desired total occurrences.

51. An apparatus as in claim 50, wherein said predetermined probability and said predetermined threshold level are adjustable and user selectable.

52. An apparatus as in claim 42, wherein said digital processor is also for:

subtracting time-consecutive ones of said input digital signals from one another to provide a corresponding sequence of first-difference digital signals;

subtracting time-consecutive ones of said first-difference digital signals from one another to provide a corresponding sequence of second-difference digital signals;

deriving the absolute value of each of said second-difference digital signals to provide a corresponding sequence of rectified second-difference digital signals; and mutually comparing at least three time-consecutive ones of said rectified second-difference digital signals to detect the occurrence of a peak in the input digital signals.

53. An apparatus as in claim 52, wherein said digital processor is also for classifying the pattern of input digital signals as one of (1) a minimum, (2) part of an uptrend, (3) part of a downtrend, and (4) a maximum detected relative peak value.

54. An apparatus as in claim 53, wherein said microprocessor circuit means is also for:

classifying the pattern of peak value data as one of (1) a minimum, (2) part of an uptrend, (3) part of a downtrend, and (4) a maximum detected peak value; and classifying a peak value data as "noise" if below a predetermined first threshold value, as "signal" if above said predetermined first threshold value and below a predetermined second threshold value, and as "verified signal" if above said predetermined second threshold value.

55. An apparatus as in claim 52, further comprising transducing means for transducing time-dependent variations detected by said monitoring system into a corresponding time-consecutive sequence of digital electrical signals which, in turn, are provided as said input digital signals.

56. An apparatus as in claim 55, wherein said microprocessor circuit means is also for:

classifying the pattern of peak value data as one of (1) a minimum, (2) part of an uptrend, (3) part of a downtrend, an (4) a maximum detected peak value; and for classifying a peak value data as "noise" if below a predetermined first threshold value and as "signal" if above said predetermined first threshold value.

57. An apparatus as in claim 56, wherein said microprocessor circuit means is also for detecting the occurrence of a transient event based on the classified pattern and the classified threshold value of said peak values.

58. An apparatus as in claim 56, wherein said microprocessor circuit means is also for compiling the classified "noise" peak values.

59. An apparatus as in claim 58, wherein said microprocessor circuit means is also for sensing the compiled "noise" peak values, and using the same as noise-background determinations in detecting transient events.

60. An apparatus as in claim 58, wherein said microprocessor circuit means is also for continuously updating the compiled "noise" peak values based on a newly classified "noise" peak value.

61. An apparatus as in claim 60, wherein said microprocessor circuit means performs its update function only if the newly classified "noise" peak values fall outside a central normal range of ordered previous "noise" peak values, said microprocessor circuit means being also for performing a positive feedback recursive sort of significant non-redundant "noise" peak values.

62. An apparatus as in claim 58, wherein said microprocessor circuit means is also for maintaining a multinomial VOTE count, said multinomial VOTE count being a cumulative count of a plurality of scores, wherein each said classified "signal" peak value is given one of said plurality of scores depending upon a relation between said classified "signal" peak value and a plurality of multinomial noise threshold levels, each of said plurality of scores corresponding to one of the multinomial noise threshold levels.

63. An apparatus as in claim 62, wherein said detected peak values are verified as a "verified signal" when said multinomial VOTE count reaches a predetermined count value.

64. An apparatus as in claim 62, wherein said microprocessor circuit means is also for looking up the score corresponding to the multinomial noise threshold level.

65. An apparatus as in claim 58, wherein asid microprocessor circuit means is also for maintaining a VOTE count, said VOTE count being decremented by a decrementing value for each classified "noise" peak value and incremented by an incrementing value for each classified "signal" peak value.

66. An apparatus as in claim 65, wherein said microprocessor circuit means is also for maintaining a MAX VOTE count, said MAX VOTE count being the largest value of one of a previous MAX VOTE count and the VOTE count.

67. An apparatus as in claim 65, wherein said peak values are verified as a "verified signal" when said VOTE count reaches a predetermined count value.

68. An apparatus as in claim 67, wherein said predetermined count value is predetermined based upon a desired false alarm probability, said false alarm probability being user selectable.

69. An apparatus as in claim 65, wherein said decrementing values and said incrementing values are predetermined based upon a false alarm probability and a noise threshold, said false alarm probability and noise threshold being user selectable.

70. An apparatus as in claim 69 wherein said microprocessor circuit means is also for looking up the VOTE count, the decrementing values, and the incrementing values when said false alarm probability and said noise threshold is selected.

71. A transient episode detector for extracting transient signal components from time-consecutive digital data samples of input signals received from an input sensor in an environment, said transient episode detector comprising:

input means for accepting at least three input data samples from said input sensor, said data samples representing respectively corresponding different time-consecutive sample periods;

shared memory for storing said data samples for subsequent processing;

filtering means, for producing at least three rectified data values based on said stored data samples; and microprocessor circuit means for determining transient signal components based on said at least three rectified data samples; said microprocessor circuit comprising:

pattern analysis means for analyzing said rectified data values to detect predefined patterns therebetween, and outputting peak-value signals PV indicative of detected peaks and the values thereof;

peak-pattern analysis means for analyzing at least three time-consecutive peak value signals PV to detect said predefined patterns, and for comparing the peak value signals to predetermined thresholds to produce corresponding predefined pattern signals and threshold status signals TS;

state variable operator means for establishing transition operation state signals TOS and process state signals PS based on said predefined pattern signals and threshold status signals TS; and output means for outputting determined transition state signals TOS, process state signals PS, and peak value signals PV representing transient signal components.

72. A transient episode detector as in claim 71, wherein:

said predefined patterns are defined based on the relative values of at least three time-consecutive samples, and said patterns include minimum, uptrend, downtrend and maximum;

said minimum pattern defined by the second sample having a value less than the first or third sample;

said uptrend pattern defined by the third sample having a value greater than the second sample and the second sample having a value greater than the first sample;

said downtrend pattern defined by the first sample having a value greater than the second sample and the second sample having a value greater than the third sample; and said maximum pattern defined by said second sample having a value greater than the first or third sample.

73. A transient episode detector as in claim 71, wherein said process state signals determine characteristics about detected episodes including episodic signal start and end times, and said transition operation state signals determine specific operations of the transient episode detector to monitor peak value data leading to determination of said process state signals.

74. A transient episode detector as in claim 73, wherein said microprocessor circuit means is also for advancing or retarding said episode signal start and end times in response to the said process state signals and transition operation state signals, advancing operation whenever no start time of an episode is indicated and retarding operation whenever a start time of an episode is indicated.

75. A transient episode detector as in claim 71, further comprising:

first circular buffer shared memory means, responsive to said input sensor and transient episode detector, for transferring data from said sensor to said detector;

second circular buffer shared memory means, responsive to said transient episode detector and a host disturbance processor, for transferring contents of said output means to said host disturbance processor; and said first and second shared memory means having lockout means for preventing simultaneous access to either of said first and second shared memory means by their respective paired devices and skipped data count means for initiating automatic re-start of said transient episode detector if said detector fails to obtain data from said input sensor within pre-determined time limits.

76. A transient episode detector as in claim 75, wherein said microprocessor circuit is also for continuously informing said host processor whenever said output means is prepared to transfer collected information.

77. A transient episode detector as in claim 75, wherein said input sensor generates a continuous stream of analog data which is quantized and compartmentalized by an analog to digital converter prior to being transferred to said transient episode detector.

78. A transient episode detector as in claim 71, wherein said predetermined thresholds are a signal threshold level and a verified signal threshold level, which are used to classify said peak value signals PV as one of (1) "noise", (2) "signals" and (3) "verified signals", and wherein said signal and verified threshold levels are user-selectable.

79. A transient episode detector as in claim 78, wherein said microprocessor circuit means is also for compiling said peak value signals PV indicated as "noise", and updating said compilation as new non-redundant "noise" peak values are detected.

80. A transient episode detector as in claim 79, wherein said microprocessor circuit means employs a memory stack for holding said compiled "noise" peak values have (1) an initialize mode which includes filling the stack with unordered dummy data, filling the bottom stack position with an integer value L which is larger than any possible "noise" peak value, and performing a recursive sort on incoming "noise" peak values to order the same according to relative value until said value L is pulled off the top of said stack after all dummy data have been popped off the top of said stack, an (2) an update mode, operable upon completion of said initialize mode, which includes a recursive sort of significant non-redundant "noise" peak values.

81. A transient episode detector as in claim 80, wherein said update mode further includes use of positive feedback including a push or pull of said stack such that the "noise" peak value removed from the stack to make room for a new value is the extremal value of the stack which is opposite a median stack value from the point of stack entry of said new value.

82. A transient episode detector as in claim 81, wherein said update mode is operated only for new "noise" values which by ordered value fall outside a defined normal portion of said stack, said defined normal portion including all values between a high percentile value, which is an established percentile below the upper extremal stack value, and a low percentile value, which is said established percentile above the lower extremal stack value.

83. A transient episode detector as in claim 82, wherein said established percentile is initialized by a user of the transient episode detector.

84. A transient episode detector as in claim 79, wherein said microprocessor circuit means employs a memory stack having compiled "noise" peak values, wherein statistical percentiles of the "noise" peak values are used to establish said signal and verified threshold levels.

85. A transient episode detector as in claim 84, wherein the "noise" peak values, which bound specific percentiles targeted as multinomial noise threshold levels, are adaptively adjusted and updated.

86. A transient episode detector as in claim 84, wherein a median of the normally distributed "noise" peak values establishes said signal threshold level.

87. A transient episode detector as in claim 84, wherein an analytical distribution is fitted beyond an observed median of the "noise" peak values and a desired percentiles is chosen to establish said verified threshold level.

88. A real-time complex adaptive filter for detecting transient episodes, corresponding to physical episodes in a monitored environment comprising:

means for receiving a stream of digital data from a monitoring system of said environment and grouping said data into at least three time-consecutive samples; and microprocessor circuit means for detecting transient episodes based on said at least three time-consecutive samples; said microprocessor circuit means comprising:

analysis means for determining the occurrence of predefined pattern types within said data samples and outputting detected peak values as detected by at least one of said determined pattern types;

peak value analysis means for determining the occurrence of said predefined pattern types within a grouping of at least three time-consecutive peak values, and determining threshold status of at least one of said grouped at least three time-consecutive values in accordance with user-selectable threshold levels, said threshold levels including a signal threshold level and a verified signal threshold level whereby all peak values are determined to be one of (1) "noise" level, (2) "signal" level and (3) "verified signal" level; and transient episode indication means for detecting start and stop times, duration and value of transient episodes, and initiating a response to said physical episode based on said detected start and stop times.

89. An adaptive filter as in claim 88, wherein said microprocessor circuit means is also for compiling the most recent significant non-redundant "noise" peak values indicated from said peak value analysis means, wherein said compiled "noise" statistics is utilized in determining the start and stop times of a transient episode.

90. An adaptive filter as defined in claim 89, wherein said predefined patterns are based on the relative values of said at least three time-consecutive samples, and said patterns include a minimum pattern defined by a second sample having a value less than a first or third sample, an uptrend pattern defined by the third sample having a value greater than the second sample and the second sample having a value greater than the first sample, a downtrend pattern defined by the first sample having a value greater than the second sample and the second sample having a value greater than the third sample, and a maximum pattern defined by said second sample having a value greater than the first or third sample.

91. An adaptive filter as in claim 88, wherein said means for receiving includes a first circular buffer shared memory which contains digital data deposited thereto from at least one analog sensor.

92. An adaptive filter as in claim 91, wherein said indicated transient episodes, start and stop times, duration and value thereof, are transferred to a host processor through a second circular buffer shared memory; and said microprocessor circuit means is also for indicating to said host processor, through said second circular buffer shared memory, the availability of said transient episode indication and related detections.

93. An adaptive filter as in claim 92, wherein said second circular buffer shared memory permits said host processor to communicate with additional object sensor/adaptive filter pairs which are operating in parallel with each other.

94. A microprocessor circuit means for detecting a transient event in a monitored environment comprising:

first analyzing means for analyzing data output by a monitor system of said environment to detect peak values; and second analyzing means for, maintaining a first running count of the total number of peak values, comparing said peak values with a predetermined threshold level, maintaining a second running count of the number of peak values above said predetermined threshold level, determining upon each count increment of said second running count a desired total number of peak values required to satisfy a predetermined probability given the number of peak values above said predetermined threshold level, comparing the desired total number of peak values with the total number of peak values counted in said first running count, and classifing as a transient event said peak values if said desired total number of peak values is one of less than and equal to the total number of peak values counted in said first running count, and initiating a response action to said classified transient event.

95. An apparatus as in claim 94, wherein the predetermined threshold level and the predetermined probability are user selectable and adjustable.

96. An apparatus for detecting episodic disturbances in an environment comprising:

at least two analog sensors in said environment for sensing the condition of the environment;

a converting means associated with each analog sensor for converting data generated by said analog sensor into digital data;

a transient episode detector corresponding to each converting means for determining a transient episode based on said digital data; and a supervisory disturbance processor for determining an episodic disturbance in said environment by parallel processing the transient episodes as determined by each transient episode detector.

97. A system as in claim 96, wherein:

said at least one transient episode detector operates based on at least three time-consecutive data samples from said corresponding at least one analog sensor to determine peak value information from said data samples and then analyze a grouping of at least three time-consecutive peak values for a pattern type and a relative threshold level to thereby determine transient episodes.

98. A system as in claim 97, wherein said at least one analog sensor includes said converting means; said converting means being an analog to digital converter for accepting a continuous stream of analog signals and converting the same to departmentalized digital information for transfer to said transient episode detector.

99. A system as in claim 97, wherein said supervisory disturbance processor receives said indicated relative values of detected transient episodes from said at least one transient episode detector and selects the highest value indicated peaks for initial processing to thereby process the transient episode containing the most important information relative to the occurrence of an episodic disturbance.

* * * * *